(12) United States Patent
Shahbazi Mirzahasanloo

(10) Patent No.: US 11,776,550 B2
(45) Date of Patent: Oct. 3, 2023

(54) DEVICE OPERATION BASED ON DYNAMIC CLASSIFIER

(71) Applicant: QUALCOMM Incorporated, San Diego, CA (US)

(72) Inventor: Taher Shahbazi Mirzahasanloo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 17/196,563

(22) Filed: Mar. 9, 2021

(65) Prior Publication Data
US 2022/0292134 A1 Sep. 15, 2022

(51) Int. Cl.
*G10L 17/22* (2013.01)

(52) U.S. Cl.
CPC .................... *G10L 17/22* (2013.01)

(58) Field of Classification Search
USPC ........................................................ 704/246
See application file for complete search history.

(56) References Cited

U.S. PATENT DOCUMENTS

| 5,659,662 A * | 8/1997 | Wilcox | G06F 18/231 |
| | | | 704/243 |
| 2012/0245941 A1* | 9/2012 | Cheyer | G10L 17/24 |
| | | | 704/E15.004 |
| 2016/0248768 A1* | 8/2016 | McLaren | H04L 63/102 |
| 2016/0316366 A1* | 10/2016 | Takenouchi | G10L 17/22 |
| 2017/0011406 A1* | 1/2017 | Tunnell | G06Q 20/308 |
| 2017/0372706 A1* | 12/2017 | Shepstone | G10L 17/22 |
| 2018/0018973 A1* | 1/2018 | Moreno | G10L 17/02 |
| 2018/0275860 A1* | 9/2018 | Dellinger | G06F 3/02 |
| 2019/0066680 A1* | 2/2019 | Woo | G10L 15/08 |
| 2019/0115019 A1* | 4/2019 | Zurek | G10L 15/22 |
| 2020/0135209 A1* | 4/2020 | Delfarah | G10L 17/04 |
| 2021/0068173 A1* | 3/2021 | Yore | G06F 3/04847 |
| 2021/0105578 A1* | 4/2021 | Chen | G06F 18/2155 |
| 2022/0095006 A1* | 3/2022 | Seed | H04N 21/4788 |
| 2022/0115007 A1* | 4/2022 | Shahbazi Mirzahasanloo | |
| | | | H04R 1/028 |
| 2022/0200978 A1* | 6/2022 | Ho | H04L 63/1458 |
| 2022/0292134 A1* | 9/2022 | Shahbazi Mirzahasanloo | |
| | | | G10L 17/22 |

OTHER PUBLICATIONS

International Search Report and Written Opinion—PCT/US2022/070558—ISA/EPO—dated Apr. 20, 2022.

* cited by examiner

*Primary Examiner* — Edwin S Leland, III
(74) *Attorney, Agent, or Firm* — QUALCOMM Incorporated; Espartaco Diaz Hidalgo

(57) ABSTRACT

A device includes one or more processors configured to receive an audio data sample and to provide the audio data sample to a dynamic classifier. The dynamic classifier is configured to generate a classification output corresponding to the audio data sample. The one or more processors are further configured to selectively access a particular device based on the classification output.

30 Claims, 17 Drawing Sheets

DEVICE OPERATION BASED ON DYNAMIC CLASSIFIER

I. FIELD

The present disclosure is generally related to operation of devices based on classifying input data.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive an audio signal from one or more microphones. For example, the audio signal may represent user speech captured by the microphones, external sounds captured by the microphones, or a combination thereof. An electronic device may include one mechanism to process the audio signal from the microphones to detect if speech is present, a second mechanism to process the audio signal to determine if a keyword (e.g., "hey assistant") is detected in the audio signal, and a third mechanism to determine if the person speaking the keyword is authorized to execute a command that follows the keyword. For example, if the audio signal corresponds to the speech "hey assistant, turn on the lights," the electronic device may compare speech characteristics in the audio signal to stored user information to determine whether the speaker of the command is recognized, and if so, whether the speaker is authorized to turn on lights.

Conventionally, devices that support voice commands operate in an "always-on" mode for improved user experience. In order to reduce overall power usage, the audio processing mechanisms described above may be performed sequentially. For example, speech detection may be continuously performed, keyword detection may be only performed if speech is detected, and authentication and authorization may be only performed if a keyword is detected. However, while reducing overall power consumption during periods where speech is relatively infrequent, such approaches typically introduce additional complexity, resource requirements, and delay when processing speech commands.

In addition, conventional speaker authentication systems typically require a relatively tedious registration process for a device to learn to recognize a user, such as by requiring the user to provide multiple speech samples from which characteristic speech data is extracted and stored by the electronic device for comparison to later-received speech samples. Such systems typically are relatively susceptible to variations in the user's speech, such as due to illness, obstructions (e.g., masks or scarfs), environmental changes, or other factors, which may cause authentication of the user to fail and prevent the electronic device from executing the user's command. Improving the robustness of speaker authentication systems to accommodate variations in user speech also tends to increase the power consumption, processing resource requirements, and complexity of such systems.

III. SUMMARY

According to one implementation of the present disclosure, a device includes one or more processors configured to receive an audio data sample and to provide the audio data sample to a dynamic classifier. The dynamic classifier is configured to generate a classification output corresponding to the audio data sample. The one or more processors are further configured to selectively access a particular device based on the classification output.

According to another implementation of the present disclosure, a method includes receiving, at one or more processors, an audio data sample. The method includes providing, at the processor, the audio data sample to a dynamic classifier to generate a classification output corresponding to the audio data sample. The method also includes selectively accessing a particular device based on the classification output.

According to another implementation of the present disclosure, a non-transitory computer-readable medium includes instructions that, when executed by one or more processors, cause the one or more processors to receive an audio data sample and to provide the audio data sample to a dynamic classifier. The dynamic classifier is configured to generate a classification output corresponding to the audio data sample. The instructions are also executable to cause the one or more processors to selectively access a particular device based on the classification output.

According to another implementation of the present disclosure, an apparatus includes means for receiving an audio data sample. The apparatus includes means for generating feature data based on the audio data sample. The apparatus also includes means for providing the audio data sample to a dynamic classifier, the dynamic classifier configured to generate a classification output corresponding to the audio data sample. The apparatus further includes means for selectively accessing a particular device based on the classification output.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
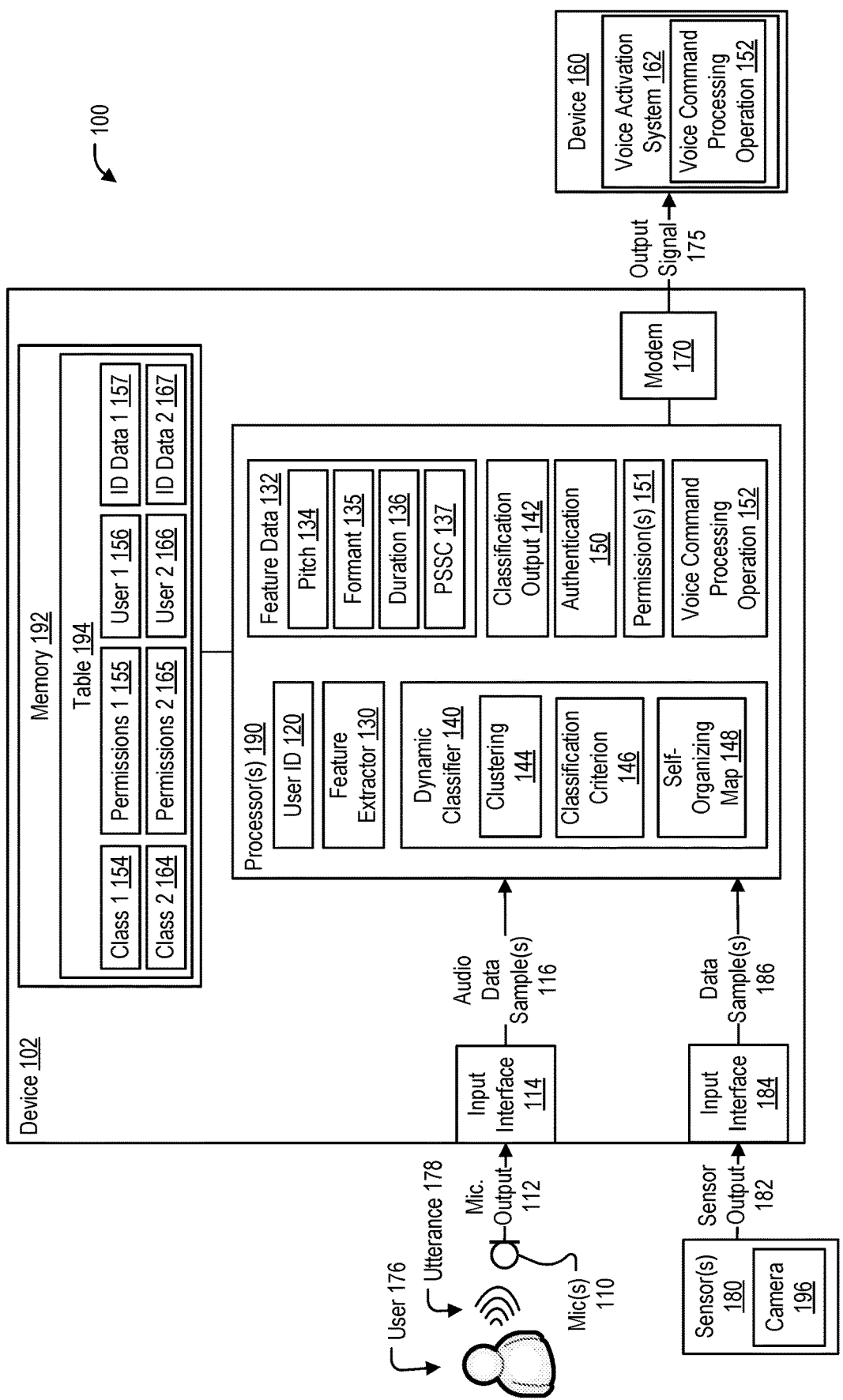
FIG. 1 is a block diagram of a particular illustrative aspect of a system in which various device operations are controlled using a dynamic classifier, in accordance with some examples of the present disclosure.

Conventionally, computing devices include various mechanisms to process audio signals from one or more microphones to detect if speech is present, to determine if a keyword (e.g., "hey assistant") is detected in the audio signal, and to determine if the person speaking the keyword is authorized to execute a command that follows the keyword. Although the audio processing mechanisms described above may be performed sequentially to reduce a power consumption associated with always-on operation, such approaches typically introduce additional complexity, resource requirements, and delay when processing speech commands. In addition, conventional speaker authentication systems typically require a relatively tedious registration process for a device to learn to recognize a user, such as by requiring the user to provide multiple speech samples from which characteristic speech data is extracted and stored by the electronic device for comparison to later-received speech samples. Such systems typically are relatively susceptible to variations in the user's speech, such as due to illness, obstructions, environmental changes, or other factors, which may cause authentication of the user to fail and prevent the electronic device from executing the user's command. Improving the robustness of speaker authentication systems to accommodate variations in user speech also tends to increase the power consumption, processing resource requirements, and complexity of such systems.

Systems and methods of a device operation using dynamic classifiers are disclosed. For example, audio signals may be received via one or more microphones and processed at a device to extract frequency domain feature sets corresponding to the audio signals. A dynamic classifier processes the extracted frequency domain feature sets and generates an output indicating classification of the feature sets, such as to generate an indication of a source of speech in the audio data based on classifying the speech as corresponding to a speech of a previously classified user. The dynamic classifier may perform adaptive clustering of the feature data and adjustment of a decision boundary between the two most discriminative categories of the feature data space to distinguish between feature sets corresponding to different users. In an illustrative example, the dynamic classifier is implemented using self-organizing maps.

Such dynamic classifiers enable discrimination using the extracted feature sets to actively respond and adapt to various conditions, such as: environmental conditions in highly nonstationary situations; mismatched microphones; changes in a user's speech such as due to an obstructions, age, or other factors; noise floor, bias, and sensitivities of microphones across the frequency spectrum; or a combination thereof. In some implementations, the dynamic classifier enables adaptive feature mapping capable of responding to such variations and reducing or minimizing a number of thresholding parameters used and an amount of training and calibration require to enroll users of the device. In some implementations, the dynamic classifier enables effective discrimination between speech of various users, between speech of previously classified users and speech of unclassified users, between speech and non-speech audio, or combinations thereof, with high accuracy under varying conditions and with relatively low power consumption as compared to conventional systems that provide comparable accuracy.

Classification outputs generated by such dynamic classifiers can be used to authenticate users based on the users' speech and to determine access permissions associated with the authenticated user. For example, a mapping of classification outputs to particular users enables determination of access permissions to authorize access to operations or components of the device, to one or more remote devices or operations at such remote devices, or a combination thereof. In some examples, classification outputs are used to determine whether to activate one or more other components of the device, such as to transition a keyword detector or voice command processing operation (e.g., an automatic voice recognition (ASR) system) from a low-power state to an active state. In some examples, keyword processing can be omitted, and voice command processing can instead be activated in response to a classification output of a dynamic classifier at an always-on stage of a device indicating that received audio is speech from an authorized user of the device. Dynamic classifiers enable users to be classified and enrolled on-the-fly, reducing or eliminating requirements for the users to provide a variety of predetermined speech samples as may be required for conventional voice recognition systems.

According to various aspects, such dynamic classifiers are used to classify input data received via various modalities, such as image data captured by a camera, fingerprint data, or other biometric data, in place of, or in addition to, audio data corresponding to the users' speech. Thus multimodal authentication can be performed and used to control operation of the device, access to one or more components or operations of the device or of other devices, or a combination thereof.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190. For ease of reference herein, such features are generally introduced as "one or more" features and are subsequently referred to in the singular unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to perform device operation using a dynamic classifier is disclosed and generally designated 100. The system 100 includes a device 102 that is coupled to one or more microphones 110, one or more other sensors 180, and a second device 160. The device 102 is configured to perform various operations based on processing speech captured as audio data by the microphone 110 using a dynamic classifier 140. As used herein, "speech" indicates a voice or utterance 178 of a person (e.g., a user of the device) as compared to sounds that do not originate from a person (e.g., "other audio activity").

The device 102 includes a first input interface 114, a second input interface 184, one or more processors 190 coupled to a memory 192, and a modem 170. The first input interface 114 is coupled to the processor 190 and configured to be coupled to the microphone 110. The first input interface 114 is configured to receive a microphone output 112 from the microphone 110 and to provide the microphone output 112 to the processor 190 as one or more audio data samples 116.

The second input interface 184 is coupled to the processor 190 and configured to be coupled to the sensor 180. The second input interface 184 is configured to receive a sensor output 182 from the sensor 180 and to provide the sensor output 182 to the processor 190 as one or more data samples 186.

The processor 190 is coupled to the modem 170 and includes a feature extractor 130 and the dynamic classifier 140. The processor 190 is configured to receive the audio data sample 116 corresponding to the microphone output 112 and the data sample 186 corresponding to the sensor output 122. The processor 190 is configured to process the audio data sample 116 at the feature extractor 130 to generate feature data 132.

In some implementations, the processor 190 is configured to process the audio data sample 116 and the data sample 186 prior to generating feature data 132. In an example, the processor 190 is configured to perform echo-cancellation, noise suppression, or both, on the audio data samples 116. In some implementations, the processor 190 is configured to transform the audio data samples 116 (e.g., a Fourier transform) to a transform domain prior to generating the feature data 132.

The processor 190 is configured to generate feature data 132 based on the audio data samples 116. For example, the feature data can correspond to factors that may be unique to a particular person and associated with a shape of a person's vocal tract, such as pitch and linear prediction coding (LPC) coefficients. In accordance with some aspects, the feature data 132 includes pitch data 134 and formant data 135 associated with speech. In some implementations, the feature data 132 includes additional or alternative feature types, such as an implementation in which the dynamic classifier 140 is configured to perform phrase-dependent classification, and in which the feature data 132 further includes duration data 136 and phrase-specific syllable cues 137.

The processor 190 is configured to process the feature data 132 at the dynamic classifier 140. The dynamic classifier 140 is configured to distinguish between multiple users based on speech characteristics to generate a classification output 142. In some implementations, the dynamic classifier 140 is configured to adaptively cluster sets (e.g., samples) of the feature data 132 based on whether a sound represented in the audio data sample 116 originates from one of a number of speech sources (e.g., users) that have been distinguished in the dynamic classifier 140 via clustering. To illustrate, the dynamic classifier 140 adaptively clusters sets of the feature data 132 based on similarity of the feature data 132 to node values in the dynamic classifier 140, where individual clusters correspond to respective users. For example, the dynamic classifier 140 may be configured to receive a sequence of samples of the feature data 132 and adaptively cluster the samples in a feature space containing pitch values, formant values, one or more other feature values, or a combination thereof.

The dynamic classifier 140 may also be configured to adjust a decision boundary between discriminative categories of the feature space to distinguish between sets of feature data corresponding to speech of different users (e.g., to distinguish between an utterance 178 of a user 176 and an utterance of another user). To illustrate, the dynamic classifier 140 may be configured to classify incoming feature data into one of multiple classes (e.g., class 0 or class 1, when the dynamic classifier 140 is configured to distinguish between only two users), where one of the two classes corresponds to a first user, and the other of the two classes corresponds to a second user. In such implementations, the classification output 142 may include a single bit or flag that has one of two values: a first value (e.g., "0") to indicate that the feature data 132 corresponds to one of the two classes; or a second value (e.g., "1") to indicate that the feature data 132 corresponds to the other of the two classes. However, in other implementations the dynamic classifier 140 is not limited to distinguishing between two users. For example, the processor 190 may be configured to enforce an upper limit on a number of users that are distinguishable by the dynamic classifier 140, such as described further with reference to FIG. 2.

In some implementations, the dynamic classifier 140 performs clustering and vector quantization. For example, clustering includes reducing (e.g., minimizing) the within-cluster sum of squares, defined as $$\min \sum_{i=1}^{n} \sum_{x_j \in C_i} p_i \|x_j - \mu_i\|^2,$$

where $C_i$ represents cluster i, $p_i$ represents a weight assigned to cluster i, $x_j$ represents a node j in the feature space, and $\mu_i$ represents the centroid of cluster i. The cluster weight $p_i$ may be probabilistic, such as a prior cluster distribution; possibilistic, such as a confidence measure assigned to possibility of each cluster; or determined by any other factor that would enforce some form of non-uniform bias towards different clusters. Vector quantization includes reducing (e.g., minimizing) error by quantizing an input vector into a quantization weight vector defined by $$\min \sum_{i=1}^{n} \sum_{x_j \in C_i} p_i \|x_j - w_i\|^2,$$

where $w_i$ represents quantization weight vector i.

In some implementations, the dynamic classifier 140 is configured to perform competitive learning in which units of quantization compete to absorb new samples of the feature data 132. The winning unit is then adjusted in the direction of the new sample. For example, each unit's weight vector may be initialized for separation or randomly. For each new sample of feature data that is received, a determination is made as to which weight vector is closest to the new sample, such as based on Euclidean distance or inner product similarity, as non-limiting examples. The weight vector closest to the new sample (the "winner" or best matching unit) may then be moved in the direction of the new sample. For example, in Hebbian learning, the winners strengthen their correlations with the input, such as by adjusting the weights between two nodes in proportion to the product of the inputs to the two nodes.

In some implementations, the dynamic classifier 140 includes local clusters in a presynaptic sheet that are connected to local clusters in a postsynaptic sheet, and interconnections among neighboring neurons are reinforced through Hebbian learning to strengthen connections between correlating stimulations. The dynamic classifier 140 may include a Kohonen self-organizing map in which the input is connected to every neuron in the postsynaptic sheet or the map. Learning causes the map to be localized in that different fields of absorption respond to different regions of input space (e.g., the feature data space).

In a particular implementation, the dynamic classifier 140 includes a self-organizing map 148. The self-organizing map 148 may operate by initializing weight vectors, and then for each input t (e.g., each received set of the feature data 132), determining the winning unit (or cell or neuron) according to $$v(t) = \arg\min_i \|x(t) - w_i(t)\|,$$

to find the winner v(t) as the unit that has the smallest distance (e.g., Euclidean distance) to the input x(t). The weights of the winning unit and its neighbors are updated, such as according to $\Delta w_i(t) = \alpha(t) l(v, i, t)[x(t) - w_v(t)]$, where $\Delta w_i(t)$ represents the change for unit i, $\alpha(t)$ represents a learning parameter, and l(v, i, t) represents a neighborhood function around the winning unit, such as a Gaussian radial basis function. In some implementations, inner products or another metric can be used as the similarity measure instead of Euclidean distance.

Figure 4:
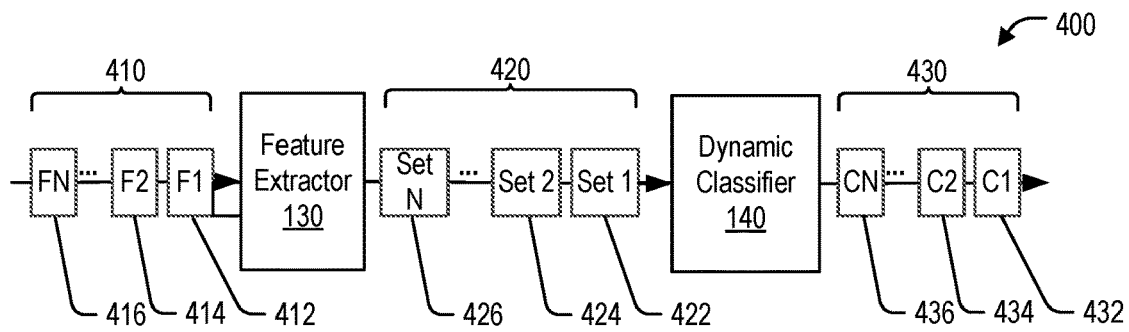
FIG. 4 is a diagram of an illustrative aspect of operation of components of the system of FIG. 1, in accordance with some examples of the present disclosure.

In some implementations, the dynamic classifier 140 includes a variant of a Kohonen self-organizing map to accommodate sequences of speech samples, such as described further with reference to FIG. 4. In an example, the dynamic classifier 140 may implement temporal sequence processing, such as according to a temporal Kohonen map in which an activation function with a time constant modeling decay ("D") is defined for each unit and updated as $$U_i(t, D) = D \cdot U_i(t-1, D) - \frac{1}{2}\|x(t) - w_i(t)\|^2,$$

and the winning unit is the unit having the largest activity. As another example, the dynamic classifier 140 may implement a recurrent network, such as according to a recurrent self-organizing map which uses a difference vector y instead of a squared norm: $y_i(t, \gamma) = (1-\gamma)y_i(t-1, \gamma) + \gamma(x(t) - w_i(t))$, where $\gamma$ represents a forgetting factor having a value between 0 and 1, the winning unit is determined as the unit with the smallest difference vector $$v(t) = \arg\min_i \|y_i(t, \gamma)\|,$$

and the weights are updated as $\Delta w_i(t) = \alpha(t) l(v, i, t)[x(t) - y_v(t, \gamma)]$.

In some implementations, the processor 190 is configured to update a clustering operation 144 of the dynamic classifier 140 based on the feature data 132 and to update a classification criterion 146 of the dynamic classifier 140. For example, as explained above, the processor 190 is configured to adapt the dynamic classifier 140 to changes associated with the voice input of a particular user, to add a class for an unclassified user, or both, based on incoming samples of the audio data sample 116, enabling the dynamic classifier 140 to adjust operation based on changing conditions of the user 176, the environment, other conditions (e.g., microphone placement or adjustment), the speech of newly encountered users, or any combination thereof.

Although the dynamic classifier 140 is illustrated as including the self-organizing map 148, in other implementations the dynamic classifier 140 may incorporate one or more other techniques to generate the classification output 142 instead of, or in addition to, the self-organizing map 148. As non-limiting examples, the dynamic classifier 140 may include a restricted Boltzmann machine having an unsupervised configuration, an unsupervised autoencoder, an online variation of Hopfield networks, online clustering, or a combination thereof. Each partition of the voice feature space could be input to another map to create an authentication status. As another non-limiting example, the dynamic classifier 140 may be configured to perform a principal component analysis (e.g., sequentially fitting a set orthogonal direction vectors to the feature vector samples in the feature space, where each direction vector is selected as maximizing the variance of the feature vector samples projected onto the direction vector in feature space). As another non-limiting example, the dynamic classifier 140 may be configured to perform an independent component analysis (e.g., determining a set of additive subcomponents of the feature vector samples in the feature space, with the assumption that the subcomponents are non-Gaussian signals that are statistically independent from each other). In some implementations, enrollment of classes may be performed (e.g., offline) by training discriminators and generators of generative adversarial networks (GANs).

The processor 190 is configured to determine an authentication 150 at least partially based on the classification output 142. In an illustrative example in which the dynamic classifier 140 is configured to distinguish between four classes, the classification output 142 may indicate that the feature data 132 is classified as one of the four classes (e.g., class "0," class "1," class "2," or class "3") but may not indicate which class corresponds to which particular user, or which permissions are associated with each class. For example, based on how the dynamic classifier 140 is initialized and the feature data that has been used to update the dynamic classifier 140, in some cases the classification output 142 having the value "0" indicates a first user having first permission, while in other cases the classification output having the value "0" indicates a second user having second permissions.

In some implementations, the processor 190 accesses a table 194 stored in the memory 192 to determine the authentication 150. The table 194 associates classification outputs of the dynamic classifier 140 to particular users of the multiple users that have been classified by the dynamic classifier 140. To illustrate, the table 194 includes first data (e.g., a first row of the table 194) that associates a first class 154 (e.g., the classification output 142 having value "0") with a first set of permissions 155, a first user 156, and first identification data (ID data 1) 157. The table 194 also includes second data (e.g., a second row of the table 194) that associates a second class 164 (e.g., the classification output 142 having value "1") with a second set of permissions 165, a second user 166, and second identification data (ID data 2) 167.

To illustrate, processor 190 may be configured to populate the table 194 during an enrollment operation in which a user provides a speech sample (e.g., via the microphone 110), user data (e.g., the user's name, login identifier, or other identifying information), and user identification data 120. In an example, the camera 196 is configured to capture an image of a speaking user and to send data corresponding to the image to the processor 190 as the user identification data 120. In some implementations, the user identification data 120 includes one or more other sets of identification data captured by the one or more sensors 180, such as fingerprint data or other biometric data captured by a biometric sensor included in the sensors 180, a numeric password entered via one or more of the sensors 180 as a gesture, keypad entry, or touchscreen entry, or a combination thereof. During enrollment, the dynamic classifier 140 may be adjusted to add a class for the newly enrolled user and generate a classification output 142 associated with the new user, and the processor 190 may populate the table 194 with a new row that indicates the new class, the new user, the new identification data, and permissions associated with the user. Although the table 194 is illustrated as including data associated with only classes (e.g., two rows) for purpose of illustration, it should be understood that the table 194 is configured to store data associated with as many classes as is supported by the dynamic classifier 140.

According to some aspects, enrollment of users is performed to populate the table 194. In some implementations, the table 194 is populated during an enrollment operation and once populated, is "fixed" (e.g., preventing further changes) to prevent addition of additional users. Alternatively, in some implementations, the table 194 is initialized based on a high-level feature directing population of the table, such as a user input command that an enrollment operation is to be performed. Once a criterion is met, such as a particular time period has elapsed, a threshold number of entries have been entered in the table 194 (e.g., the dynamic classifier 140 has been configured to classify a threshold number of users), or a user input has been received to end enrollment, as illustrative, non-limiting examples, the table 194 may be finalized and fixed, in some use cases, or may remain open to future alteration in other use cases. In some implementations, an open-discourse authentication set (e.g., a variable and adjustable set of authenticated users that can be expanded as speech is detected from non-authenticated users is detected) or a closed-discourse authentication set (e.g., a set of authenticated users constrained based on total number of users or limited to only specific users) may be maintained based on the content of the table 194.

In an illustrative implementation, some entries in the table 194 remain fixed, while other entries are allowed to be added to or removed from the table 194. For example, in an implementation in which the device 102 is operated in conjunction with a shared resource, such as a ridesharing vehicle, one or more owners or principal operators of the resource remain fixed in the table 194 and are not subject to eviction from the table 194, while other users of the resource (e.g., rideshare passengers) may be added to the table 194 as encountered, or removed from the table 194 based on one or more removal criteria. Removal criteria can include a duration since last time a user's speech was recognized exceeding a threshold, the table 194 reaching a table size threshold and a new user is to be added, or receipt of a user command to clear the table 194 of non-fixed entries, such as after a rideshare session has ended, as illustrative, non-limiting examples.

The authentication 150 indicates which user is mapped to the classification output 142 (e.g., the first user 156 or the second user 166). In accordance with some aspects, the classification output 142 may indicate that the feature data 132 does not map to any of the classes (e.g., the feature data 132 does not match any of the clusters within a threshold confidence level), and as a result the authentication 150 indicates that the person speaking is not authenticated. For example, in some implementations, the classification output 142 is represented as "one-hot" encoded data that includes a "1" value in a particular field that corresponds to the matching class and a "0" value in each field that does not correspond to the matching class. The one-hot encoded data can include a "no class" field in which a "1" value indicates that the feature data 132 does not map to any of the classes within a threshold confidence level. In other implementations, each field of the classification output 142 has a value that represents a confidence level that the feature data 132 matches a corresponding class, where the field having the largest value indicates the matching class. If no value exceeds a threshold confidence level, the feature data 132 can be determined to not map to any of the classes.

According to some aspects, the classification output 142 has an integer representation, a bit vector representation (e.g., a one-hot representation or encoded binary representation), a binary tree or graph representation, or one or more other representations, such as one or more hash, binary trees, graphs, or arrays. Integer representations enable storage of data having N elements (e.g., N classes, where N is a positive integer) using order O(N) storage resources, while an encoded binary bit vector enables storage of data using order O(log N) storage resources. Use of a particular representation of the classification output 142 may be selected based on use case, such as selected for memory footprint, lookup complexity, or complexity of insertion or removal of classes.

In some implementations, the processor 190 is further configured to determine one or more permissions 151 at least partially based on the classification output 142. For example, the processor 190 retrieves the first set of permissions 155 or the second set of permissions 165 from the table 194 to determine the permission 151 that corresponds to the classification output 142. The permission 151 can indicate whether the user is authorized to access or to perform one or more operations at one or more particular devices, such as the device 102, the second device 160, one or more other devices, or a combination thereof, as illustrative, non-limiting examples.

In some implementations, the processor 190 is configured to selectively initiate a voice command processing operation 152 based on the permission 151 indicating access to the voice command processing operation 152. In an illustrative example, the voice command processing operation 152 includes a voice activation operation, such as keyword or key phrase detection, natural language processing, one or more other operations, or any combination thereof. In some implementations, the processor 190 is configured to generate at least one of a wakeup signal or an interrupt to initiate the voice command processing operation 152, as described in further detail with reference to FIG. 3. As compared to conventional systems in which pulse code modulation (PCM) or audio data samples are stored for users and compared against received audio samples to authenticate a user, and/or the PCM data corresponding to the audio data sample 116 is processed to check for the presence of keywords, the classification output 142 of the dynamic classifier 140 can instead be used to wake up or initiate the voice command processing operation 152 or one or more other components of the device 102.

The modem 170 is coupled to the processor 190 and is configured to enable communication with the second device 160, such as via wireless transmission. In some examples, the modem 170 is configured to transmit an output of the voice command processing operation 152 to the second device 160 in response to the permission 151 indicating access to the second device 160. In some examples, the modem 170 is configured to transmit the audio data sample 116 to the second device 160 in response to a determination that the audio data sample 116 corresponds to an authorized user based on the dynamic classifier 140. For example, in an implementation in which the device 102 corresponds to a headset device that is wirelessly coupled to the second device 160 (e.g., a BLUETOOTH™ connection to a mobile phone or computer), the device 102 may send the audio data sample 116 to the second device 160 to perform the voice command processing operation 152 at a voice activation system 162 of the second device 160. In this example, the device 102 offloads more computationally expensive processing (e.g., the voice command processing operation 152) to be performed using the greater processing resources and power resources of the second device 160. In other examples, the device 102 is configured to perform the voice command processing operation 152 and the modem 170 is configured to transmit an output of the voice command processing operation 152 (e.g., an instruction) to the second device 160 in response to the permission 151 indicating access to the second device 160.

In some implementations, the device 102 corresponds to or is included in one or various types of devices. In an illustrative example, the processor 190 is integrated in a headset device, such as described further with reference to FIG. 16. In other examples, the processor 190 is integrated in at least one of a mobile phone or a tablet computer device, as described with reference to FIG. 15, a wearable electronic device, as described with reference to FIG. 17, a voice-controlled speaker system, as described with reference to FIG. 18, a camera device, as described with reference to FIG. 19, or a virtual reality headset, mixed reality headset, or an augmented reality headset, as described with reference to FIG. 20. In another illustrative example, the processor 190 is integrated into a vehicle, such as described further with reference to FIG. 21 and FIG. 22.

During operation, the microphone 110 is configured to capture utterances 178 of a user 176. The audio data sample 116 is processed at the processor 190, such as by performing echo cancellation, noise suppression, frequency domain transform, etc. The resulting audio data is processed at the feature extractor 130 to generate the feature data 132. The feature data 132 is input to the dynamic classifier 140 to generate the classification output 142, which is interpreted by the processor 190 (e.g., in conjunction with a lookup operation at the table 194), to generate the authentication 150, which may indicate whether the user 176 is authenticated (e.g., matched to an existing class by the dynamic classifier 140) and to obtain the permission 151.

In some implementations, the sensor 180 is configured to capture one or more other aspects, such as an image of the user 176 captured via the camera 196. The data samples 186 are processed at the processor 190, such as by performing image filtering, frequency domain transform etc. The resulting data may be processed at the feature extractor 130 (or another feature extractor) to generate additional components of the feature data 132 corresponding to the data samples 186. The feature data 132 (e.g., merged data including audio features and image features, such as described further with reference to FIG. 9) is input to the dynamic classifier 140 to generate the classification output 142, which is used to determine the authentication 150 and to obtain the permission 151. In some implementations, rather than using merged audio and image data at a single dynamic classifier, the device 102 includes multiple dynamic classifiers, such as a first dynamic classifier for audio data and a second dynamic classifier for image data or other data types, such as described further with reference to FIG. 10. Another implementation in which the device 102 includes multiple classifiers uses a first dynamic classifier for a first set of classes (e.g., to classify audio data as either noise or speech) and a second dynamic classifier for a second set of classes (e.g., to classify audio data as speech of classified users or as speech of non-classified users), such as described further with reference to FIG. 11. In another example, the device 102 can include multiple dynamic classifiers, with each dynamic classifier functioning as an authentication network for a corresponding device of a set of multiple devices, such as described further with reference to FIG. 13. In any the above examples of using multiple dynamic classifiers, a hierarchical configuration of the dynamic classifiers may be used for multi-stage authentication, such as to classify audio data in one stage and image data in another stage, to classify first audio features in one stage and second audio features in another stage (e.g., as described with reference to FIG. 11), to provide multi-stage authentication for extra layers of security or for multi-level control of content or services, as illustrative, non-limiting examples.

In some implementations, the authentication 150 is used to determine whether to initiate the voice command processing operation 152 at the device 102. For example, the device 102 may process speech from any authenticated user to determine if the speech corresponds to or includes a voice command. Alternatively, or in addition, the authentication 150 can be used to determine whether to initiate generation of an output signal 175 (e.g., the audio data sample 116) to the second device 160 for further processing at the voice activation system 162.

In addition, in conjunction with generating the classification output 142, the dynamic classifier 140 is updated based on the feature data 132, such as by adjusting weights of the winning unit and its neighbors to be more similar to the feature data 132, updating the clustering operation 144, the classification criterion 146, or a combination thereof. In this manner, the dynamic classifier 140 automatically adapts to changes in the user speech, changes in the environment, changes in the characteristics of the device 102 or the microphone 110, addition of new users, or a combination thereof.

The system 100 thus improves user authentication by using the dynamic classifier 140 to discriminate between users with relatively low complexity, low power consumption, and high accuracy. Automatically adapting to user and environment changes provides improved benefit by reducing or eliminating calibration to be performed by the user and enhancing the user's experience.

Although the microphone 110 and the sensor 180 are illustrated as being coupled to the device 102, in other implementations one or both of the microphone 110 or the sensor 180 may be integrated in the device 102. In some implementations, the sensor 180 is omitted, and authentication is performed based on the audio data samples 116 without using data samples 186 from other sensors.

Although the table 194 is described as storing class data, permissions data, user data, and identification data, in other implementations class data, permissions data, user data, identification data, or any combination thereof, is stored using a data structure other than a table (e.g., a linked list, array, or relational database, as non-limiting examples). In some implementations, one or more of the permissions data, user data, and identification data is omitted. For example, the voice command processing operation 152 or other components or functions of the device 102 may be activated based on the classification output 142 and without identifying any particular user. In an illustrative implementation, the table 194 is omitted, and the classification output 142 functions as the authentication 150 and the permission 151.

Although the device 102 is described as using the authentication 150 and the permission 151 to determine whether to perform the voice command processing operation, in other implementations the authentication 150 and the permission 151 are used to selectively lock, unlock, or otherwise provide access to functions associated with the device 102, the device 160, or a combination thereof. For example, the authentication 150 and the permission 151 can be used to grant or block access to content (e.g., private data and applications such as contacts, messaging, or banking, or playback of media content, as non-limiting examples), to activate or deactivate one or more components of the device 102 or the device 160, to lock or unlock services (e.g., payment services, streaming media services, etc.), to allow entrance to a virtual environment in a virtual reality or augmented reality implementations, or to enable access to a virtual assistant, as illustrative, non-limiting examples. Use of the dynamic classifier 140 thus enables multiple ways to grant or deny access to various components and functions, which is updated in an unsupervised manner and uses an efficient architecture as compared to conventional techniques to control access to such components and functions.

Although various systems are illustrated in the present disclosure as including a first device (e.g., the device 102) that has a dynamic classifier and that is coupled to one or more additional devices (e.g., the second device 160) for purpose of explanation, it should be understood that, unless expressly indicated otherwise, such additional device(s) are optional and are not to be construed as required components or limitations. To illustrate, in accordance with some implementations, the device 102 uses the classification output 142 of dynamic classifier 140 to control operations, components, access, or other aspects of the functioning of the device 102 without being coupled to or in communication with the device 160 or any other external device.

Figure 2:
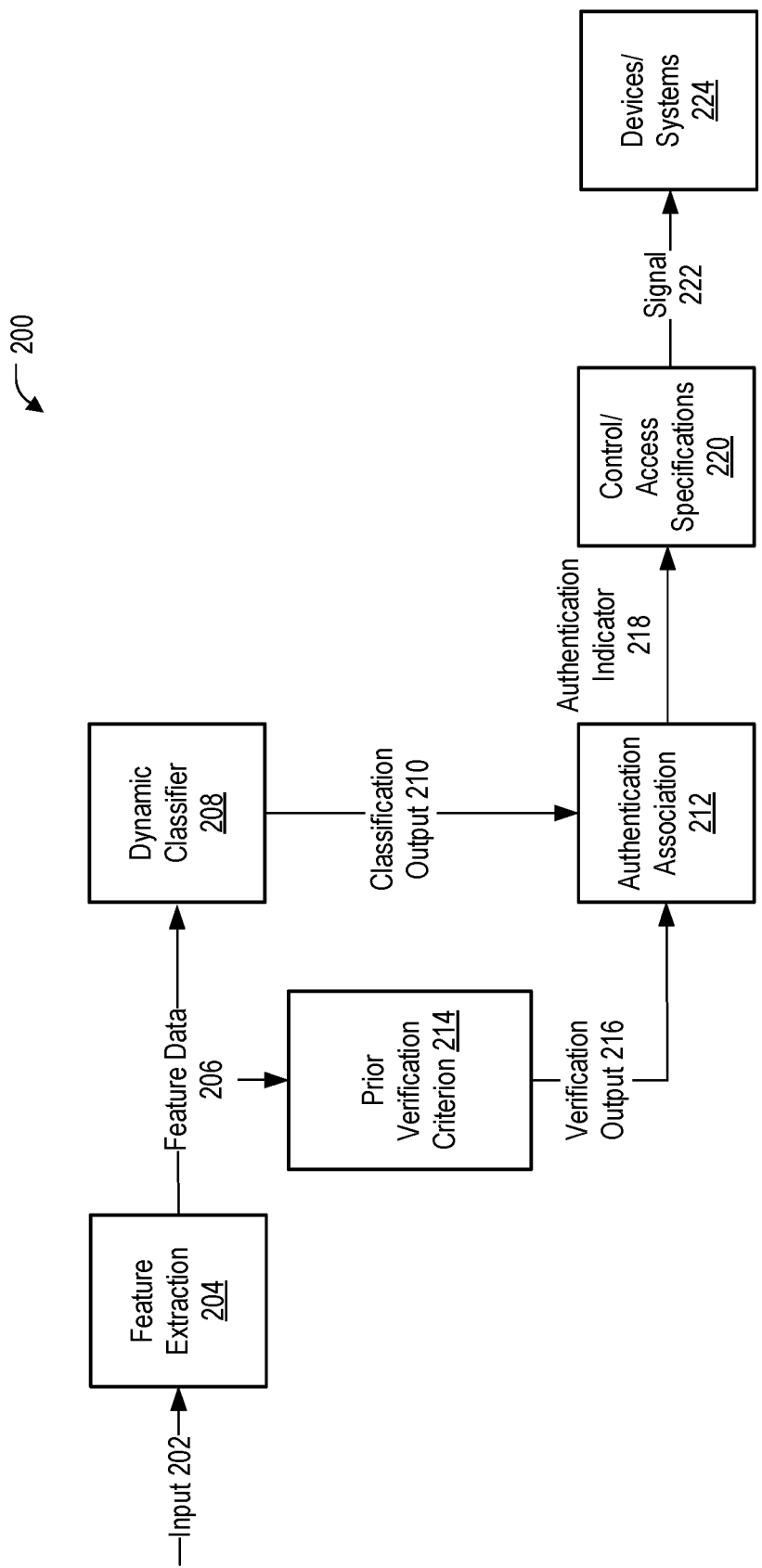
FIG. 2 is a diagram of an illustrative aspect of controlling device operations using a dynamic classifier, in accordance with some examples of the present disclosure.

FIG. 2 is a diagram of an illustrative aspect of operations 200 associated with authentication that may be performed by the device 102 of FIG. 1 (e.g., the processor 190). Feature extraction 204 is performed on an input 202 to generate feature data 206. In an example, the input 202 corresponds to the audio data sample 116, the feature extraction 204 is performed by the feature extractor 130, and the feature data 206 corresponds to the feature data 132.

A dynamic classifier 208 operates on the feature data 206 to generate a classification output 210. In an example, the dynamic classifier 208 corresponds to the dynamic classifier 140 and is configured to perform unsupervised real-time clustering based on the feature data 206 with highly dynamic decision boundaries for user classification in a classification output 210. For example, the dynamic classifier 208 may divide the feature space into multiple classes, one class associated with each user whose speech has been classified via adaptive clustering and decision boundary adaptation. The classification output 210 may include, for example, a numeric or bit-flag indicator of which class is associated with the feature data 206. In an example, the classification output 210 corresponds to the classification output 142.

An authentication association operation 212 generates an authentication indicator 218 based on the classification output 210 and a verification input 216. The verification input 216 may provide information that associates each of the classes of the classification output 210 with a particular user. For example, the verification input 216 may be generated based on at least one prior verification criterion 214 that enables the authentication association operation to label the classification output 210 to a particular user, such as comparing an image of a user to a stored user image (e.g., an image captured by the camera 196 compared to the first identification data 157 or the second identification data 167 stored in the table 194) to map the classification output 210 to a particular user. For example, the authentication association may determine that a classification output 210 value of "1" corresponds to the first user 156 and that a classification output 210 value of "2" corresponds to the second user 166, or both, and as a result the processor 190 may populate or update the table 194 accordingly.

The authentication association operation 212 results in generation of the authentication indicator 218 (e.g., the authentication 150). A control/access specifications operation 220 is responsive to the authentication indicator 218 to selectively generate a signal 222 to one or more devices or systems 224. For example, the signal 222 may be generated based on specific permissions associated with the classification output 210. In some implementations, when the classification output 210 indicates that the feature data 206 does not correspond to any classified user, the signal 222 may indicate a default authorization or permission, or the signal 222 may not be generated if no access is provided to non-authenticated users. The signal 222 may include a detected keyword, a voice command, the input audio data, one or more other sets of data, or any combination thereof. The one or more devices or systems 224 may be components within a same device that includes the dynamic classifier (e.g., a component of the device 102, such as a keyword detector or automatic speech recognition (ASR) engine), or may be external to the device (e.g., the second device 160).

Dynamic classification, such as described with reference to the dynamic classifier 140 of FIG. 1 and the dynamic classifier 208 of FIG. 2, enables discrimination using the extracted feature data to actively respond and adapt to various conditions, such as: environmental conditions in highly nonstationary situations; changes in user speech characteristics over time; and noise floor, bias, and sensitivities of microphones across the frequency spectrum. Dynamic classification enables adaptive feature mapping that is capable of responding to such variations. As a result, a number of speech samples to be provided by a user to be accurately authenticated may be reduced as compared to conventional systems.

Figure 3:
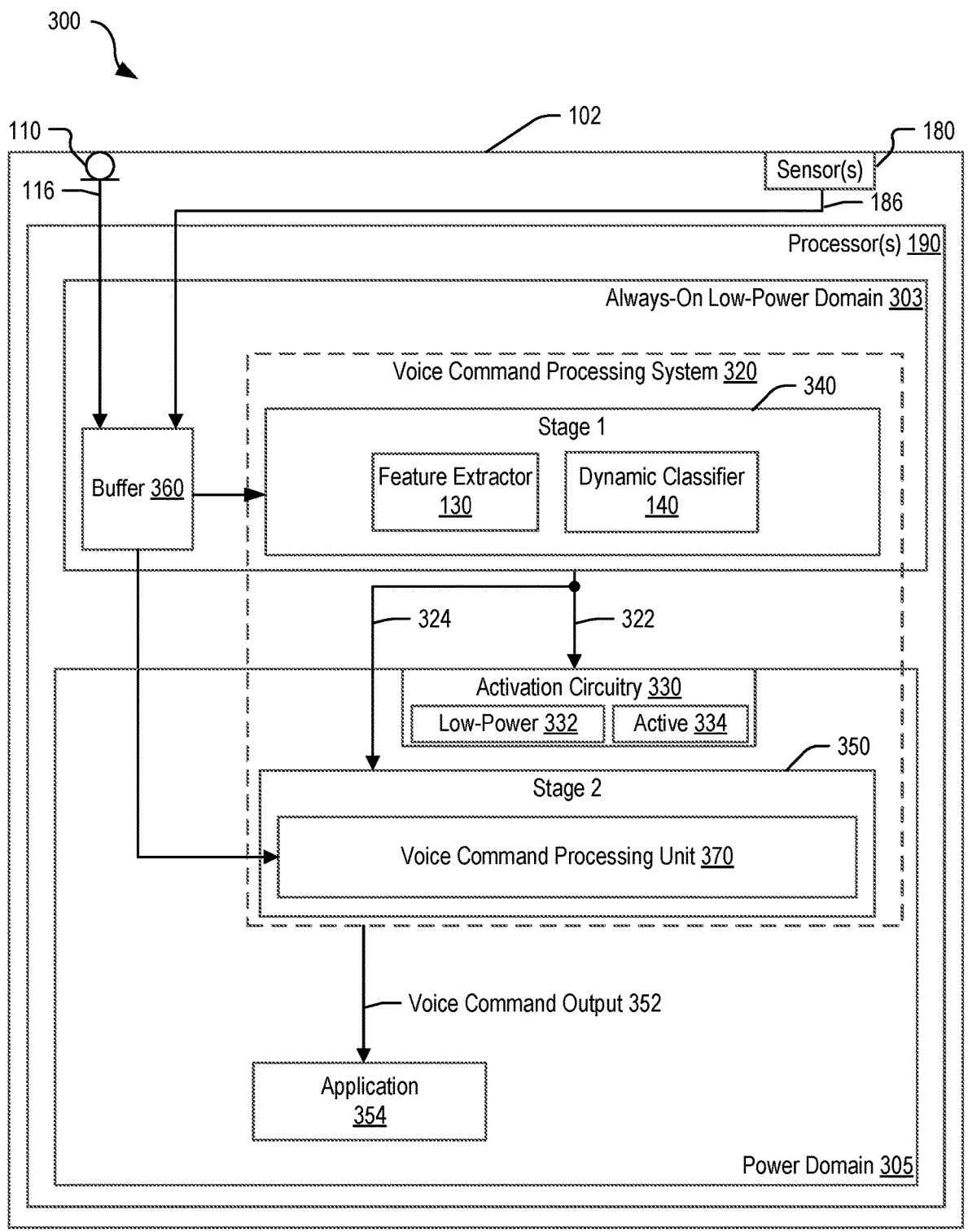
FIG. 3 is a block diagram of an illustrative aspect of a system operable to activate one or more device components using a dynamic classifier, in accordance with some examples of the present disclosure.

FIG. 3 is a block diagram of an illustrative aspect of a system 300 operable to control device operation based on a dynamic classifier, in accordance with some examples of the present disclosure, in which the processor 190 includes an always-on power domain 303 and a second power domain 305, such as an on-demand power domain. In some implementations, a first stage 340 of a multi-stage system, illustrated as a voice command processing system 320, and a buffer 360 are configured to operate in an always-on mode, and a second stage 350 of the multi-stage system (e.g., the voice command processing system 320) is configured to operate in an on-demand mode.

The always-on power domain 303 includes the buffer 360, the feature extractor 130, and the dynamic classifier 140. The buffer 360 is configured to store the audio data samples 116 and the data samples 186 to be accessible for processing by components of the voice command processing system 320.

The second power domain 305 includes a voice command processing unit 370 in the second stage 350 of the voice command processing system 320 and also includes activation circuitry 330. In some implementations, the voice command processing unit 370 is configured to perform the voice command processing operation 152 of FIG. 1.

The first stage 340 of the voice command processing system 320 is configured to activate the second stage 350 based on a classification output of the dynamic classifier 140. In an example, the first stage 340 of the voice command processing system 320 is configured to generate at least one of a wakeup signal 322 or an interrupt 324 to initiate the voice command processing operation 152 at the voice command processing unit 370 in response to the classification output of the dynamic classifier 140 indicating that the audio data samples 116, the data samples 186, or both, correspond to an authorized user. In an example, the wakeup signal 322 is configured to transition the second power domain 305 from a low-power mode 332 to an active mode 334 to activate the voice command processing unit 370. In some implementations, the wakeup signal 322, the interrupt 324, or both, correspond to the signal 222 of FIG. 2.

For example, the activation circuitry 330 may include or be coupled to power management circuitry, clock circuitry, head switch or foot switch circuitry, buffer control circuitry, or any combination thereof. The activation circuitry 330 may be configured to initiate powering-on of the second stage 350, such as by selectively applying or raising a voltage of a power supply of the second stage 350, of the second power domain 305, or both. As another example, the activation circuitry 330 may be configured to selectively gate or un-gate a clock signal to the second stage 350, such as to prevent or enable circuit operation without removing a power supply.

A voice command output 352 generated by the second stage 350 of the voice command processing system 320 is provided to an application 354. The application 354 may be configured to perform one or more operations based on the detected voice command. To illustrate, the application 354 may correspond to a voice interface application, an integrated assistant application, a vehicle navigation and entertainment application, or a home automation system, as illustrative, non-limiting examples.

By selectively activating the second stage 350 based on a result of processing audio data samples at the dynamic classifier 140 in the first stage 340 of the voice command processing system 320, overall power consumption associated with user authentication, voice command processing, or both, may be reduced.

FIG. 4 is a diagram of an illustrative aspect of operation of components of the system of FIG. 1, in accordance with some examples of the present disclosure. The feature extractor 130 is configured to receive a sequence 410 of audio data samples, such as a sequence of successively captured frames of the audio data sample 116, illustrated as a first frame (F1) 412, a second frame (F2) 414, and one or more additional frames including an Nth frame (FN) 416 (where N is an integer greater than two). The feature extractor 130 is configured to output a sequence 420 of sets of feature data including a first set 422, a second set 424, and one or more additional sets including an Nth set 426.

The dynamic classifier 140 is configured to receive the sequence 420 of sets of feature data and to adaptively cluster each set (e.g., the second set 424) of the sequence 420 at least partially based on a prior set (e.g., the first set 422) of feature data in the sequence 420. As illustrative, non-limiting examples, the dynamic classifier 140 may be implemented as a temporal Kohonen map or a recurrent self-organizing map.

During operation, the feature extractor 130 processes the first frame 412 to generate the first set 422 of feature data, and the dynamic classifier 140 processes the first set 422 of feature data to generate a first classification output (C1) 432 of a sequence 430 of classification outputs. The feature extractor 130 processes the second frame 414 to generate the second set 424 of feature data, and the dynamic classifier 140 processes the second set 424 of feature data to generate a second classification output (C2) 434 based on the second set 424 of feature data and at least partially based on the first set 422 of feature data. Such processing continues, including the feature extractor 130 processing the Nth frame 416 to generate the Nth set 426 of feature data, and the dynamic classifier 140 processing the Nth set 426 of feature data to generate an Nth classification output (CN) 436. The Nth classification output 436 is based on the Nth set 426 of feature data and at least partially based on one or more of the previous sets of feature data of the sequence 420.

By dynamically classifying based on one or more prior sets of feature data, accuracy of classification by the dynamic classifier 140 may be improved for speech signals that may span multiple frames of audio data.

Figure 5:
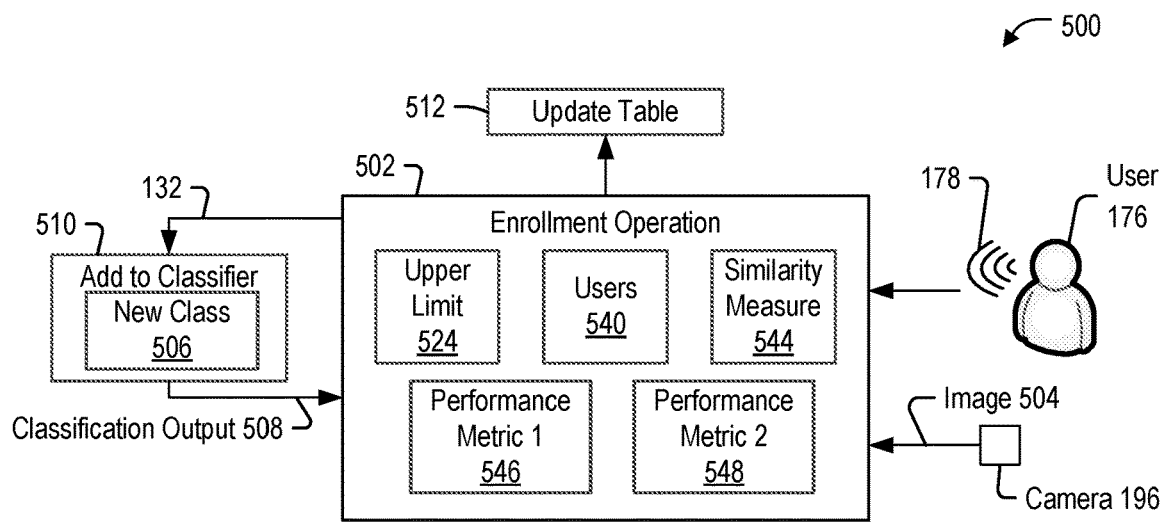
FIG. 5 is a diagram of a particular illustrative aspect of a system in which various device operations are controlled using a dynamic classifier, in accordance with some examples of the present disclosure.

FIG. 5 depicts an implementation 500 of operations that may be performed by the processor 190 of the device 102, in accordance with some examples of the present disclosure. The user 176 may be enrolled as a new user via an enrollment operation 502. Speech (e.g., the utterance 178) of the user 176 is received and processed (e.g., via the microphone 110, the input interface 114, and the feature extractor 130) and processed at the dynamic classifier 140. Based on the result of processing at the dynamic classifier 140, the enrollment operation 502 determines whether to enroll the user 176 as a new user.

In some implementations, the enrollment operation 502 includes determining whether to update the dynamic classifier 140 to enroll the user 176 as a new user at least partially based on a similarity measure 544 between a feature vector corresponding to speech (e.g., the utterance 178) of the new user 176 and existing nodes of the dynamic classifier 140. For example, if the similarity measure 544 indicates that the feature vector corresponding to the speech (e.g., the utterance 178) does not satisfy a similarity threshold, a determination is made to enroll the user 176 as a new user. Alternatively, or in addition, in some implementations, the enrollment operation 502 includes determining whether to update the dynamic classifier 140 to enroll the user 176 as a new user at least partially based on a comparison of a first performance metric 546 to a second performance metric 548. The first performance metric 546 corresponds to a performance of the dynamic classifier 140 without enrolling the user 176 as a new user (e.g., by matching the user 176 to an existing class), and the second performance metric 548 corresponds to a performance of the dynamic classifier 140 if the dynamic classifier 140 were to be updated to include the user 176 as a new user. In an illustrative example, the first performance metric 546 and the second performance metric 548 correspond to entropy metrics.

In response to determining to enroll the user 176 as a new user, the feature data 132 is provided to the dynamic classifier 140 in conjunction with an add to classifier operation 510. The dynamic classifier 140 processes the feature data 132 to associate the feature data 132 with a new class 506, and generates a classification output 508 associated with the new class 506. An update table operation 512 is performed to associate the classification output 508 with additional data corresponding to the user 176, such as by storing the classification output 508 (e.g., a class indicator), a set of permissions associated with the user 176, an indication of the user 176, and identification data corresponding to the user 176, such as an image data 504, as a new row in the table 194.

In some implementations, the enrollment operation 502 enforces an upper limit 524 on a number of the users 540 that are distinguishable by the dynamic classifier 140. In some implementations, when adding the user 176 causes the number of users 540 to exceed the upper limit 524, an existing user is removed. For example, a particular user may be selected to be removed based on how frequently the particular user has interacted with the device 102, how much time has elapsed since the particular user's most recent interaction with the device 102, one or more performance metrics associated with removing the particular user as compared to performance metrics associated with removing other users, or a combination thereof.

In some implementations, the processor 190 may be configured to determine whether to update the dynamic classifier 140 to remove a particular user of the multiple users 540 at least partially based on comparing a performance metric, corresponding to the dynamic classifier 140 without removing the particular user, to another performance metric corresponding to the dynamic classifier 140 being updated to remove the particular user.

Figure 6:
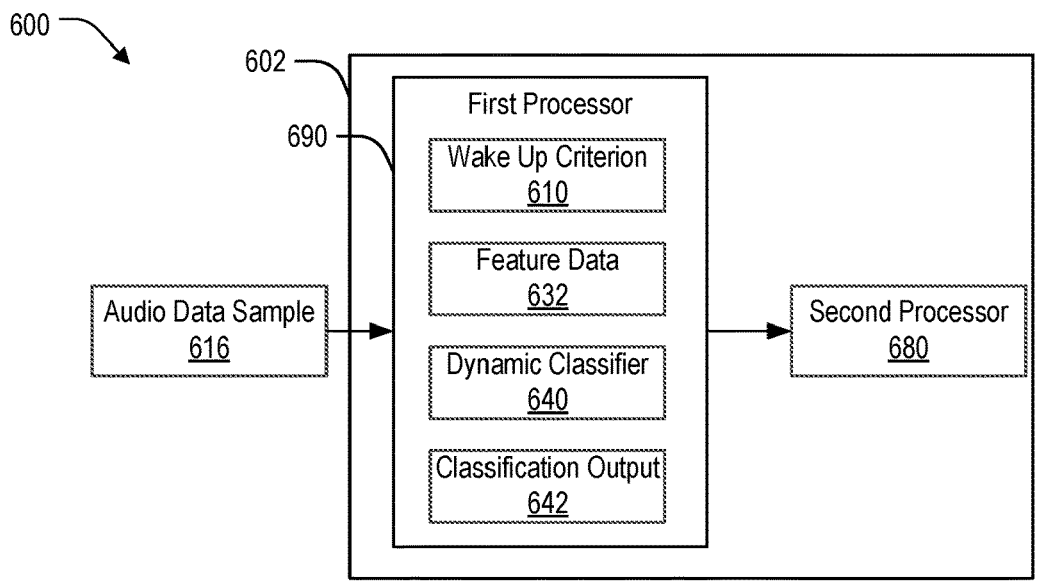
FIG. 6 is a block diagram of a particular illustrative aspect of a system operable to control processor activation using a dynamic classifier, in accordance with some examples of the present disclosure.

FIG. 6 depicts an implementation of a system 600 in accordance with some examples of the present disclosure. The system 600 includes a device 602 that includes a first processor 690 and a second processor 680. The first processor 690 includes a dynamic classifier 640 and is coupled to the second processor 680. In some implementations, the first processor 690 and the second processor 680 correspond to the processors 190 of FIG. 1, and the dynamic classifier 640 corresponds to the dynamic classifier 140.

The first processor 690 is configured to receive one or more audio data samples 616, such as the audio data sample 116 of FIG. 1, and to provide the audio data sample 616 to the dynamic classifier 640. The first processor 690 is configured to generate feature data 632, such as pitch data and formant data, that corresponds to received audio data sample 616. To illustrate, the first processor 690 may include a feature extractor, such as the feature extractor 130 of FIG. 1, or the dynamic classifier 640 may be configured to extract the feature data 632 during processing of the audio data sample 616. The dynamic classifier 640 is configured to generate a classification output 642 corresponding to the audio data sample 616.

The second processor 680 is configured to transition to an active state responsive to the classification output 642 satisfying a wakeup criterion 610. For example, the second processor 680 may include activation circuitry responsive to a wakeup signal or an interrupt from the first processor 690, such as described with reference to the voice command processing unit 370 of FIG. 3. In some implementations, the dynamic classifier 640 is configured to distinguish between multiple audio sources, such as to distinguish between speech (e.g., an utterance of a user) and non-speech audio, and the wakeup criterion 610 includes the classification output 642 corresponding to detected speech. In some implementations, the wakeup criterion 610 includes the classification output 642 corresponding to a class associated with an authorized user.

In some implementations, the wakeup criterion 610 is independent of the presence of a keyword in the received audio data sample 616. For example, the second processor 680 may transition to the active state responsive to classification output 642 indicating that the audio data sample 616 corresponds to speech, or speech of an authorized user, without performing keyword detection on the audio data sample 616.

Omitting keyword detection as a criterion for activating the second processor 680 enables reduction in power consumption and complexity associated with performing keyword detection in the first processor 690, while spurious activations of the second processor 680 may be reduced or eliminated by using the wakeup criterion 610 (e.g., when the classification output 642 indicates speech is detected, or speech from an authorized user is detected). Use of the dynamic classifier 640 to process the audio data sample 616 may therefore reduce complexity, processing resources, and power consumption in the first processor 690, and may improve performance, as compared to traditional always-on wake-up audio processing systems.

Figure 7:
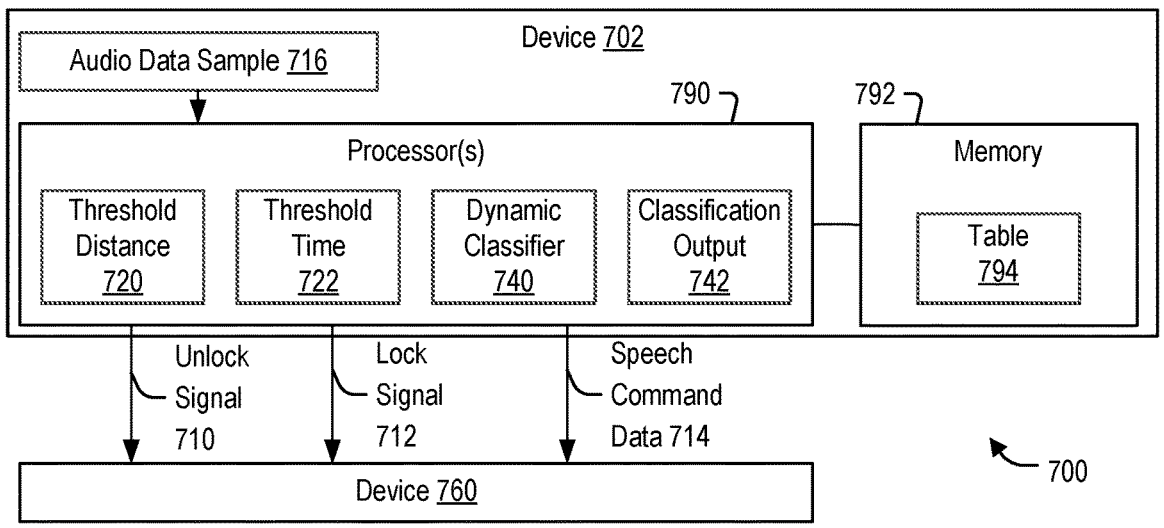
FIG. 7 is a block diagram of a particular illustrative aspect of a system operable to control access to a device using a dynamic classifier, in accordance with some examples of the present disclosure.

FIG. 7 depicts an implementation of a system 700 in accordance with some examples of the present disclosure. The system 700 includes a device 702 that is coupled to a device 760. The device 702 includes one or more processors 790 that include a dynamic classifier 740 and that are coupled to a memory 792. In some implementations, the one or more processors 790 correspond to the one or more processors 190 of FIG. 1, the memory 792 corresponds to the memory 192, the dynamic classifier 740 corresponds to the dynamic classifier 140, and the device 760 corresponds to the device 160. The memory 792 includes a table 794 that associates classification outputs of the dynamic classifier 740 to one or more access permissions associated with the device 760, such as the table 194 of FIG. 1.

The processor 790 is configured to receive one or more audio data samples 716, such as the audio data sample 116 of FIG. 1, and to provide the audio data sample 716 to the dynamic classifier 740. The processor 790 may be configured to generate feature data that corresponds to received audio data sample 716. To illustrate, the processor 790 may include a feature extractor, such as the feature extractor 130 of FIG. 1, or the dynamic classifier 740 may be configured to extract feature data during processing of the audio data sample 716. The dynamic classifier 740 is configured to generate a classification output 742 corresponding to the audio data sample 716.

The processor 790 is configured to selectively access the device 760 based on the classification output 742. In some implementations, selectively accessing the device 760 includes sending a first signal ("unlock signal") 710 to unlock access to the device 760 in response to the classification output 742 corresponding to a class that is authorized to access the device 760. In some implementations, selectively accessing the device 760 includes sending a second signal ("lock signal") 712 to lock access to the device 760 in response to the classification output 742 corresponding to a class that is not authorized to access the device 760. In some implementations, selectively accessing the device 760 includes sending data ("speech command data") 714 indicative of a speech command associated with the audio data sample 716 to the device 760 in response to the classification output 742 corresponding to a class authorized to access the device 760.

In some implementations, the device 760 is coupled to the processor 790 via a bus or other wired connection. In other implementations, the system 700 also includes a modem coupled to the processor 790, and the processor 790 selectively accesses the device 760 via wireless transmission, via the modem, of a signal to the device 760. To illustrate, the processor 790 may transmit the unlock signal 710, the lock signal 712, the speech command data 714, or a combination thereof, to the device 760 via a modem.

In some implementations, the dynamic classifier 740 is configured to distinguish between multiple users at least partially based on speech characteristics to generate the classification output 742. In some examples, the dynamic classifier 740 is configured to distinguish between speech originating from a source within a threshold distance 720 from the device 702 and speech originating from a source beyond the threshold distance 720 from the device 702. The processor 790 may be configured to deny access to the device 760 based on the source being beyond the threshold distance 720 from the device 702. For example, the threshold distance 720 may be set at an appropriate distance to prevent the speech of nearby people (e.g., as opposed to an immediate user of the device 702) from activating the device 760, or to enhance the security of the device 760, the security of the user of the device 760, or both, by preventing the device 760 from being accessed when another person is in the immediate vicinity of the user of the device 702.

In some implementations, the processor 790 is configured to deny access to the device 760 based on detection of speech from a second person within a threshold time duration 722 of detection of speech from a first person that is authorized to access the device 760. For example, security of the device 760, security of the authorized user of the device 760 (e.g., when attempting to access a bank account), or both, may be enhanced by preventing or limiting operation of the device 760 when another person's voice is detected within a specified time window of detection of the authorized user's voice.

Figure 8:
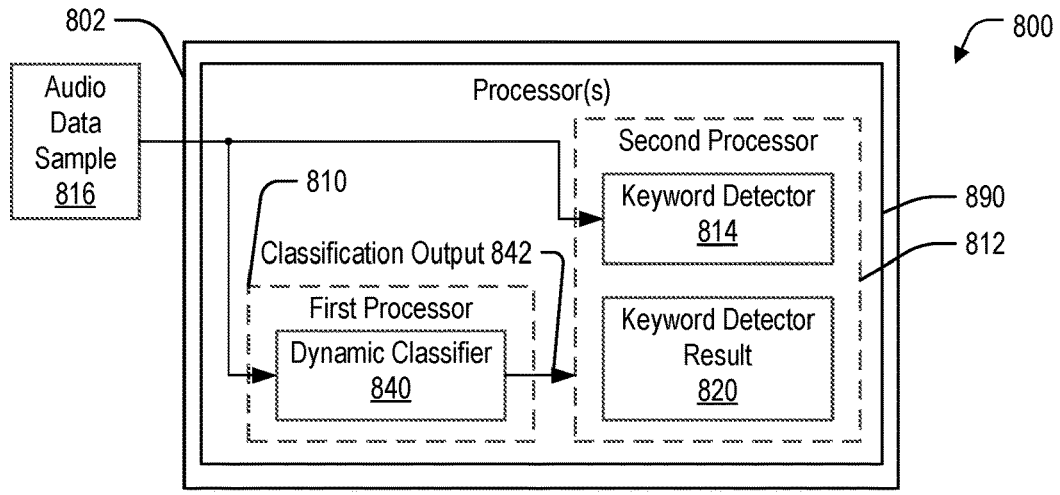
FIG. 8 is a block diagram of a particular illustrative aspect of a system operable to control activation of keyword detection using a dynamic classifier, in accordance with some examples of the present disclosure.

FIG. 8 depicts an implementation of a system 800 in accordance with some examples of the present disclosure. The system 800 includes a device 802 that includes one or more processors 890. The one or more processors 890 include a dynamic classifier 840. In some implementations, the one or more processors 890 correspond to the one or more processors 190 of FIG. 1, and the dynamic classifier 840 corresponds to the dynamic classifier 140. In some implementations, the one or more processors 890 include a first processor 810 that includes the dynamic classifier 840 and a second processor 812 that includes a keyword detector 814.

The processor 890 is configured to receive one or more audio data samples 816 associated with audio data, such as the audio data sample 116 of FIG. 1, and to provide the audio data sample 816 to the dynamic classifier 840. To illustrate, the processor 890 may include a feature extractor, such as the feature extractor 130 of FIG. 1, or the dynamic classifier 840 may be configured to extract the feature data during processing of the audio data sample 816. The dynamic classifier 840 is configured to generate a classification output 842 corresponding to the audio data sample 816.

The keyword detector 814 is configured to perform keyword detection on the audio data sample 816 based on the classification output 842 and to generate a keyword detector result 820. In some implementations, the dynamic classifier 840 is configured to distinguish between multiple users at least partially based on speech characteristics to generate the classification output 842, and the keyword detector 814 remains inactive (e.g., in a low power state) unless the classification output 842 corresponds to a class associated with an authorized user.

In some implementations, the second processor 812 is configured to transition from a low power state to an active state responsive to the classification output 842 indicating speech. For example, the second processor 812 may include activation circuitry responsive to a wakeup signal or an interrupt from the first processor 810, such as described with reference to the voice command processing unit 370 of FIG. 3. In some implementations, the dynamic classifier 840 is configured to distinguish between multiple audio sources, such as to distinguish between speech (e.g., an utterance of a user) and non-speech audio, and the first processor 810 sends the wakeup signal or interrupt to the second processor 812 in response to the classification output 842 corresponding to detected speech. In some implementations, the dynamic classifier 840 is configured to distinguish between multiple users at least partially based on speech characteristics to generate the classification output 842, and the first processor 810 sends the wakeup signal or interrupt to the second processor 812 in response to the classification output 842 corresponding to a class associated with an authorized user.

Use of the dynamic classifier 840 to process the audio data sample 816 may therefore reduce complexity, processing resources, and power consumption as compared to traditional processing systems that perform keyword detection in an always-on processing stage.

Figure 9:
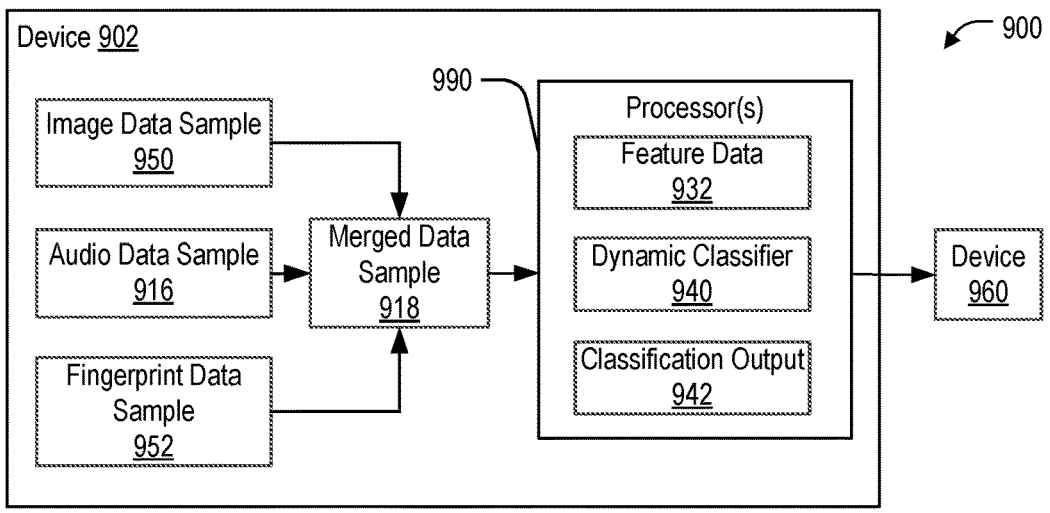
FIG. 9 is a block diagram of a particular illustrative aspect of a system in which various device operations are controlled using a dynamic classifier, in accordance with some examples of the present disclosure.

FIG. 9 depicts an implementation of a system 900 in accordance with some examples of the present disclosure. The system 900 includes a device 902 coupled to a device 960. The device 902 includes one or more processors 990 that include a dynamic classifier 940. In some implementations, the one or more processors 990 correspond to the one or more processors 190 of FIG. 1, the dynamic classifier 940 corresponds to the dynamic classifier 140, and the device 960 corresponds to the device 160.

The processor 990 is configured to receive one or more data samples associated with multimodal input, illustrated as one or more audio data samples 916, one or more image data samples 950, and one or more fingerprint data samples 952. In an implementation, the audio data sample 916 corresponds to the audio data sample 116 of FIG. 1, and the image data sample 950 and the fingerprint data sample 952 correspond to the data sample 186 of FIG. 1.

The processor 990 is configured to provide the data samples associated with the multimodal input to the dynamic classifier 940. In some implementations, the processor 990 is configured to generate feature data 932 that corresponds to the received data samples. To illustrate, the first processor 690 may include one or more feature extractors, such as the feature extractor 130 of FIG. 1, to determine features in each of the audio data sample 916 (e.g., pitch and formant), the image data sample 950 (e.g., key point detection, detection of specific body parts such as face, eyes, iris, etc.), and the fingerprint data sample 952 (e.g., fingerprint features), or the dynamic classifier 940 may be configured to extract the feature data 932 during processing of the data samples. The dynamic classifier 940 is configured to generate a classification output 942 corresponding to the data samples and to selectively authorize access to the device 960 responsive to the classification output 942.

In some implementations, the dynamic classifier 940 is configured to distinguish between multiple users at least partially based on facial characteristics to generate the classification output 942. In some implementations, the dynamic classifier 940 is configured to distinguish between multiple users at least partially based on speech characteristics to generate the classification output 942. In some implementations, the dynamic classifier 940 is configured to distinguish between multiple users at least partially based on fingerprint characteristics to generate the classification output 942.

In some implementations, the one or more data samples includes a merged data sample 918. The merged data sample 918 is configured to represent at least two of the audio data sample 916, the image data sample 950, and the fingerprint data sample 952. The dynamic classifier 940 may be configured to distinguish between multiple users based on the merged data sample 918 to generate the classification output 942.

By generating the classification output 942 based on multimodal data samples, the device 902 may authenticate users based on various criteria or combinations of criteria. For example, based on a level of permission required to access the device 960, the device 902 may require authentication based on any one of the input modes (e.g., audio, visual, or fingerprint), any two of the input modes, or all three of the input modes. As another example, use of multiple input modes enables the device 902 to establish threshold confidence in authenticating a user when the user cannot be authenticated with the threshold confidence using a single one of the input modes. For example, when the device 902 corresponds to a security system and the device 960 corresponds to a locking mechanism for a door, a user attempting to unlock the door during a thunderstorm at night may not be able to be authenticated by voice (due to wind and rain noise), by face recognition (due to low lighting and obscuring rain or mist), or by fingerprint (due to moisture on the user's fingers, on the fingerprint sensor, or both), but may be authenticated based on a combination of data samples using all three input modes.

Although the device 902 is illustrated using three input modes (image, audio, and fingerprint), in other implementations fewer than three input modes or more than three input modes may be used. Alternatively, or in addition, one or more of the image, audio, or fingerprint input modes may be replaced by one or more other input modes.

Figure 10:
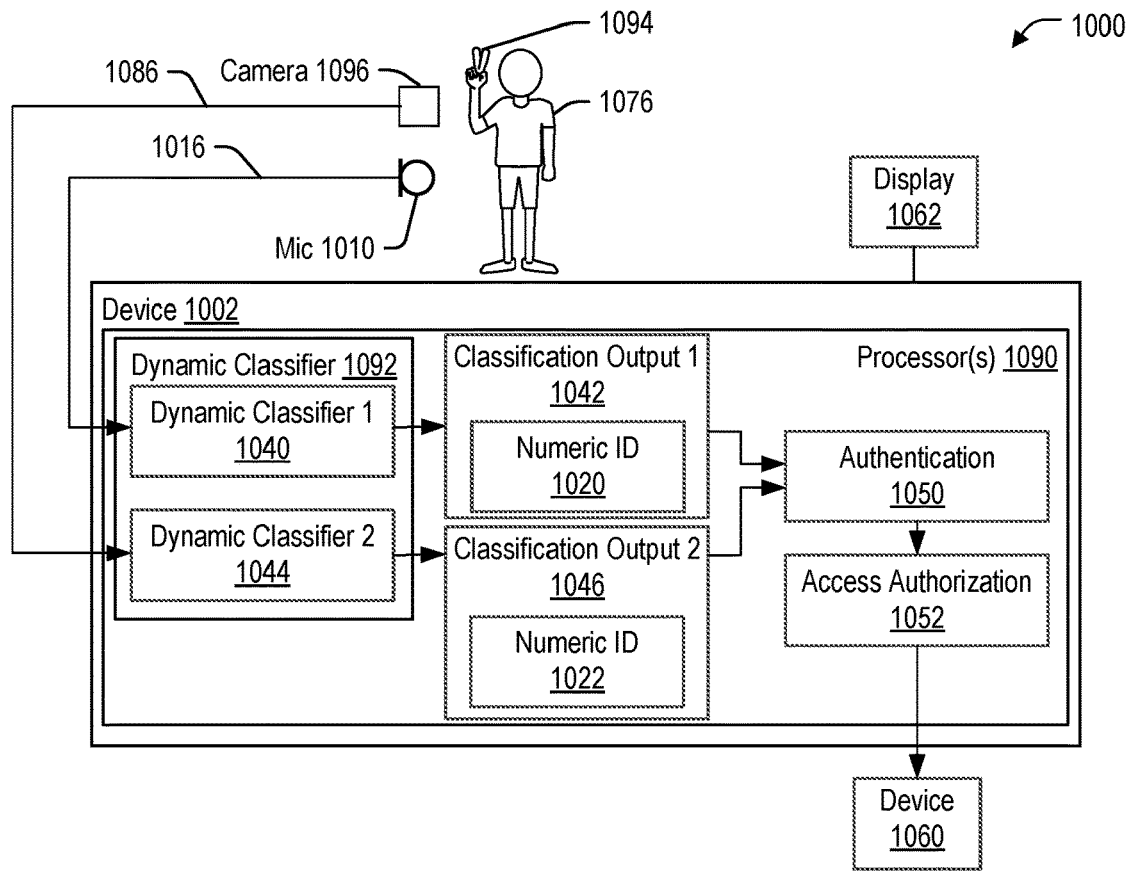
FIG. 10 is a block diagram of a particular illustrative aspect of a system in which various device operations are controlled using a dynamic classifier, in accordance with some examples of the present disclosure.

FIG. 10 depicts an implementation of a system 1000 in accordance with some examples of the present disclosure. The system 1000 includes a device 1002 that includes one or more processors 1090 coupled to a device 1060. The processor 1090 includes a dynamic classifier 1092 that includes a first dynamic classifier 1040 and a second dynamic classifier 1044. In some implementations, the processor 1090 corresponds to the processor 190 of FIG. 1, one or both of the dynamic classifiers 1040, 1044 correspond to the dynamic classifier 140, and the device 1060 corresponds to the device 160.

The processor 1090 is configured to receive one or more data samples associated with multimodal input and to provide the one or more data samples to the dynamic classifier 1092. For example, the processor 1090 receives one or more audio data samples 1016 based on audio data captured by a microphone 1010 and receives one or more non-audio data samples 1086 based on data captured by another sensor device, such as image data samples from image data captured by a camera 1096. In some implementations, the camera 1096, the microphone 1010, or both, are integrated in the device 1002. In other implementations, the camera 1096, the microphone 1010, or both, are external components that are coupled to the device 1002. The microphone 1010 may correspond to the microphone 110 of FIG. 1, and the camera 1096 may correspond to the camera 196 of FIG. 1.

The first dynamic classifier 1040 is configured to receive the audio data sample 1016 and to process the audio data sample 1016 to generate a first classification output 1042. The first dynamic classifier 1040 is configured to distinguish between classes associated with multiple users based on speech characteristics of the multiple users to generate the first classification output 1042. The first classification output 1042 indicates a numeric identifier 1020 of a particular class associated with the audio data sample 1016. For example, if the speech of a user 1076 is classified by the first dynamic classifier 1040 as class "2," the numeric identifier 1020 corresponds to "2."

The second dynamic classifier 1044 is configured to receive the non-audio data sample 1086 and to process the non-audio data sample 1086 to generate a second classification output 1046. The second classification output 1046 indicates a numeric identifier 1022 of a particular class associated with the non-audio data sample 1086. For example, if an image of the user 1076 is classified by the second dynamic classifier 1044 as class "2," the numeric identifier 1022 corresponds to "2."

As illustrated, the second dynamic classifier 1044 is configured to generate the second classification output 1046 based on a visual indication 1094 of the numeric identifier 1022 in the image data. In an illustrative example, the visual indication 1094 of the numeric identifier 1022 in the image data includes a count of extended digits of one of the users (e.g., two extended digits of a hand of the user 1076).

The processor 1090 is configured to selectively authorize access to the device 1060 responsive to at least one of the first classification output 1042 and the second classification output 1046. For example, an authentication 1050 of the user 1076 may be determined based on the numeric identifier 1020 responsive to the speech of the user 1076, based on the numeric identifier 1022 responsive to the visual indication 1094 of the user 1076, or both. Access to the device 1060 is selectively provided based on one or more access authorizations 1052 associated with the authentication 1050.

In some implementations, a display device 1062 is coupled to the processor 1090, and the processor 1090 is configured to initiate display of the numeric identifier 1020 via the display device 1062. To illustrate, upon the user 1076 being enrolled (e.g., mapped to a particular cluster in the first dynamic classifier 1040, the numeric identifier 1020 may be provided to the user 1076 via the display device. In subsequent interactions with the device 1002, the user 1076 can provide the visual indication 1094 in place or, or in addition to, providing speech. As a result, the dynamic classifier 1092 can determine the authentication 1050 based on speech of the user 1076, based on the visual indication 1094, or a combination thereof.

Figure 11:
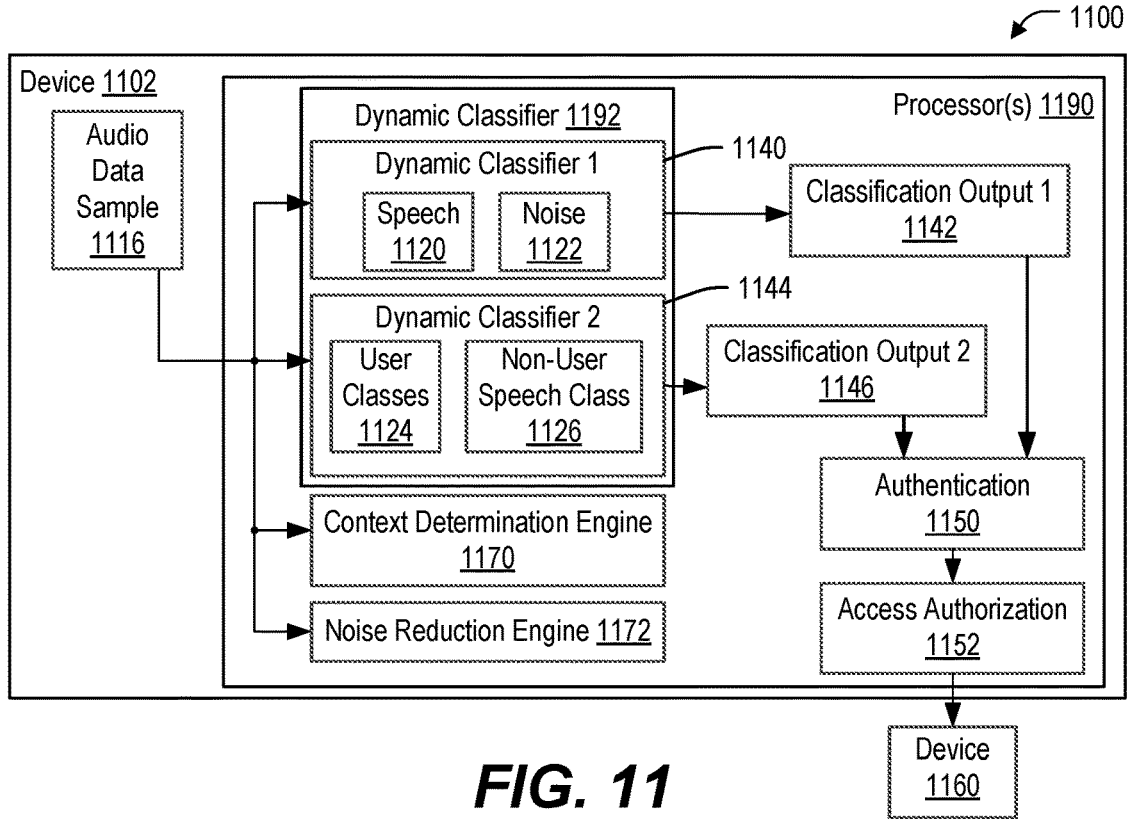
FIG. 11 is a block diagram of a particular illustrative aspect of a system in which various device operations are controlled using a dynamic classifier, in accordance with some examples of the present disclosure.

FIG. 11 depicts an implementation of a system 1100 in accordance with some examples of the present disclosure. The system 1100 includes a device 1102 that includes one or more processors 1190 and that is coupled to a device 1160. The processor 1190 includes a dynamic classifier 1192 that includes a first dynamic classifier 1140 and a second dynamic classifier 1144. In some implementations, the processor 1190 corresponds to the processor 190 of FIG. 1, one or both of the dynamic classifiers 1140, 1144 correspond to the dynamic classifier 140, and the device 1160 corresponds to the device 160.

The processor 1190 is configured to receive an audio data sample 1116 corresponding to an acoustic environment. For example, the audio data sample 1116 may be received via one or more microphones integrated in, or coupled to, the device 1102. The processor 1190 is configured to provide the audio data sample 1116 to the dynamic classifier 1192.

The dynamic classifier 1192 is configured to classify the audio data sample 1116 from among multiple classes identified by the dynamic classifier 1192. In an example, the multiple classes include one or more user classes 1124 corresponding to one or more previously classified users, a non-user speech class 1126 corresponding to speech from someone other than the one or more previously classified users, and a noise class 1122 corresponding to non-speech audio.

As illustrated, the first dynamic classifier 1140 is configured to distinguish between speech and non-speech audio by classifying the audio data sample 1116 as a speech class 1120 or the noise class 1122 to generate a first classification output 1142. For example, the first classification output 1142 may have a first value indicating that the audio data sample 1116 is classified as speech or a second value indicating that the audio data sample 1116 is classified as noise. The second dynamic classifier 1144 is configured to distinguish between multiple classes, including the one or more user classes 1124 corresponding to one or more previously classified users and a default class ("non-user speech class") 1126 corresponding to audio other than speech from the one or more previously classified users, to generate a second classification output 1146. For example, the second classification output 1146 may have one of multiple values indicating a particular one of the user classes 1124 or another value indicating the non-user speech class 1126.

In some implementations, the processor is configured to first process the audio data sample at the first dynamic classifier 1140 and to provide the audio data sample 1116 to the second dynamic classifier 1144 in response to the first dynamic classifier 1140 classifying the audio data sample as the speech class 1120. In such implementations, the dynamic classifier 1192 operates as a hierarchical classifier in which the output of a root dynamic classifier (e.g., the first dynamic classifier 1140) determines a next stage of classification (e.g., the second dynamic classifier 1144 is activated in response to the first classification output 1142 indicating the speech class 1120).

The processor 1190 is configured to selectively authorize access to the device 1160 responsive to the classification output of the dynamic classifier 1192 (e.g., responsive to at least one of the first classification output 1142 and the second classification output 1146). For example, an authentication 1150 of the user may be determined based on whether the audio data sample 1116 corresponds to speech of a particular previously classified user, speech of an unclassified person, or non-speech audio. Access to the device 1160 is selectively provided based on one or more access authorizations 1152 associated with the authentication 1150.

In some implementations, the processor 1190 is further configured to, in response to the first classification output 1142 indicating that the audio data sample 1116 corresponds to noise, identify a context associated with the audio data sample 1116. For example, the audio data sample 1116 is processed by a context determination engine 1170 that is configured to determine a context associated with the acoustic environment, such as whether the device 1102 is in a vehicle, an enclosed area, a particular room of a user's house, an office, a lobby, an elevator, outdoors, etc., based on acoustic characteristics of the audio data sample 1116.

In some implementations, the processor 1190 is further configured to, in response to the first classification output 1142 indicating that the audio data sample 1116 corresponds to noise, process audio data corresponding to the audio data sample 1116 to at least partially remove a noise component of the audio data. For example, a noise reduction engine 1172 may process the audio data sample 1116 to determine a background audio signal (e.g., a reference signal) that may be used for reducing a noise component of a speech portion of received audio data, such as via cancellation or other noise reduction techniques.

Although the dynamic classifier 1192 is illustrated as including the two classifiers 1140, 1144 that generate the respective classification outputs 1142, 1146, in other implementations the dynamic classifier 1192 includes a single classifier configured to classify the audio data sample 1116 as the noise class 1122, the non-user speech class 1126, or an identified one of the user classes 1124 in a single classification output. In other implementations, the dynamic classifier 1192 may omit the second dynamic classifier 1144 and may be configured to classify the audio data sample 1116 as one of the speech class 1120 and the noise class 1122 without further distinguishing between the various user classes 1124 and the non-user speech class 1126.

Figure 12:
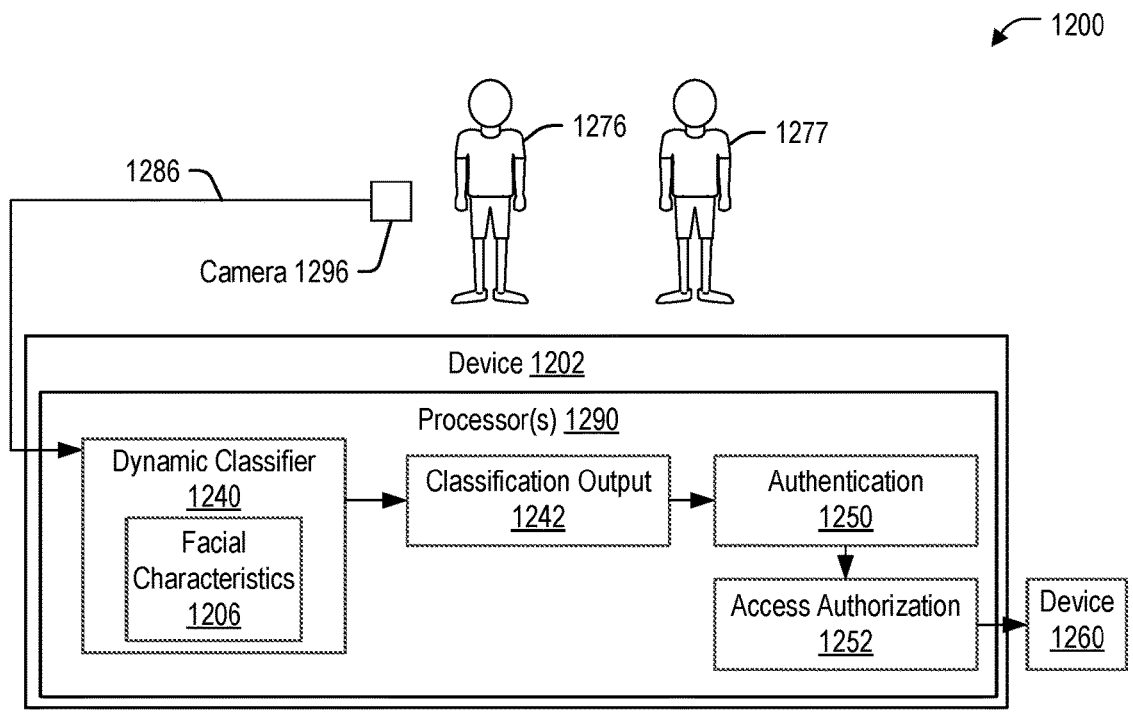
FIG. 12 is a block diagram of a particular illustrative aspect of a system in which various device operations are controlled using a dynamic classifier, in accordance with some examples of the present disclosure.

FIG. 12 depicts an implementation of a system 1200 in accordance with some examples of the present disclosure. The system 1200 includes one or more processors 1290 that include a dynamic classifier 1240 and that are coupled to a device 1260. In some implementations, the one or more processors 1290 correspond to the one or more processors 190 of FIG. 1, the dynamic classifier 1240 corresponds to the dynamic classifier 140, and the device 1260 corresponds to the device 160.

The processor 1290 is configured to receive an image data sample 1286 from image data. The processor 1290 is configured to provide the image data sample 1286 to the dynamic classifier 1240. For example, the image data sample 1286 may be received via a camera 1296 that is configured to capture the image data and that is coupled to the processor 1290. The camera 1296 may be integrated in or coupled to the device 1202. Alternatively, the image data sample 1286 may be retrieved from a storage device or via a wireless transmission (e.g., from a remote camera).

The dynamic classifier 1240 is configured to distinguish between multiple persons at least partially based on facial characteristics 1206 to generate a classification output 1242 corresponding to the image data sample 1286. For example, the dynamic classifier 1240 may be configured to process the image data sample 1286 to determine, based on the facial characteristics 1206, whether the image data sample 1286 includes a first user 1276, a second user 1277, or both the first user 1276 and the second user 1277. Although two users are illustrated, the dynamic classifier 1240 may be configured to distinguish between three users, four users, or any other number of users based on the facial characteristics 1206.

The dynamic classifier 1240 is configured to generate a classification output 1242 indicating one or more classes corresponding to user(s) detected in the image data sample 1286. The processor 1290 is configured to selectively authorize access to the device 1260 responsive to the classification output 1242. For example, an authentication 1250 of the user 1276 may be determined based on the classification output 1242, and access to the device 1260 is selectively provided based on one or more access authorizations 1252 associated with the authentication 1250.

In some implementations, the dynamic classifier 1240 is configured to indicate detection of multiple persons based on the image data sample 1286, and the processor 1290 is further configured to deny access to the device 1260 in response to the dynamic classifier 1240 indicating detection of multiple persons. For example, when the device 1202 corresponds to a security system and the device 1260 corresponds to a locking mechanism for a door, a first user 1276 attempting to unlock the door via facial recognition may be denied entry due to detection of a second person (e.g., the second user 1277) in proximity to the first user 1276. In some implementations, the processor 1290 may deny access to the device 1260 unless all people detected in the image data sample 1286 are determined by the dynamic classifier 1240 as being previously classified users, and the processor 1290 determines that each of the detected users has appropriate authorization to access the device 1260 (e.g., to unlock a door and allow entry to a building or vehicle, as illustrative, non-limiting examples).

Figure 13:
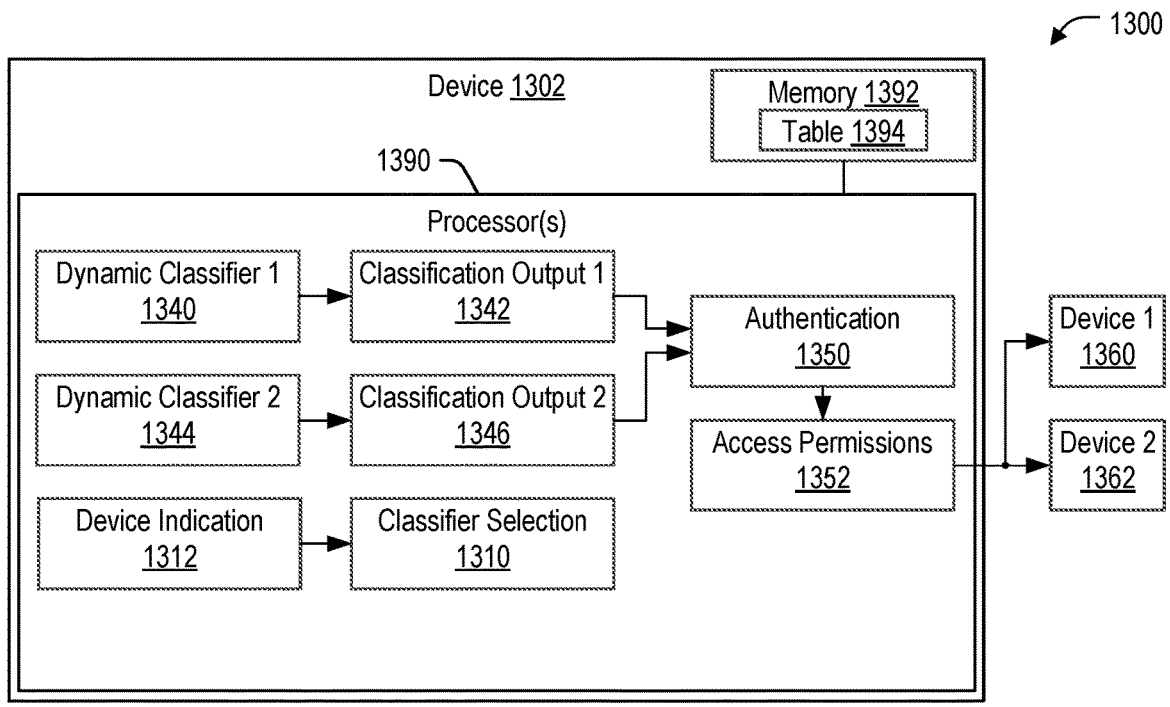
FIG. 13 is a block diagram of a particular illustrative aspect of a system in which various device operations are controlled using a dynamic classifier, in accordance with some examples of the present disclosure.

FIG. 13 depicts an implementation of a system 1300 in accordance with some examples of the present disclosure. The system 1300 includes a device 1302 that includes one or more processors 1390 coupled to a memory 1392. The processor 1390 includes a first dynamic classifier 1340 and a second dynamic classifier 1344. The processor 1390 is coupled to multiple devices including a first device 1360 and a second device 1362. In some implementations, the processor 1390 corresponds to the processor 190 of FIG. 1, the memory 1392 corresponds to the memory 192, one or both of the dynamic classifiers 1340, 1344 correspond to the dynamic classifier 140, and one or both of the devices 1360, 1362 correspond to the device 160.

Each of the dynamic classifiers 1340, 1344 corresponds to an authentication network for a respective device of the multiple devices 1360, 1362. In an example, the first dynamic classifier 1340 corresponds to an authentication network for the first device 1360, and the second dynamic classifier 1344 corresponds to an authentication network for the second device 1362. To illustrate, the first dynamic classifier 1340 may be configured to distinguish between a first set of users previously classified with respect to accessing the first device 1360 to generate a first classification output 1342, and the second dynamic classifier 1344 may be configured to distinguish between a second set of users, which may match the first set of users or may differ from the first set of users, that were previously classified with respect to accessing the second device 1362 to generate a second classification output 1346. The first dynamic classifier 1340 and the second dynamic classifier 1344 may be configured to process audio data samples, image data samples, one or more other types of data (e.g., fingerprint data), or any combination thereof.

The processor 1390 is configured to determine an authentication 1350 based on one or more of the classification outputs 1342, 1346 and to determine one or more access permissions 1352 based on the authentication 1350. In an example, the processor 1390 is configured to access a table 1394 at the memory 1392 that associates classification outputs of the dynamic classifiers 1340, 1344 to one or more access permissions associated with a particular device of the devices 1360, 1362. In a particular implementation, the table 1394 corresponds to the table 194 of FIG. 1.

In some implementations, at least one of the one or more access permissions 1352 is time-dependent. For example, one or both of the devices 1360, 1362 may correspond to components of a home entertainment system (e.g., a television, a stereo system, a gaming console, etc.), and the table 1394 may indicate access permissions for one or more users based on a time of day. To illustrate, the device 1302 may be implemented in a controller for a home automation system in which children in the home are permitted to access the devices 1360, 1362 during a specified time window, or for specified durations, or both, while adults have unrestricted access to the devices 1360, 1362.

In some implementations, the processor 1390 is configured to provide a received data sample to each of the dynamic classifiers 1340, 1344 concurrently to generate the classification outputs 1342, 1346 in parallel. In other implementations, the processor 1390 is configured to select a particular dynamic classifier 1340 or 1344 based on a user indication to access a particular device 1360 or 1362. To illustrate, audio data samples may be processed to generate a device indication 1312, such as an output of an automated speech recognition engine processing a spoken request to access the second device 1362, and in response, the processor 1390 generates a classifier selection 1310 indicating the second dynamic classifier 1344 that functions as an authentication network for the second device 1362.

In some implementations, the first dynamic classifier 1340 is configured to output a first bit flag (e.g., a "0" or "1" value) indicating whether a received data sample corresponds to a class (e.g., a particular user) that is authorized to access first device 1360, and the second dynamic classifier 1344 is configured to generate a second bit flag indicating whether the received data sample corresponds to a class that is authorized to access the second device 1362. In some implementations, the first dynamic classifier 1340 is configured to output a first bit vector (e.g., a series of "0" or "1" values), with each bit corresponding to a respective access/control permission for a particular operation at the first device 1360. If any of the bits of the first bit vector has a "1" value, indicating that a received data sample corresponds to a class that is permitted to perform at least one operation at the first device 1360, the device 1302 sends the first bit vector to the first device 1360, and the first device 1360 enables (e.g., unlocks) appropriate command lines based on the permissions indicated by the first bit vector. Similarly, the second dynamic classifier 1344 is configured to generate a second bit vector corresponding to access/control permissions for operations at the second device 1362, the device 1302 sends non-zero bit vectors to the second device 1362, and the second device 1362 enables (e.g., unlocks) appropriate command lines based on the permissions indicated by the second bit vector. In such implementations, the respective bit flags or bit vectors that are output as the classification outputs 1342 and 1346 may directly function as both the authentication 1350 and the access permissions 1352, and the table 1394 may therefore be bypassed or omitted.

Figure 14:
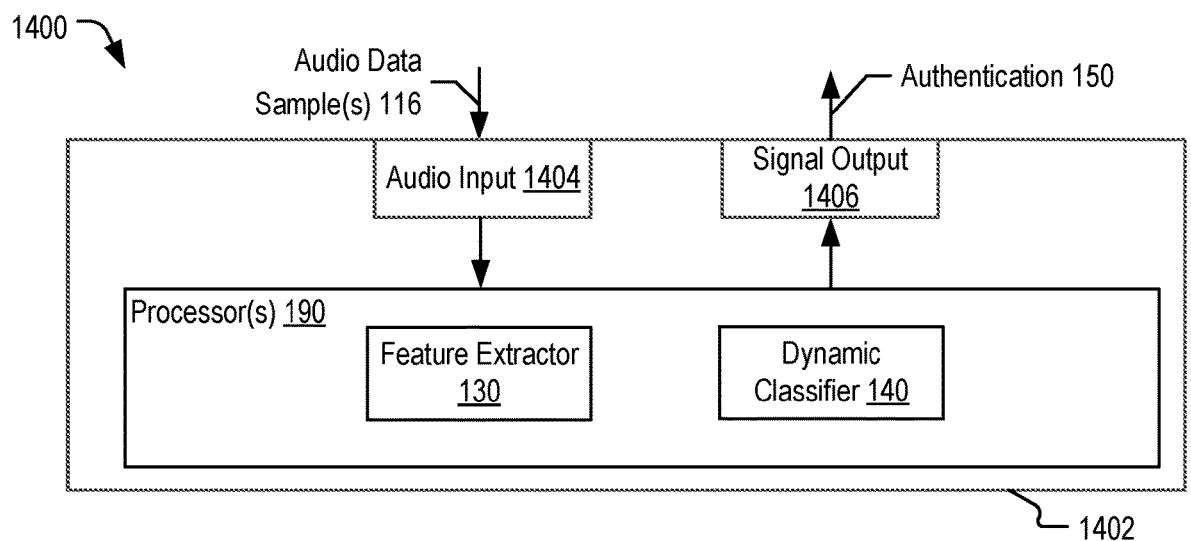
FIG. 14 illustrates an example of an integrated circuit that includes a feature extractor and a dynamic classifier, in accordance with some examples of the present disclosure.
Figure 18:
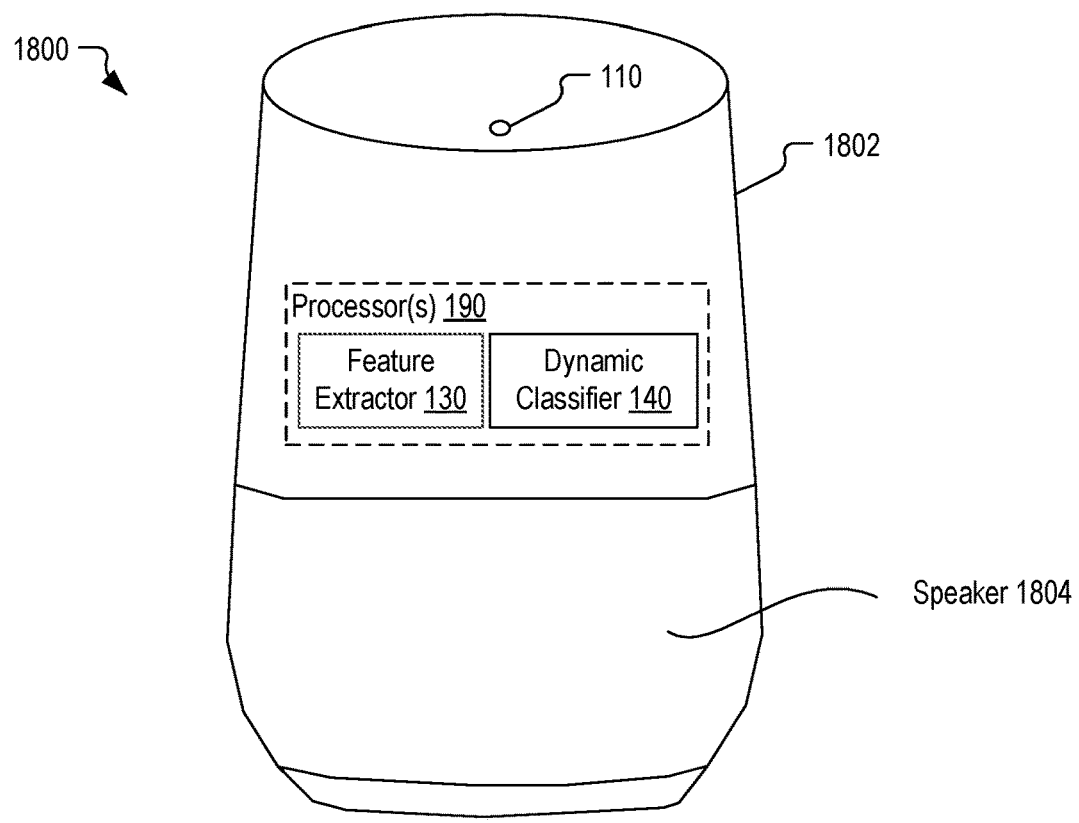
FIG. 18 is a diagram of a voice-controlled speaker system that includes a feature extractor and a dynamic classifier, in accordance with some examples of the present disclosure.
Figure 19:
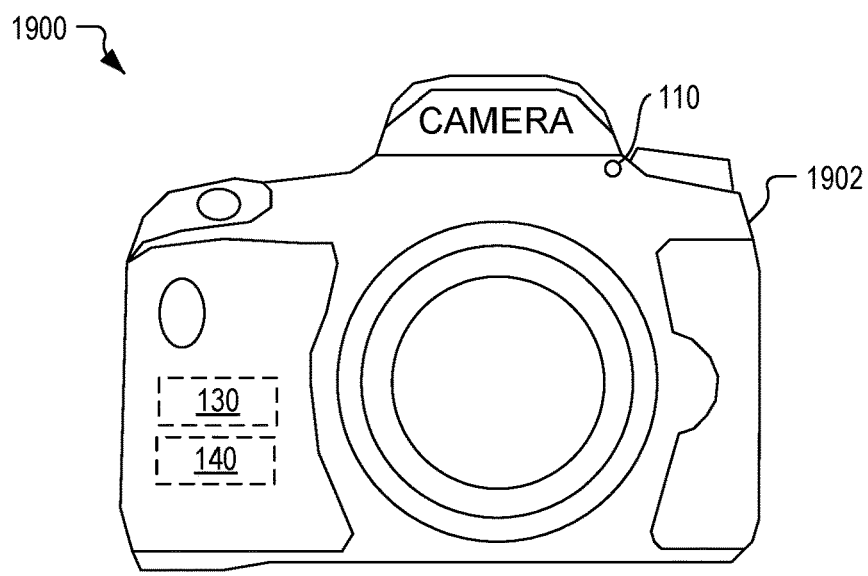
FIG. 19 is a diagram of a camera that includes a feature extractor and a dynamic classifier, in accordance with some examples of the present disclosure.
Figure 20:
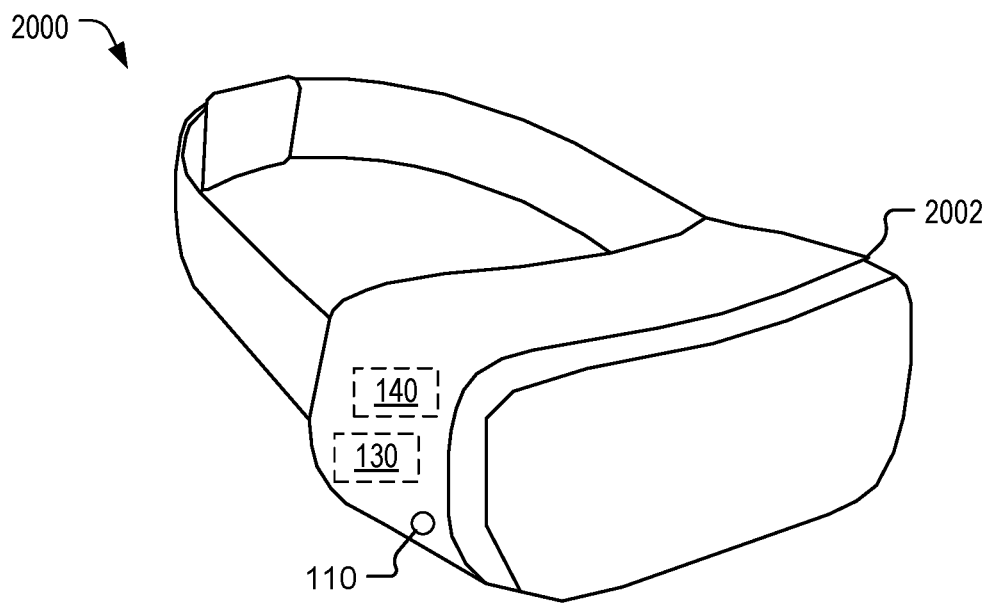
FIG. 20 is a diagram of a headset, such as a virtual reality or augmented reality headset, that includes a feature extractor and a dynamic classifier, in accordance with some examples of the present disclosure.
Figure 21:
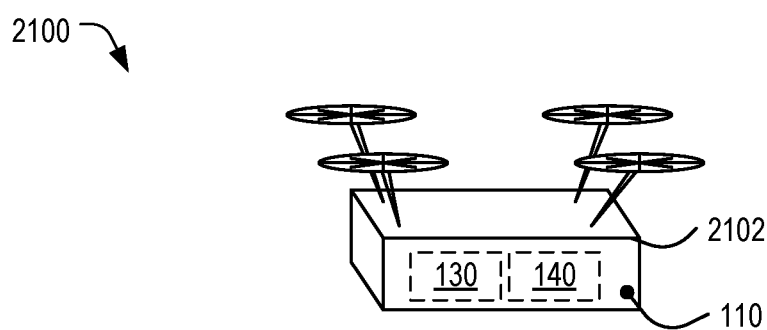
FIG. 21 is a diagram of a first example of a vehicle that includes a feature extractor and a dynamic classifier, in accordance with some examples of the present disclosure.
Figure 22:
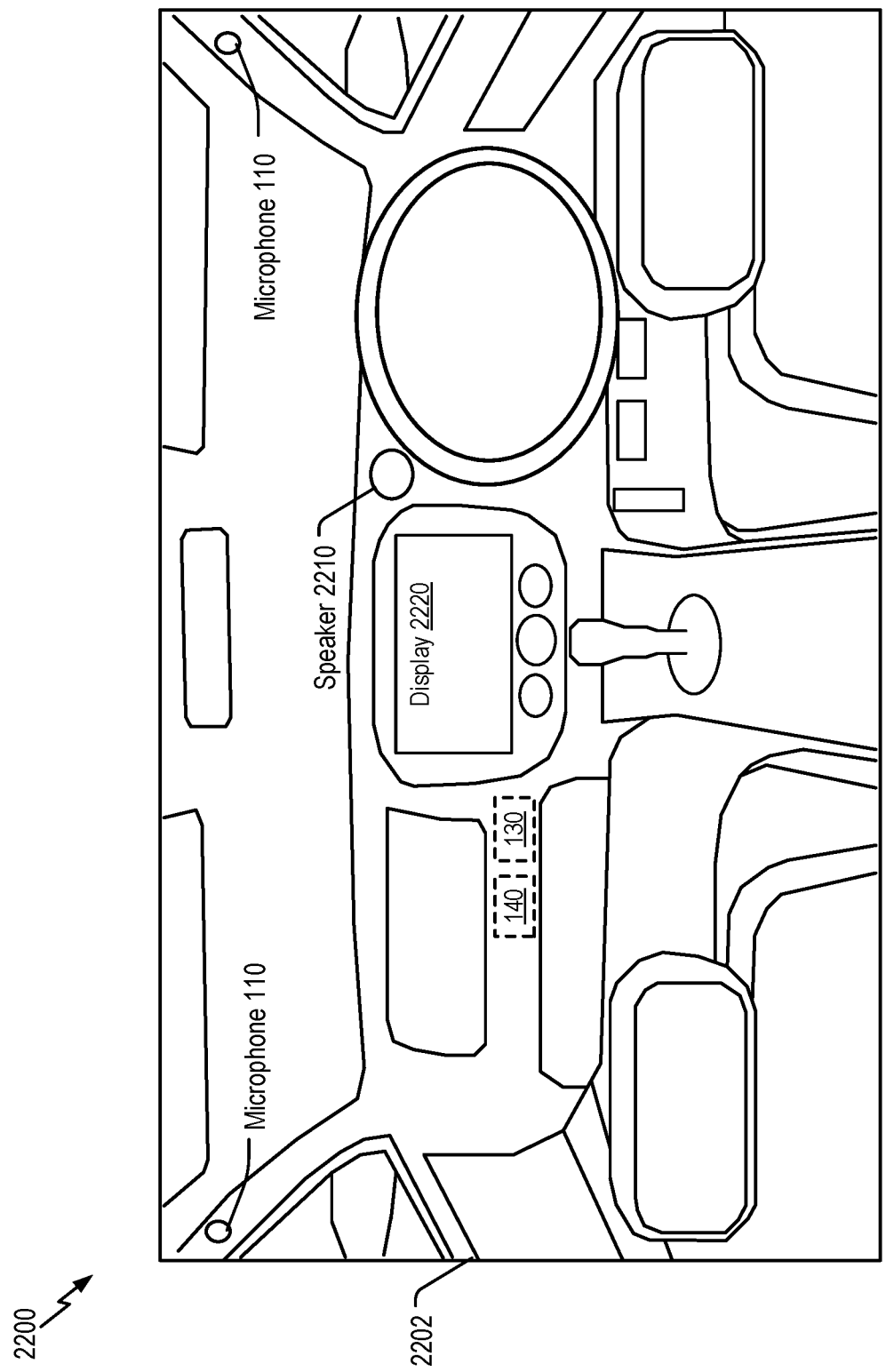
FIG. 22 is a diagram of a second example of a vehicle that includes a feature extractor and a dynamic classifier, in accordance with some examples of the present disclosure.

FIG. 14 depicts an implementation 1400 of the device 102 as an integrated circuit 1402 that includes the one or more processors 190. The integrated circuit 1402 also includes an audio input 1404, such as one or more bus interfaces, to enable the audio data sample 116 to be received for processing. The integrated circuit 1402 also includes a signal output 1406, such as a bus interface, to enable sending of an output signal, such as the authentication 1150. The integrated circuit 1402 enables implementation of dynamic classifier-based authentication as a component in a system that includes microphones, such as a mobile phone or tablet as depicted in FIG. 15, a headset as depicted in FIG. 16, a wearable electronic device as depicted in FIG. 17, a voice-controlled speaker system as depicted in FIG. 18, a camera as depicted in FIG. 19, a virtual reality headset, a mixed reality headset, or an augmented reality headset as depicted in FIG. 20, or a vehicle as depicted in FIG. 21 or FIG. 22.

Figure 15:
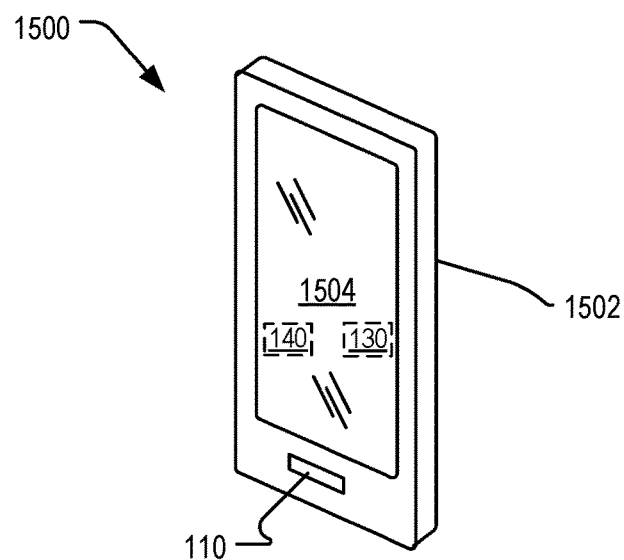
FIG. 15 is a diagram of a mobile device that includes a feature extractor and a dynamic classifier, in accordance with some examples of the present disclosure.

FIG. 15 depicts an implementation 1500 in which the device 102 is a mobile device 1502, such as a phone or tablet, as illustrative, non-limiting examples. The mobile device 1502 includes the microphone 110 and a display screen 1504. Components of the processor 190, including the feature extractor 130 and the dynamic classifier 140, are integrated in the mobile device 1502 and are illustrated using dashed lines to indicate internal components that are not generally visible to a user of the mobile device 1502. In a particular example, the feature extractor 130 and the dynamic classifier 140 operate to perform user authentication, which is then used to selectively enable performance of one or more operations at the mobile device 1502, such as to launch a graphical user interface or otherwise display other information associated with the user's speech at the display screen 1504 (e.g., via an integrated "smart assistant" application).

Figure 16:
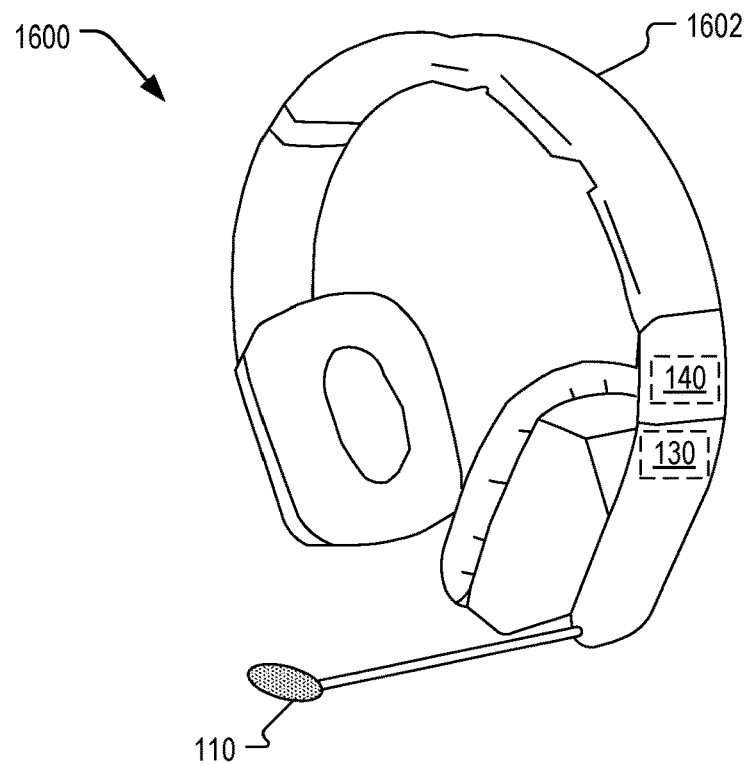
FIG. 16 is a diagram of a headset that includes a feature extractor and a dynamic classifier, in accordance with some examples of the present disclosure.

FIG. 16 depicts an implementation 1600 in which the device 102 is a headset device 1602. The headset device 1602 includes the microphone 110 positioned to primarily capture speech of a user. Components of the processor 190, including the feature extractor 130 and the dynamic classifier 140, are integrated in the headset device 1602. In a particular example, the feature extractor 130 and the dynamic classifier 140 operate to perform user authentication, which may cause the headset device 1602 to perform one or more operations at the headset device 1602, to transmit audio data corresponding to user speech to a second device (not shown), such as the second device 160 of FIG. 1, for further processing, or a combination thereof.

Figure 17:
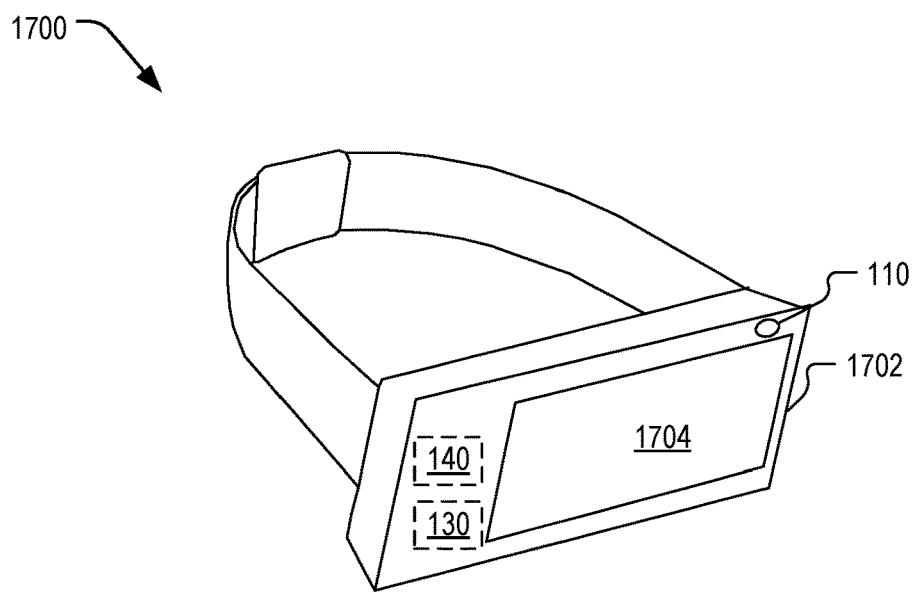
FIG. 17 is a diagram of a wearable electronic device that includes a feature extractor and a dynamic classifier, in accordance with some examples of the present disclosure.

FIG. 17 depicts an implementation 1700 in which the device 102 is a wearable electronic device 1702, illustrated as a "smart watch." The feature extractor 130, the dynamic classifier 140, and the microphone 110, are integrated into the wearable electronic device 1702. In a particular example, the feature extractor 130 and the dynamic classifier 140 operate to perform user authentication, which may enable performance of one or more operations at the wearable electronic device 1702, such as to launch a graphical user interface or otherwise display other information associated with the user's speech at a display screen 1704 of the wearable electronic device 1702. To illustrate, the wearable electronic device 1702 may include a display screen 1704 that is configured to display a notification based on user speech detected by the wearable electronic device 1702. In a particular example, the wearable electronic device 1702 includes a haptic device that provides a haptic notification (e.g., vibrates) in response to detection of user voice activity. For example, the haptic notification can cause a user to look at the wearable electronic device 1702 to see a displayed notification indicating detection of a keyword spoken by the user. The wearable electronic device 1702 can thus alert a user with a hearing impairment or a user wearing a headset that the user's voice activity is detected.

FIG. 18 is an implementation 1800 in which the device 102 is a wireless speaker and voice activated device 1802. The wireless speaker and voice activated device 1802 can have wireless network connectivity and is configured to execute an assistant operation. The processor 190 including the feature extractor 130 and the dynamic classifier 140, the microphone 110, or a combination thereof, are included in the wireless speaker and voice activated device 1802. The wireless speaker and voice activated device 1802 also includes a speaker 1804. During operation, in response to receiving a verbal command identified as speech of an authenticated user via operation of the feature extractor 130 and the dynamic classifier 140, the wireless speaker and voice activated device 1802 can execute assistant operations, such as via execution of an integrated assistant application. The assistant operations can include adjusting a temperature, playing music, turning on lights, etc. For example, the assistant operations are performed responsive to receiving a command after a keyword or key phrase (e.g., "hello assistant").

FIG. 19 depicts an implementation 1900 in which the device 102 is a portable electronic device that corresponds to a camera device 1902. The feature extractor 130 and the dynamic classifier 140, the microphone 110, or a combination thereof, are included in the camera device 1902. During operation, in response to receiving a verbal command identified as user speech via operation of the feature extractor 130 and the dynamic classifier 140, the camera device 1902 can execute operations responsive to spoken user commands, such as to adjust image or video capture settings, image or video playback settings, or image or video capture instructions, as illustrative examples.

FIG. 20 depicts an implementation 2000 in which the device 102 includes a portable electronic device that corresponds to an extended reality ("XR") headset 2002, such as a virtual reality ("VR"), augmented reality ("AR"), or mixed reality ("MR") headset device. The feature extractor 130, the dynamic classifier 140, the microphone 110, or a combination thereof, are integrated into the headset 2002. In a particular aspect, the headset 2002 includes the microphone 110 positioned to primarily capture speech of a user. User authentication can be performed based on audio signals received from the microphone 110. A visual interface device is positioned in front of the user's eyes to enable display of augmented reality or virtual reality images or scenes to the user while the headset 2002 is worn. In a particular example, the visual interface device is configured to display a notification indicating user authentication based on speech detected in the audio signal.

FIG. 21 depicts an implementation 2100 in which the device 102 corresponds to or is integrated within a vehicle 2102, illustrated as a manned or unmanned aerial device (e.g., a package delivery drone). The feature extractor 130, the dynamic classifier 140, the microphone 110, or a combination thereof, are integrated into the vehicle 2102. User voice activity detection can be performed based on audio signals received from the microphone 110 of the vehicle 2102, such as for delivery instructions from an authorized user of the vehicle 2102.

FIG. 22 depicts another implementation 2200 in which the device 102 corresponds to, or is integrated within, a vehicle 2202, such as a self-driving car. The vehicle 2202 includes the processor 190 including the feature extractor 130 and the dynamic classifier 140. The vehicle 2202 also includes multiple microphones 110. The microphones 110 are positioned to capture utterances of occupants and an operator of the vehicle 2202. User voice activity detection can be performed based on audio signals received from the microphones 110. In some implementations, user authentication can be performed based on an audio signal received from interior microphones (e.g., the microphone 110), such as for a voice command from an authorized passenger. For example, the authentication can be used to determine whether to execute a voice command from an operator of the vehicle 2202 (e.g., from a parent to set a volume to 5 or to set a destination for a self-driving vehicle) and to disregard a voice command from another passenger that is not authorized to execute the voice command (e.g., a voice command from a child to set the volume to 10 or to change the destination). In some implementations, user authentication can be performed based on an audio signal received from external microphones, such as an authorized user external to the vehicle. In a particular implementation, in response to receiving a verbal command identified as speech of an authorized user via operation of the feature extractor 130 and the dynamic classifier 140, one or more operations of the vehicle 2202 are initiated based on one or more keywords (e.g., "unlock", "start engine", "play music", "display weather forecast", or another voice command) detected in the voice command, such as by providing feedback or information via a display 2220 or one or more speakers (e.g., a speaker 2210).

Figure 23:
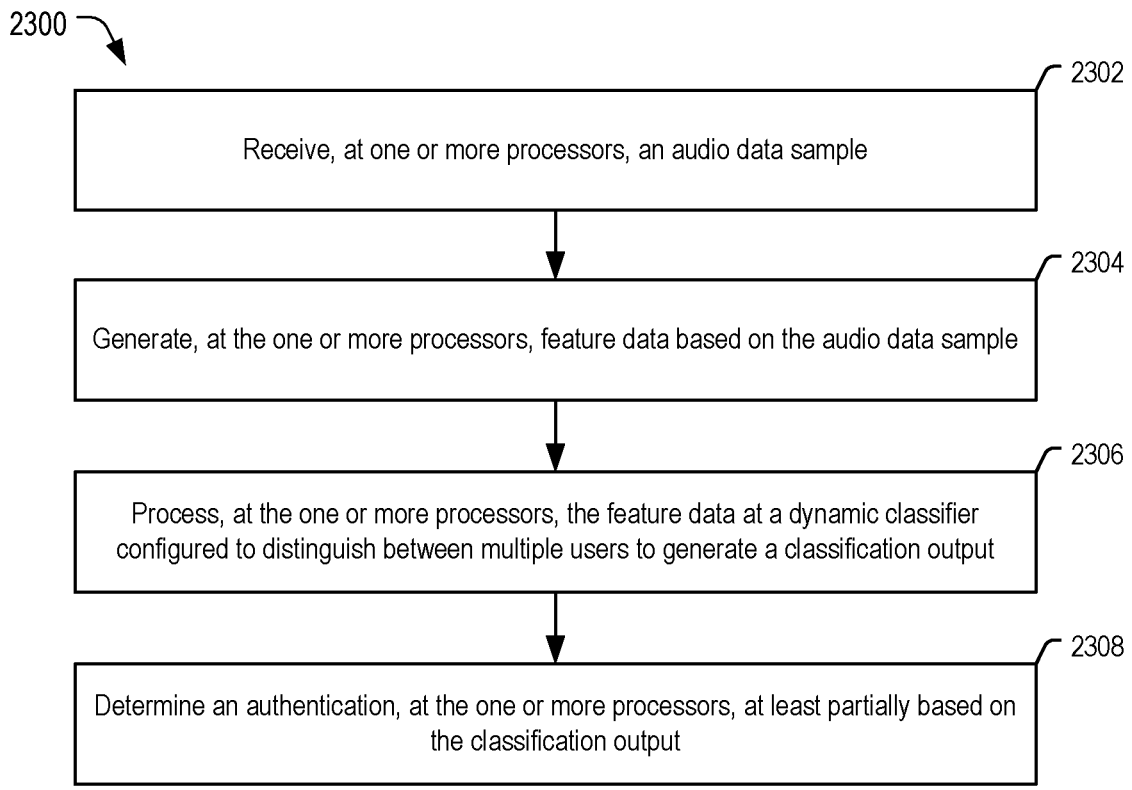
FIG. 23 is a diagram of a particular implementation of a method of operating a device using a dynamic classifier that may be performed by the device of FIG. 1, in accordance with some examples of the present disclosure.

Referring to FIG. 23, a particular implementation of a method 2300 of device operation based on a dynamic classifier is shown. In a particular aspect, one or more operations of the method 2300 are performed by at least one of the feature extractor 130, the dynamic classifier 140, the processor 190, the device 102, the system 100 of FIG. 1, or a combination thereof.

The method 2300 includes receiving, at one or more processors, an audio data sample, at 2302. For example, the feature extractor 130 of FIG. 1 receives the audio data sample 116 corresponding to an output of the microphone 110, as described with reference to FIG. 1.

The method 2300 includes generating, at the one or more processors, feature data based on the audio data sample, at 2304. For example, the feature extractor 130 of FIG. 1 generates the feature data 132 based on the audio data samples 116, as described with reference to FIG. 1.

The method 2300 includes processing, at the one or more processors, the feature data at a dynamic classifier configured to distinguish between multiple users to generate a classification output, at 2306. For example, the dynamic classifier 140 of FIG. 1 processes the feature data 132 to generate the classification output 142, as described with reference to FIG. 1.

The method 2300 includes determining an authentication, at the one or more processors, at least partially based on the classification output, at 2308. For example, the processor 190 of FIG. 1 determines the authentication 150 at least partially based on the classification output 142, as described with reference to FIG. 1.

The method 2300 improves performance of user authentication by using the dynamic classifier to discriminate between users based on user speech samples with relatively low complexity, low power consumption, and high accuracy as compared to conventional user authentication techniques. Automatically adapting to user and environment changes provides improved benefit by reducing or eliminating extensive training using multiple speech samples to be performed by the user and thus enhancing the user's experience.

The method 2300 of FIG. 23 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2300 of FIG. 23 may be performed by a processor that executes instructions, such as described with reference to FIG. 31.

Figure 24:
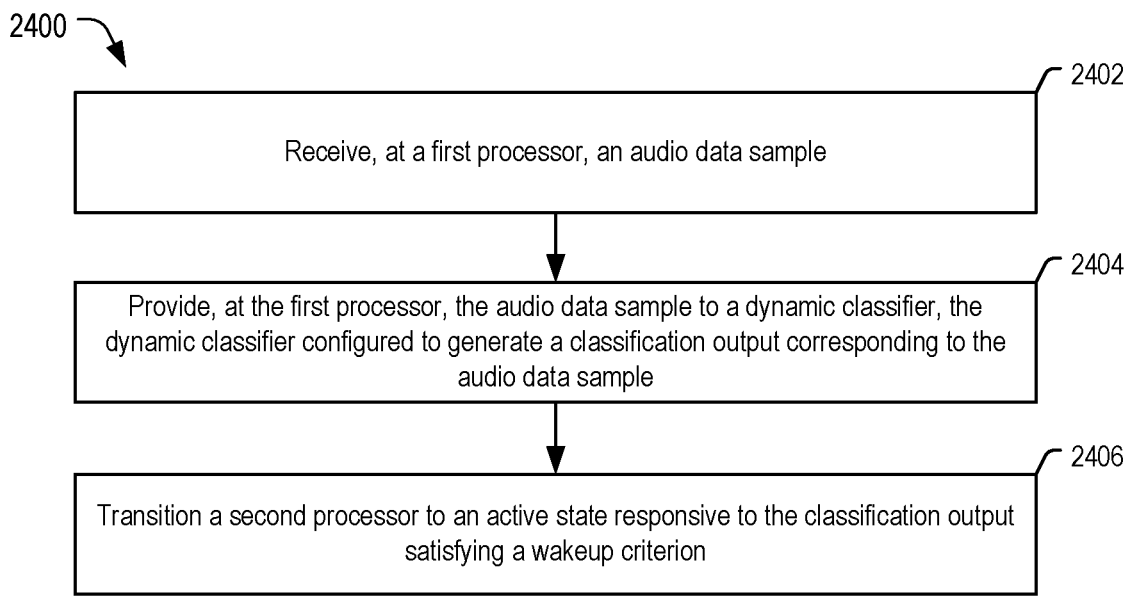
FIG. 24 is a diagram of another particular implementation of a method of operating a device using a dynamic classifier, in accordance with some examples of the present disclosure.

Referring to FIG. 24, a particular implementation of a method 2400 of device operation based on a dynamic classifier is shown. In a particular aspect, one or more operations of the method 2400 are performed by at least one of the feature extractor 130, the dynamic classifier 140, the processor 190, the device 102, the system 100 of FIG. 1, the first processor 690, the second processor 680, the dynamic classifier 640, the device 602, the system 600 of FIG. 6, or a combination thereof.

The method 2400 includes receiving, at a first processor, an audio data sample, at 2402. For example, the feature extractor 130 of FIG. 1 receives the audio data sample 116 corresponding to an output of the microphone 110, as described with reference to FIG. 1. As another example, the first processor 690 receives the audio data sample 616, as described with reference to FIG. 6.

The method 2400 includes providing, at the first processor, the audio data sample to a dynamic classifier, the dynamic classifier configured to generate a classification output corresponding to the audio data sample, at 2404. For example, the dynamic classifier 140 of FIG. 1 receives and processes the feature data 132 representation of the audio data sample 116 to generate the classification output 142, as described with reference to FIG. 1. As another example, as described with reference to FIG. 6, the first processor 690 provides the audio data sample 616 (or the feature data 632 representing the audio data sample 616) to the dynamic classifier 640 of FIG. 6, and the dynamic classifier 640 generates the classification output 642.

The method 2400 includes transitioning a second processor to an active state responsive to the classification output satisfying a wakeup criterion, at 2406. For example, as described with reference to FIG. 6, the second processor 680 is transitioned to an active state responsive to the classification output 642 satisfying the wakeup criterion 610.

The method 2400 improves performance of user authentication by using the dynamic classifier to discriminate between users based on user speech samples with relatively low complexity, low power consumption, and high accuracy as compared to conventional user authentication techniques. Activating the second processor based on the classification output enables reduced power consumption associated with the second processor as compared to a system in which a second processor remains in an always-on state.

The method 2400 of FIG. 24 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2400 of FIG. 24 may be performed by a processor that executes instructions, such as described with reference to FIG. 31.

Figure 25:
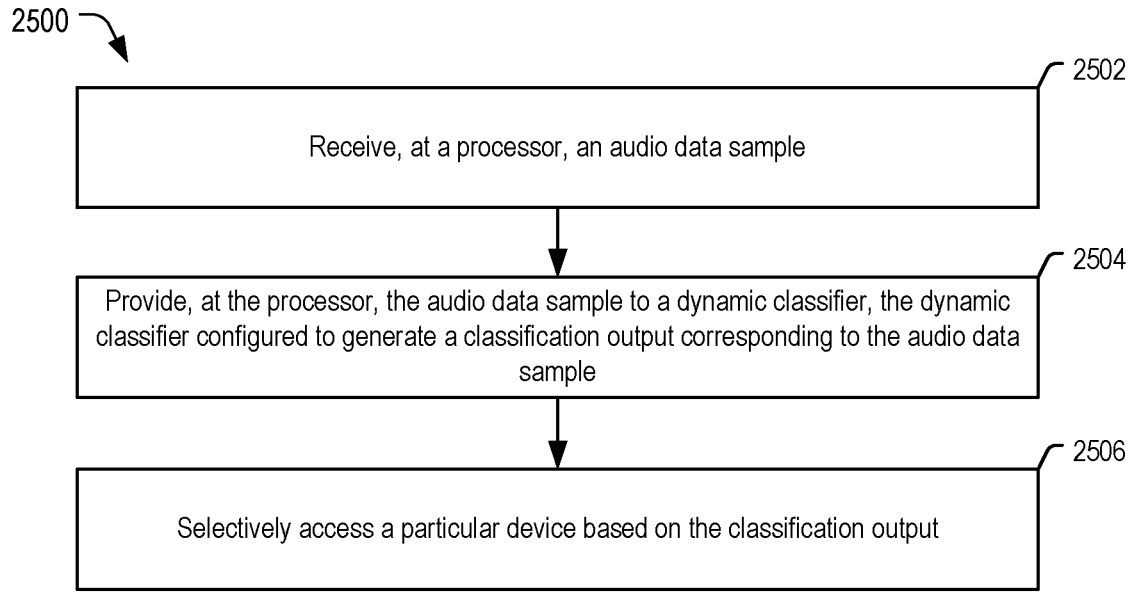
FIG. 25 is a diagram of another particular implementation of a method of operating a device using a dynamic classifier, in accordance with some examples of the present disclosure.

Referring to FIG. 25, a particular implementation of a method 2500 of device operation based on a dynamic classifier is shown. In a particular aspect, one or more operations of the method 2500 are performed by at least one of the feature extractor 130, the dynamic classifier 140, the processor 190, the device 102, the system 100 of FIG. 1, the processor 790, the memory 792, the device 702, the system 700 of FIG. 7, or a combination thereof.

The method 2500 includes receiving, at a processor, an audio data sample, at 2502. For example, as described with reference to FIG. 1, the feature extractor 130 of the processor 190 FIG. 1 receives the audio data sample 116 corresponding to an output of the microphone 110. As another example, as described with reference to FIG. 7, the processor 790 receives the audio data sample 716.

The method 2500 includes providing, at the processor, the audio data sample to a dynamic classifier, the dynamic classifier configured to generate a classification output corresponding to the audio data sample, at 2504. For example, as described with reference to FIG. 1, the feature extractor 130 of FIG. 1 generates the feature data 132 based on the audio data samples 116 and provides the feature data 132 representing the audio data sample 116 to the dynamic classifier 140, and the dynamic classifier 140 generates the classification output 142. As another example, as described with reference to FIG. 7, the processor 790 provides the audio data sample 716 (or a feature data representation of the audio data sample 716) to the dynamic classifier 740, and the dynamic classifier 740 generates the classification output 742.

The method 2500 includes selectively accessing a particular device based on the classification output, at 2506. For example, as described with reference to FIG. 1, the device 102 may selectively access the device 160 responsive to the classification output 142 corresponding to an authentication 150 associated with the one or more permissions 151. As another example, as described with reference to FIG. 7, the processor 790 selectively accesses the device 760 based on the classification output 742, such as by sending the unlock signal 710, sending the lock signal 712, sending the speech command data 714, or a combination thereof.

The method 2500 thus uses the dynamic classifier to authenticate users for selectively accessing the particular device with relatively low complexity, low power consumption, and high accuracy as compared to conventional user authentication techniques.

The method 2500 of FIG. 25 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2500 of FIG. 25 may be performed by a processor that executes instructions, such as described with reference to FIG. 31.

Figure 26:
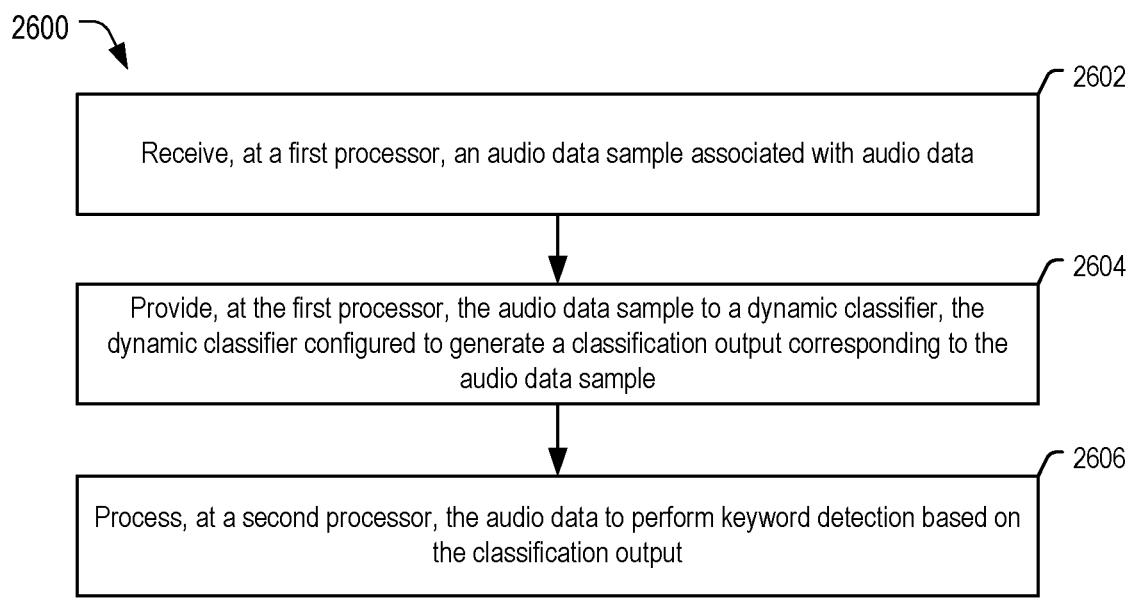
FIG. 26 is a diagram of another particular implementation of a method of operating a device using a dynamic classifier, in accordance with some examples of the present disclosure.

Referring to FIG. 26, a particular implementation of a method 2600 of device operation based on a dynamic classifier is shown. In a particular aspect, one or more operations of the method 2600 are performed by at least one of the feature extractor 130, the dynamic classifier 140, the processor 190, the device 102, the system 100 of FIG. 1, the first processor 810, the second processor 812, the keyword detector 814, the processor 890, the device 802, the system 800 of FIG. 8, or a combination thereof.

The method 2600 includes receiving, at a first processor, an audio data sample associated with audio data, at 2602. For example, the feature extractor 130 of FIG. 1 receives the audio data sample 116 corresponding to an output of the microphone 110, as described with reference to FIG. 1. As another example, the first processor 890 receives the audio data sample 816, as described with reference to FIG. 8.

The method 2600 includes providing, at the first processor, the audio data sample to a dynamic classifier, the dynamic classifier configured to generate a classification output corresponding to the audio data sample, at 2604. For example, as described with reference to FIG. 1, the feature extractor 130 of FIG. 1 generates the feature data 132 based on the audio data samples 116 and provides the feature data 132 representing the audio data sample 116 to the dynamic classifier 140, and the dynamic classifier 140 generates the classification output 142. As another example, as described with reference to FIG. 8, the processor 890 (e.g., the first processor 810) provides the audio data sample 816 (or a feature data representation of the audio data sample 816) to the dynamic classifier 840, and the dynamic classifier 840 generates the classification output 842.

The method 2600 includes processing, at a second processor, the audio data to perform keyword detection based on the classification output, at 2606. For example, the voice command processing operation 152 of FIG. 1 may perform keyword detection based on the authentication 150 generated responsive to the classification output 142, as described with reference to FIG. 1. As another example, as described with reference to FIG. 8, the processor 890 (e.g., the second processor 812) processes the audio data sample 816 at the keyword detector 814 based on the classification output 842.

The method 2600 improves performance of a device by using the dynamic classifier 140 to discriminate between users based on user speech samples with relatively low complexity, low power consumption, and high accuracy as compared to conventional user authentication techniques. Performing keyword detection based on the classification output 842 reduces power consumption as compared to systems in which keyword detection is performed on all received audio data.

The method 2600 of FIG. 26 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2600 of FIG. 26 may be performed by a processor that executes instructions, such as described with reference to FIG. 31.

Figure 27:
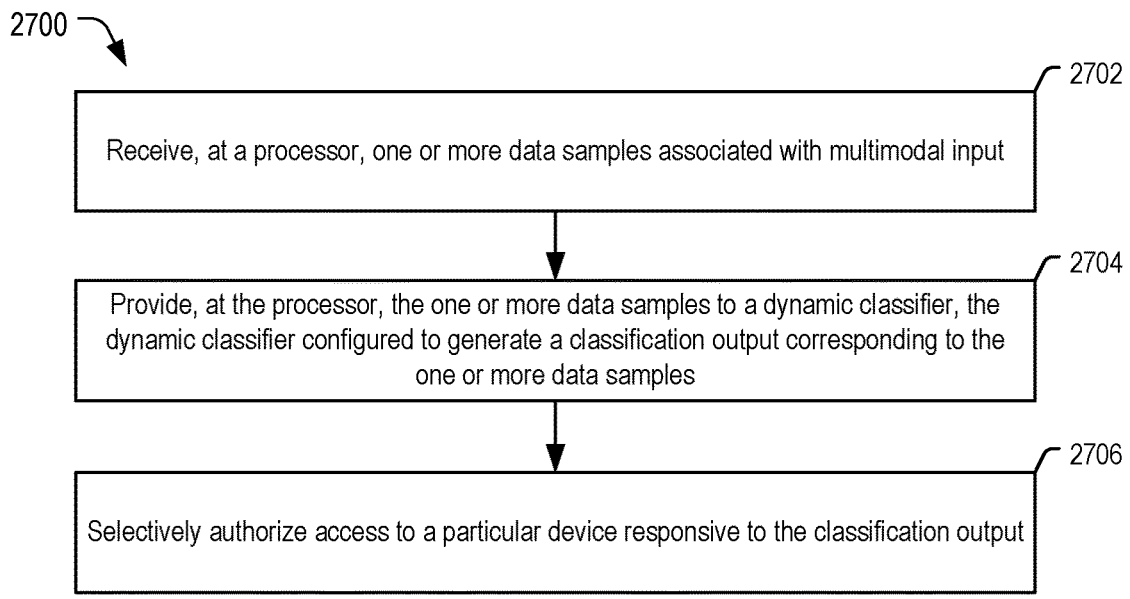
FIG. 27 is a diagram of another particular implementation of a method of operating a device using a dynamic classifier, in accordance with some examples of the present disclosure.

Referring to FIG. 27, a particular implementation of a method 2700 of device operation based on a dynamic classifier is shown. In a particular aspect, one or more operations of the method 2700 are performed by at least one of the feature extractor 130, the dynamic classifier 140, the processor 190, the device 102, the system 100 of FIG. 1, the processor 990, the device 902, the system 900 of FIG. 9, or a combination thereof.

The method 2700 includes receiving, at a processor, one or more data samples associated with multimodal input, at 2702. For example, the processor 190 of FIG. 1 receives the audio data sample 116 corresponding to an output of the microphone 110 and the data sample 186 corresponding to the one or more sensors 180, such as image data from the camera 196, as described with reference to FIG. 1. As another example, the processor 990 receives the audio data sample 916, the image data sample 950, and the fingerprint data sample 952, such as via the merged data sample 918, as described with reference to FIG. 9.

The method 2700 includes providing, at the processor, the one or more data samples to a dynamic classifier, the dynamic classifier configured to generate a classification output corresponding to the one or more data samples, at 2704. For example, as described with reference to FIG. 1, the feature extractor 130 of FIG. 1 generates the feature data 132 based on the audio data samples 116 and the data samples 186 and provides the feature data 132 representing the data samples to the dynamic classifier 140, and the dynamic classifier 140 generates the classification output 142. As another example, as described with reference to FIG. 9, the processor 990 provides the merged data sample 918 (or the feature data 932 representing the merged sample 918) to the dynamic classifier 940, and the dynamic classifier 940 generates the classification output 942.

The method 2700 includes selectively authorizing access to a particular device responsive to the classification output, at 2706. For example, as described with reference to FIG. 1, the device 102 may authorize access to the device 160 responsive to the classification output 142 corresponding to an authentication 150 associated with the one or more permissions 141. As another example, as described with reference to FIG. 9, the processor 990 selectively authorizes access to the device 960 based on the classification output 942.

By generating the classification output based on multimodal data samples, the method 2700 enables authentication of users and access to the particular device based on various criteria or combinations of criteria. For example, based on a level of permission required to access the particular device, authentication based on any combination of multiple input modes (e.g., audio, visual, or fingerprint). As another example, use of multiple input modes enables establishment of threshold confidence in authenticating a user when the user cannot be authenticated with the threshold confidence using a single one of the input modes.

The method 2700 of FIG. 27 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2700 of FIG. 27 may be performed by a processor that executes instructions, such as described with reference to FIG. 31.

Figure 28:
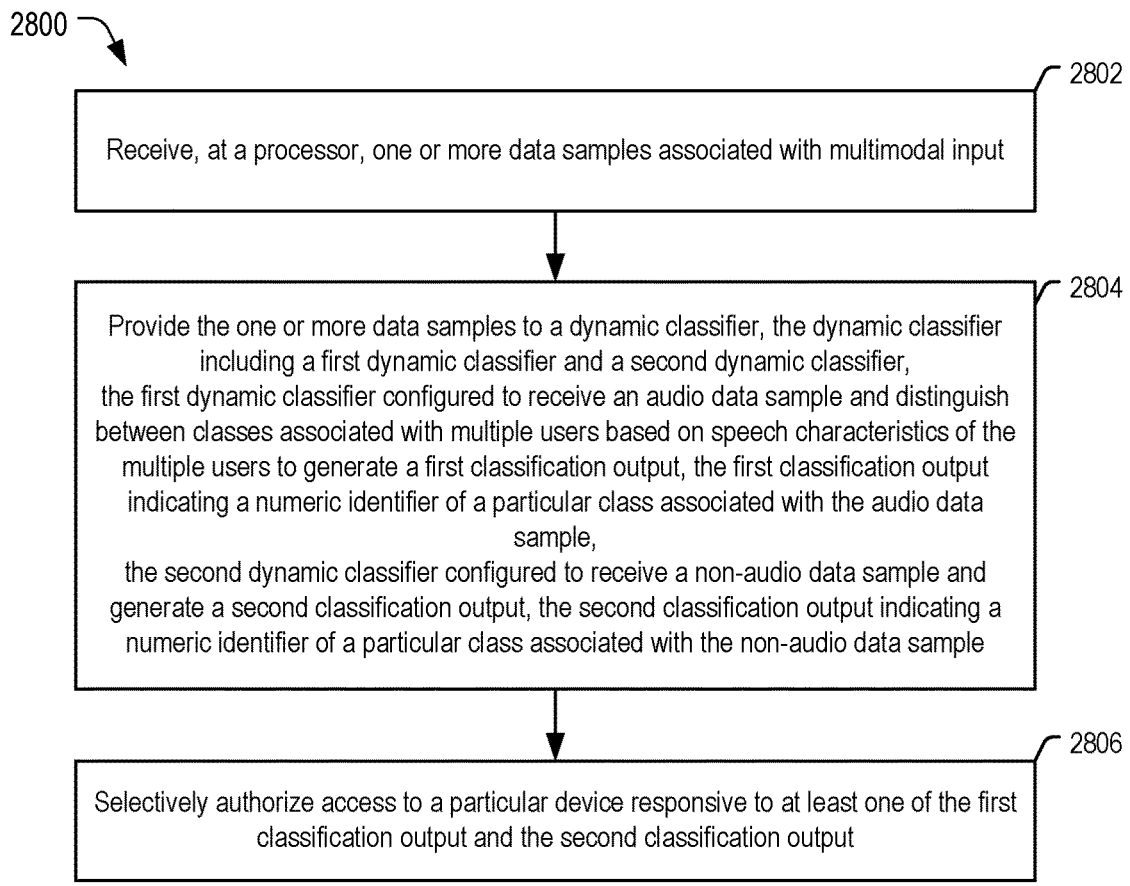
FIG. 28 is a diagram of another particular implementation of a method of operating a device using a dynamic classifier, in accordance with some examples of the present disclosure.

Referring to FIG. 28, a particular implementation of a method 2800 of device operation based on a dynamic classifier is shown. In a particular aspect, one or more operations of the method 2800 are performed by at least one of the feature extractor 130, the dynamic classifier 140, the processor 190, the device 102, the system 100 of FIG. 1, the dynamic classifier 1092, the first dynamic classifier 1040, the second dynamic classifier 1044, the processor 1090, the device 1002, the system 1000 of FIG. 10, or a combination thereof.

The method 2800 includes receiving, at a processor, one or more data samples associated with multimodal input, at 2802. For example, the processor 190 of FIG. 1 receives the audio data sample 116 corresponding to an output of the microphone 110 and the data sample 186 corresponding to the one or more sensors 180, such as image data from the camera 196, as described with reference to FIG. 1. As another example, the processor 1090 receives the audio data sample 1016 based on audio data captured by the microphone 101 and the non-audio data sample 1086 based on image data captured by the camera 1096, as described with reference to FIG. 10.

The method 2800 includes providing the one or more data samples to a dynamic classifier, the dynamic classifier including a first dynamic classifier and a second dynamic classifier, the first dynamic classifier configured to receive an audio data sample and distinguish between classes associated with multiple users based on speech characteristics of the multiple users to generate a first classification output, the first classification output indicating a numeric identifier of a particular class associated with the audio data sample, and the second dynamic classifier configured to receive a non-audio data sample and generate a second classification output, the second classification output indicating a numeric identifier of a particular class associated with the non-audio data sample, at 2804. For example, as described with reference to FIG. 10, the processor 1090 provides the audio data sample 1016 (or a feature data representation of the audio data sample 1016) and the non-audio sample 1086 (or a feature data representation of the non-audio data sample 1086) to the dynamic classifier 1092. The first dynamic classifier 1040 generates the first classification output 1042 indicating the numeric identifier 1020, the second dynamic classifier 1044 generates the second classification output 1046 indicating the numeric identifier 1022, or a combination thereof.

The method 2800 includes selectively authorizing access to a particular device responsive to at least one of the first classification output and the second classification output, at 2806. For example, as described with reference to FIG. 10, the processor 1090 selectively authorizes access to the device 1060 based on the authentication 1050 and the access authorization 1052 generated responsive to the first classification output 1042, the second classification output 1046, or a combination thereof.

By generating the classification outputs based on data samples corresponding to a multimodal input, the method 2700 enables authentication of users and access to the particular device based on various criteria or combinations of criteria. For example, access to the particular device can be based on audio data, image data in which the user visually indicates the user's classification numeric identifier, or a combination thereof. Use of multiple input modes enables authentication of a user when the user cannot, or chooses not to, be authenticated using one of the input modes.

The method 2800 of FIG. 28 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2800 of FIG. 28 may be performed by a processor that executes instructions, such as described with reference to FIG. 31.

Figure 29:
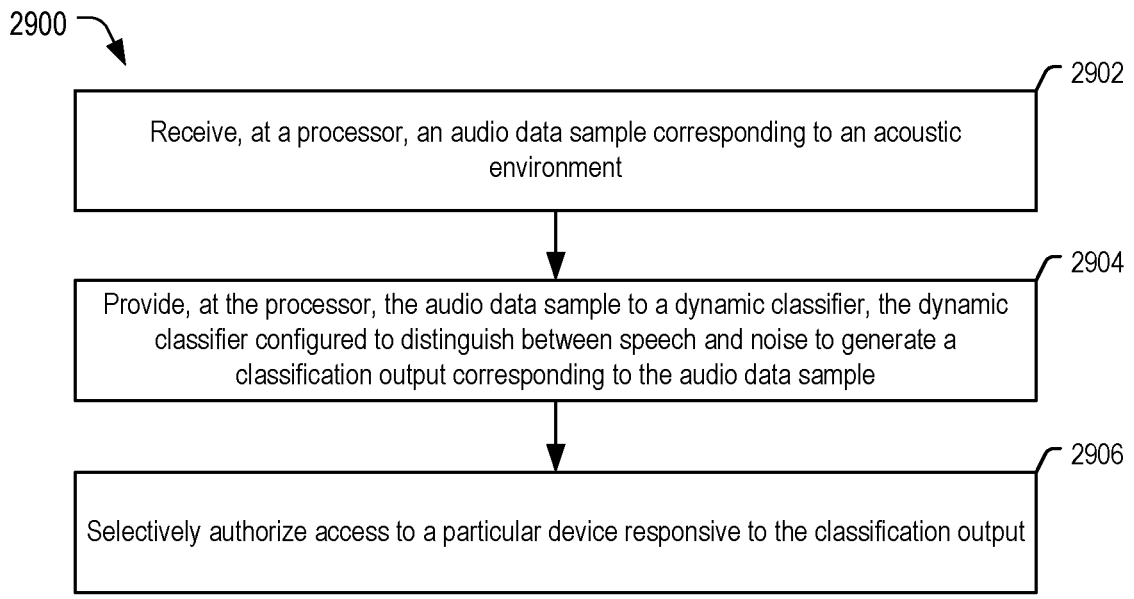
FIG. 29 is a diagram of another particular implementation of a method of operating a device using a dynamic classifier, in accordance with some examples of the present disclosure.

Referring to FIG. 29, a particular implementation of a method 2900 of device operation based on a dynamic classifier is shown. In a particular aspect, one or more operations of the method 2900 are performed by at least one of the feature extractor 130, the dynamic classifier 140, the processor 190, the device 102, the system 100 of FIG. 1, the dynamic classifier 1192, the first dynamic classifier 1140, the second dynamic classifier 1144, the processor 1190, the device 1102, the system 1100 of FIG. 11, or a combination thereof.

The method 2900 includes receiving, at a processor, an audio data sample corresponding to an acoustic environment, at 2902. For example, the feature extractor 130 of FIG. 1 receives the audio data sample 116 corresponding to an output of the microphone 110, as described with reference to FIG. 1. As another example, the processor 1190 receives the audio data sample 1116 corresponding to an acoustic environment of the device 1102, as described with reference to FIG. 11.

The method 2900 includes providing, at the processor, the audio data sample to a dynamic classifier, the dynamic classifier configured to distinguish between speech and noise to generate a classification output corresponding to the audio data sample, at 2904. For example, as described with reference to FIG. 11, the processor 1190 provides the audio data sample 1116 (or a feature data representation of the audio data sample 1116) to the dynamic classifier 1192, and the dynamic classifier 1192 generates the first classification output 1142 corresponding to the speech class 1120 or the noise class 1122, the second classification output 1146 corresponding to one of the user classes 1124 or the non-user speech class 1126, or a combination thereof.

The method 2900 includes selectively authorizing access to a particular device responsive to the classification output, at 2906. For example, as described with reference to FIG. 1, the device 102 may authorize access to the device 160 responsive to the classification output 142 corresponding to an authentication 150 associated with the one or more permissions 141. As another example, as described with reference to FIG. 11, the processor 1190 selectively authorizes access to the device 1160 based on the access authorization 1152 corresponding to the authentication 1150, which is based on the first classification output 1142 corresponding to the speech class 1120 or the noise class 1122, the second classification output 1146 corresponding to one of the user classes 1124 or the non-user speech class 1126, or a combination thereof.

The method 2900 enables discrimination between user speech and audio other than user speech based on audio data samples with relatively low complexity, low power consumption, and high accuracy. In addition, the method 2900 may further enable discrimination between speech of previously classified users as well as speech from non-classified users. Non-speech audio can be processed to determine context, for use in noise reduction, or a combination thereof.

The method 2900 of FIG. 29 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2900 of FIG. 29 may be performed by a processor that executes instructions, such as described with reference to FIG. 31.

Figure 30:
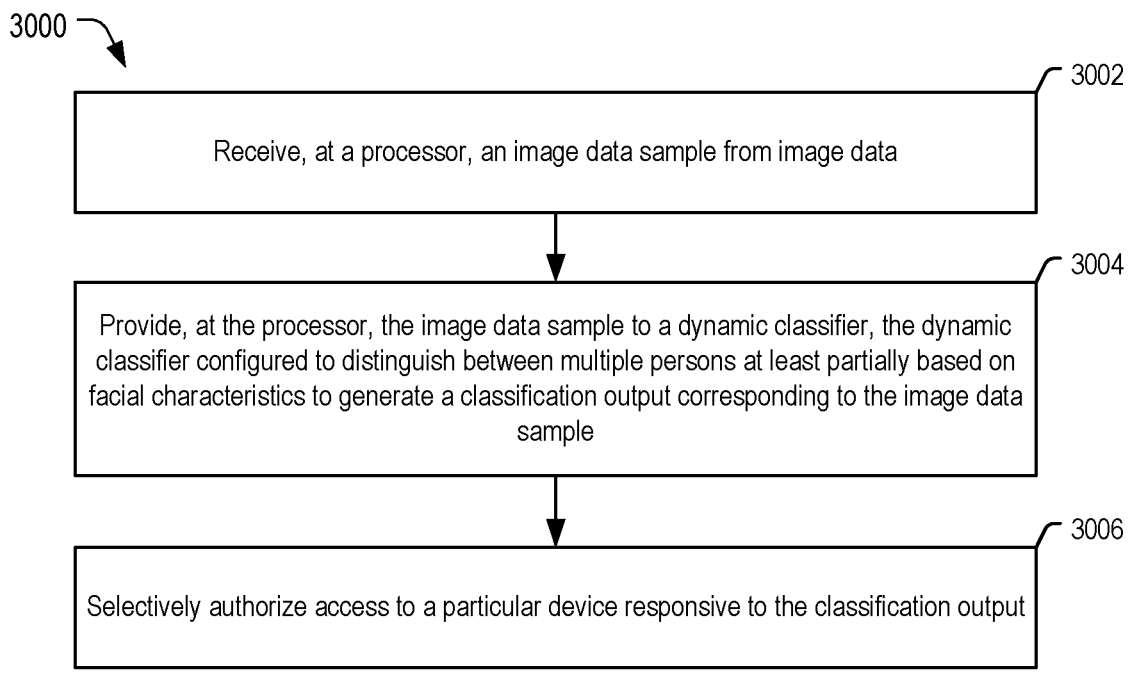
FIG. 30 is a diagram of another particular implementation of a method of operating a device using a dynamic classifier, in accordance with some examples of the present disclosure.

Referring to FIG. 30, a particular implementation of a method 3000 of device operation based on a dynamic classifier is shown. In a particular aspect, one or more operations of the method 3000 are performed by at least one of the feature extractor 130, the dynamic classifier 140, the processor 190, the device 102, the system 100 of FIG. 1, the dynamic classifier 1240, the processor 1290, the device 1202, the system 1200 of FIG. 12, or a combination thereof.

The method 3000 includes receiving, at a processor, an image data sample from image data, at 3002. For example, the feature extractor 130 of FIG. 1 receives the data sample 186 (e.g., based on image data corresponding to an output of the camera 196), as described with reference to FIG. 1. As another example, the processor 1290 receives the image data sample 1286 based on image data captured by the camera 1296, as described with reference to FIG. 12.

The method 3000 includes providing, at the processor, the image data sample to a dynamic classifier, the dynamic classifier configured to distinguish between multiple persons at least partially based on facial characteristics to generate a classification output corresponding to the image data sample, at 3004. For example, as described with reference to FIG. 12, the processor 1290 provides the image data sample 1286 (or a feature data representation of the image data sample 1286) to the dynamic classifier 1240, and the dynamic classifier 1240 generates the classification output 1242 at least partially based on the facial characteristics 1206.

The method 3000 includes selectively authorizing access to a particular device responsive to the classification output, at 3006. For example, the processor 1290 of FIG. 12 determines the authentication 1250 and the associated access authorization 1252 to access the device 1260 at least partially based on the classification output 1242, as described with reference to FIG. 12.

The method 3000 improves performance of user authentication by using the dynamic classifier to discriminate between users based on facial characteristics with relatively low complexity, low power consumption, and high accuracy as compared to conventional systems that use authentication techniques based on facial recognition.

The method 3000 of FIG. 30 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 3000 of FIG. 30 may be performed by a processor that executes instructions, such as described with reference to FIG. 31.

Figure 31:
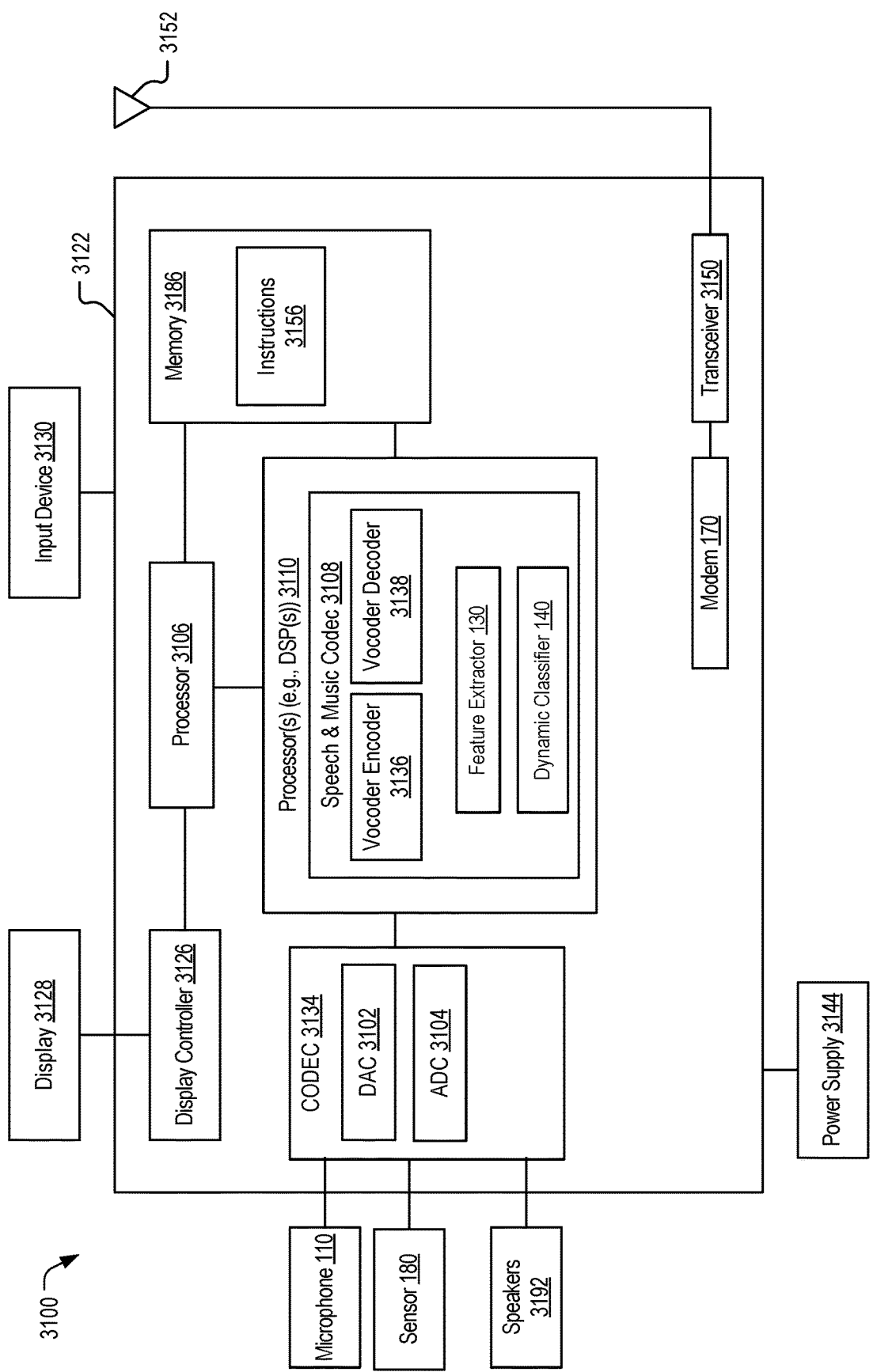
FIG. 31 is a block diagram of a particular illustrative example of a device that is operable to perform operations based on dynamic classifier, in accordance with some examples of the present disclosure.

Referring to FIG. 31, a block diagram of a particular illustrative implementation of a device is depicted and generally designated 3100. In various implementations, the device 3100 may have more or fewer components than illustrated in FIG. 31. In an illustrative implementation, the device 3100 may correspond to the device 102. In an illustrative implementation, the device 3100 may perform one or more operations described with reference to FIGS. 1-30.

In a particular implementation, the device 3100 includes a processor 3106 (e.g., a central processing unit (CPU)). The device 3100 may include one or more additional processors 3110 (e.g., one or more DSPs). In a particular aspect, the processor 190 of FIG. 1 corresponds to the processor 3106, the processors 3110, or a combination thereof. The processors 3110 may include a speech and music coder-decoder (CODEC) 3108 that includes a voice coder ("vocoder") encoder 3136, a vocoder decoder 3138, the feature extractor 130, the dynamic classifier 140, or a combination thereof.

The device 3100 may include a memory 3186 and a CODEC 3134. The memory 3186 may include instructions 3156, that are executable by the one or more additional processors 3110 (or the processor 3106) to implement the functionality described with reference to the feature extractor 130, the dynamic classifier 140, or both. The device 3100 may include the modem 170 coupled, via a transceiver 3150, to an antenna 3152.

The device 3100 may include a display 3128 coupled to a display controller 3126. A speaker 3192, the microphone 110, and the sensor 180 may be coupled to the CODEC 3134. The CODEC 3134 may include a digital-to-analog converter (DAC) 3102, an analog-to-digital converter (ADC) 3104, or both. In a particular implementation, the CODEC 3134 may receive analog signals from the microphone 110 and the sensor 180, convert the analog signals to digital signals using the analog-to-digital converter 3104, and provide the digital signals to the speech and music codec 3108. The speech and music codec 3108 may process the digital signals, and the digital signals may further be processed by the feature extractor 130 and the dynamic classifier 140. In a particular implementation, the speech and music codec 3108 may provide digital signals to the CODEC 3134. The CODEC 3134 may convert the digital signals to analog signals using the digital-to-analog converter 3102 and may provide the analog signals to the speaker 3192.

In a particular implementation, the device 3100 may be included in a system-in-package or system-on-chip device 3122. In a particular implementation, the memory 3186, the processor 3106, the processors 3110, the display controller 3126, the CODEC 3134, and the modem 170 are included in a system-in-package or system-on-chip device 3122. In a particular implementation, an input device 3130 and a power supply 3144 are coupled to the system-on-chip device 3122. Moreover, in a particular implementation, as illustrated in FIG. 31, the display 3128, the input device 3130, the speaker 3192, the microphone 110, the sensor 180, the antenna 3152, and the power supply 3144 are external to the system-on-chip device 3122. In a particular implementation, each of the display 3128, the input device 3130, the speaker 3192, the microphone 110, the sensor 180, the antenna 3152, and the power supply 3144 may be coupled to a component of the system-on-chip device 3122, such as an interface (e.g., the first input interface 114 or the second input interface 184) or a controller.

The device 3100 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or any combination thereof.

In conjunction with the described implementations, a first apparatus includes means for receiving an audio data sample. For example, the means for receiving the audio data sample can include the device 102, the input interface 114, the processor 190, the feature extractor 130, the dynamic classifier 140, one or more other circuits or components configured to receive an audio data sample, or any combination thereof.

The first apparatus includes means for generating feature data based on the audio data sample. For example, the means for generating feature data based on the audio data sample can include the processor 190, the feature extractor 130, the dynamic classifier 140, one or more other circuits or components configured to generate feature data based on an audio data sample, or any combination thereof.

The first apparatus includes means for processing the feature data at a dynamic classifier configured to distinguish between multiple users to generate a classification output. For example, the means for processing the feature data can include the processor 190, the dynamic classifier 140, one or more other circuits or components configured to process the feature data to generate a classification output, or any combination thereof.

The first apparatus includes means for authenticating at least partially based on the classification output. For example, the means for authenticating can include the processor 190, the device 102, one or more other circuits or components configured to authenticate at least partially based on the classification output, or any combination thereof.

In conjunction with the described implementations, a second apparatus includes means for receiving an audio data sample. For example, the means for receiving the audio data sample can include the device 602, the processor 690, the dynamic classifier 640, one or more other circuits or components configured to receive an audio data sample, or any combination thereof.

The second apparatus includes means for providing the audio data sample to a dynamic classifier, the dynamic classifier configured to generate a classification output corresponding to the audio data sample. For example, the means for providing the audio data sample to the dynamic classifier can include the device 602, the processor 690, the dynamic classifier 640, one or more other circuits or components configured to provide the audio data sample to the dynamic classifier, or any combination thereof.

The second apparatus includes means for transitioning a second processor to an active state responsive to the classification output satisfying a wakeup criterion. For example, the means for transitioning the second processor to an active state can include the device 602, processor 690, the dynamic classifier 640, the activation circuitry 330, one or more other circuits or components configured to transition the second processor to an active state responsive to the classification output satisfying a wakeup criterion, or any combination thereof.

In conjunction with the described implementations, a third apparatus includes means for receiving an audio data sample. For example, the means for receiving the audio data sample can include the device 702, the processor 790, the dynamic classifier 740, one or more other circuits or components configured to receive an audio data sample, or any combination thereof.

The third apparatus includes means for providing the audio data sample to a dynamic classifier, the dynamic classifier configured to generate a classification output corresponding to the audio data sample. For example, the means for providing the audio data sample to the dynamic classifier can include the device 702, the processor 790, the dynamic classifier 740, one or more other circuits or components configured to provide the audio data sample to the dynamic classifier, or any combination thereof.

The third apparatus includes means for selectively accessing a particular device based on the classification output. For example, the means for selectively accessing the particular device based on the classification output can include the device 702, the processor 790, the dynamic classifier 740, the modem 170, one or more other circuits or components configured to selectively access a particular device based on the classification output, or any combination thereof.

In conjunction with the described implementations, a fourth apparatus includes means for receiving an audio data sample associated with audio data. For example, the means for receiving the audio data sample can include the device 802, the processor 890, the first processor 810, the second processor 812, the dynamic classifier 840, one or more other circuits or components configured to receive an audio data sample, or any combination thereof.

The fourth apparatus includes means for providing the audio data sample to a dynamic classifier, the dynamic classifier configured to generate a classification output corresponding to the audio data sample. For example, the means for providing the audio data sample to the dynamic classifier can include the device 802, the processor 890, the first processor 810, the dynamic classifier 840, one or more other circuits or components configured to provide the audio data sample to the dynamic classifier, or any combination thereof.

The fourth apparatus includes means for processing the audio data to perform keyword detection based on the classification output. For example, the means for processing the audio data to perform keyword detection based on the classification output can include the device 802, the processor 890, the second processor 812, the keyword detector 814, one or more other circuits or components configured to process the audio data to perform keyword detection based on the classification output, or any combination thereof.

In conjunction with the described implementations, a fifth apparatus includes means for receiving one or more data samples associated with multimodal input. For example, the means for receiving the one or more data samples can include the device 902, the processor 990, the dynamic classifier 940, one or more other circuits or components configured to receive the one or more data samples, or any combination thereof.

The fifth apparatus includes means for providing the one or more data samples to a dynamic classifier, the dynamic classifier configured to generate a classification output corresponding to the one or more data samples. For example, the means for providing the one or more data samples to the dynamic classifier can include the device 902, the processor 990, the dynamic classifier 940, one or more other circuits or components configured to provide the one or more data samples to the dynamic classifier, or any combination thereof.

The fifth apparatus includes means for selectively authorizing access to a particular device responsive to the classification output. For example, the means for selectively authorizing access to a particular device responsive to the classification output can include the device 902, the processor 990, one or more other circuits or components configured to selectively authorize access to a particular device responsive to the classification output, or any combination thereof.

In conjunction with the described implementations, a sixth apparatus includes means for receiving one or more data samples associated with multimodal input. For example, the means for receiving the one or more data samples can include the device 1002, the processor 1090, the dynamic classifier 1092, the first dynamic classifier 1040, the second dynamic classifier 1044, one or more other circuits or components configured to receive the one or more data samples, or any combination thereof.

The sixth apparatus includes means for providing the one or more data samples to a dynamic classifier. The dynamic classifier includes a first dynamic classifier and a second dynamic classifier. The first dynamic classifier is configured to receive an audio data sample and distinguish between classes associated with multiple users based on speech characteristics of the multiple users to generate a first classification output. The first classification output indicates a numeric identifier of a particular class associated with the audio data sample. The second dynamic classifier is configured to receive a non-audio data sample and generate a second classification output. The second classification output indicates a numeric identifier of a particular class associated with the non-audio data sample. For example, the means for providing the one or more data samples to the dynamic classifier can include the device 1002, the processor 1090, the first dynamic classifier 1040, the second dynamic classifier 1044, one or more other circuits or components configured to provide the one or more data samples to the dynamic classifier, or any combination thereof.

The sixth apparatus includes means for selectively authorizing access to a particular device responsive to at least one of the first classification output and the second classification output. For example, the means for selectively authorizing access to a particular device responsive to at least one of the first classification output and the second classification output can include the device 1002, the processor 1090, one or more other circuits or components configured to selectively authorize access to a particular device responsive to at least one of the first classification output and the second classification output, or any combination thereof.

In conjunction with the described implementations, a seventh apparatus includes means for receiving an audio data sample corresponding to an acoustic environment. For example, the means for receiving an audio data sample corresponding to an acoustic environment can include the device 1102, the processor 1190, the dynamic classifier 1192, the first dynamic classifier 1140, the second dynamic classifier 1144, one or more other circuits or components configured to receive the audio data sample corresponding to an acoustic environment, or any combination thereof.

The seventh apparatus includes means for providing the audio data sample to a dynamic classifier, the dynamic classifier configured to distinguish between speech and noise to generate a classification output corresponding to the audio data sample. For example, the means for providing the audio data sample to a dynamic classifier can include the device 1102, the processor 1190, the first dynamic classifier 1140, one or more other circuits or components configured to provide the audio data sample to a dynamic classifier, or any combination thereof.

The seventh apparatus includes means for selectively authorizing access to a particular device responsive to the classification output. For example, the means for selectively authorizing access to a particular device responsive to the classification output can include the device 1102, the processor 1190, one or more other circuits or components configured to selectively authorize access to a particular device responsive to the classification output, or any combination thereof.

In conjunction with the described implementations, an eighth apparatus includes means for receiving an image data sample from image data. For example, the means for receiving an image data sample from image data can include the device 1202, the processor 1290, the dynamic classifier 1240, one or more other circuits or components configured to receive an image data sample from image data, or any combination thereof.

The eighth apparatus includes means for providing the image data sample to a dynamic classifier, the dynamic classifier configured to distinguish between multiple persons at least partially based on facial characteristics to generate a classification output corresponding to the image data sample. For example, the means for providing the image data sample to a dynamic classifier can include the device 1202, the processor 1290, the dynamic classifier 1240, one or more other circuits or components configured to provide the image data sample to a dynamic classifier, or any combination thereof.

The eighth apparatus includes means for selectively authorizing access to a particular device responsive to the classification output. For example, the means for selectively authorizing access to a particular device responsive to the classification output can include the device 1202, the processor 1290, the dynamic classifier 1240, one or more other circuits or components configured to selectively authorize access to a particular device responsive to the classification output, or any combination thereof.

In some implementations, a non-transitory computer-readable medium (e.g., a computer-readable storage device, such as the memory 3186) includes instructions (e.g., the instructions 3156) that, when executed by one or more processors (e.g., the one or more processors 3110 or the processor 3106), cause the one or more processors perform operations corresponding to the method 2300 of FIG. 23, the method 2400 of FIG. 24, the method 2500 of FIG. 25, the method 2600 of FIG. 26, the method 2700 of FIG. 27, the method 2800 of FIG. 28, the method 2900 of FIG. 29, the method 3000 of FIG. 30, or any combination thereof.

Particular aspects of the disclosure are described below in a set of interrelated clauses:

According to Clause 1 a device includes: a first processor configured to: receive an audio data sample; and provide the audio data sample to a dynamic classifier, the dynamic classifier configured to generate a classification output corresponding to the audio data sample; and a second processor configured to transition to an active state responsive to the classification output satisfying a wakeup criterion.

Clause 2 includes the device of Clause 1, wherein the audio data sample corresponds to feature data, and wherein the first processor is further configured to generate the feature data based on received audio data.

Clause 3 includes the device of Clause 2, wherein the feature data includes pitch data and formant data.

Clause 4 includes the device of any of Clauses 1 to 3, wherein the wakeup criterion is independent of the presence of a keyword in the received audio data.

Clause 5 includes the device of any of Clauses 1 to 4, wherein the dynamic classifier is configured to distinguish between multiple audio sources, and wherein the wakeup criterion includes the classification output corresponding to detected speech.

Clause 6 includes the device of any of Clauses 1 to 4, wherein the wakeup criterion includes the classification output corresponding to a class associated with an authorized user.

According to Clause 7 a method includes: receiving, at a first processor, an audio data sample; providing, at the first processor, the audio data sample to a dynamic classifier, the dynamic classifier configured to generate a classification output corresponding to the audio data sample; and transitioning a second processor to an active state responsive to the classification output satisfying a wakeup criterion.

According to Clause 8 a non-transitory computer-readable medium includes instructions that, when executed by one or more processors, cause the one or more processors to: receive, at a first processor, an audio data sample; provide, at the first processor, the audio data sample to a dynamic classifier, the dynamic classifier configured to generate a classification output corresponding to the audio data sample; and transition a second processor to an active state responsive to the classification output satisfying a wakeup criterion.

According to Clause 9 an apparatus includes: means for receiving an audio data sample; means for providing the audio data sample to a dynamic classifier, the dynamic classifier configured to generate a classification output corresponding to the audio data sample; and means for transitioning a second processor to an active state responsive to the classification output satisfying a wakeup criterion.

According to Clause 10 a device includes: a processor configured to: receive an audio data sample; provide the audio data sample to a dynamic classifier, the dynamic classifier configured to generate a classification output corresponding to the audio data sample; and selectively access a particular device based on the classification output.

Clause 11 includes the device of Clause 10, wherein selectively accessing the particular device includes sending a first signal to unlock access to the particular device in response to the classification output corresponding to a class that is authorized to access the particular device.

Clause 12 includes the device of Clause 10, wherein selectively accessing the particular device includes sending a second signal to lock access to the particular device in response to the classification output corresponding to a class that is not authorized to access the particular device.

Clause 13 includes the device of Clause 10 or Clause 11, wherein selectively accessing the particular device includes sending data indicative of a speech command associated with the audio data sample to the particular device in response to the classification output corresponding to a class authorized to access the particular device.

Clause 14 includes the device of any of Clauses 10 to 13, further including the particular device coupled to the processor.

Clause 15 includes the device of any of Clauses 10 to 14, further including a modem coupled to the processor, and wherein selectively accessing the particular device includes wireless transmission, via the modem, of a signal to the particular device.

Clause 16 includes the device of any of Clauses 10 to 15, wherein the dynamic classifier is configured to distinguish between multiple users at least partially based on speech characteristics to generate the classification output.

Clause 17 includes the device of any of Clauses 10 to 16, wherein the dynamic classifier is further configured to distinguish between speech originating from a source within a threshold distance from the device and speech originating from a source beyond the threshold distance from the device, and wherein the processor is further configured to deny access to the particular device based on the source being beyond the threshold distance.

Clause 18 includes the device of any of Clauses 10 to 17, wherein the processor is further configured to deny access to the particular device based on detection of speech from a second person within a threshold time duration of detection of speech from a first person that is authorized to access the particular device.

Clause 19 includes the device of any of Clauses 10 to 18, further including a memory coupled to the processor, the memory including a table that associates classification outputs of the dynamic classifier to one or more access permissions associated with the particular device.

Clause 20 includes the device of any of Clauses 10 to 19, wherein a determination of whether to access the particular device is independent of the presence of a keyword in received audio data associated with the audio data sample.

According to Clause 21 a method includes: receiving, at a processor, an audio data sample; providing, at the processor, the audio data sample to a dynamic classifier, the dynamic classifier configured to generate a classification output corresponding to the audio data sample; and selectively accessing a particular device based on the classification output.

According to Clause 22 a non-transitory computer-readable medium includes instructions that, when executed by one or more processors, cause the one or more processors to: receive an audio data sample; provide the audio data sample to a dynamic classifier, the dynamic classifier configured to generate a classification output corresponding to the audio data sample; and selectively access a particular device based on the classification output.

According to Clause 23 an apparatus includes: means for receiving an audio data sample; means for providing the audio data sample to a dynamic classifier, the dynamic classifier configured to generate a classification output corresponding to the audio data sample; and means for selectively accessing a particular device based on the classification output.

According to Clause 24 a device includes: one or more processors configured to: receive an audio data sample associated with audio data; provide the audio data sample to a dynamic classifier, the dynamic classifier configured to generate a classification output corresponding to the audio data sample; and process the audio data to perform keyword detection based on the classification output.

Clause 25 includes the device of Clause 24, wherein the one or more processors include: a first processor including the dynamic classifier; and a second processor configured to perform the keyword detection, wherein the second processor is activated based on the classification output indicating speech.

Clause 26 includes the device of Clause 25, wherein the dynamic classifier is configured to distinguish between multiple users at least partially based on speech characteristics to generate the classification output, and wherein the second processor is configured to perform the keyword detection in response to the classification output indicating an authorized user.

According to Clause 27 a method includes: receiving, at a first processor, an audio data sample associated with audio data; providing, at the first processor, the audio data sample to a dynamic classifier, the dynamic classifier configured to generate a classification output corresponding to the audio data sample; and processing, at a second processor, the audio data to perform keyword detection based on the classification output.

According to Clause 28 a non-transitory computer-readable medium includes instructions that, when executed by one or more processors, cause the one or more processors to: receive an audio data sample associated with audio data; provide the audio data sample to a dynamic classifier, the dynamic classifier configured to generate a classification output corresponding to the audio data sample; and process the audio data to perform keyword detection based on the classification output.

According to Clause 29 an apparatus includes: means for receiving an audio data sample associated with audio data; means for providing the audio data sample to a dynamic classifier, the dynamic classifier configured to generate a classification output corresponding to the audio data sample; and means for processing the audio data to perform keyword detection based on the classification output.

According to Clause 30 a device includes: one or more processors configured to: receive one or more data samples associated with multimodal input; provide the one or more data samples to a dynamic classifier, the dynamic classifier configured to generate a classification output corresponding to the one or more data samples; and selectively authorize access to a particular device responsive to the classification output.

Clause 31 includes the device of Clause 30, wherein the one or more data samples includes an image data sample, and wherein the dynamic classifier is configured to distinguish between multiple users at least partially based on facial characteristics to generate the classification output.

Clause 32 includes the device of Clause 30 or Clause 31, wherein the one or more data samples includes an audio data sample, and wherein the dynamic classifier is configured to distinguish between multiple users at least partially based on speech characteristics to generate the classification output.

Clause 33 includes the device of any of Clauses 30 to 32, wherein the one or more data samples includes a fingerprint data sample, and wherein the dynamic classifier is configured to distinguish between multiple users at least partially based on fingerprint characteristics to generate the classification output.

Clause 34 includes the device of any of Clauses 30 to 33, wherein the one or more data samples includes a merged data sample configured to represent at least two of an audio data sample, an image data sample, and a fingerprint data sample, and wherein the dynamic classifier is configured to distinguish between multiple users based on the merged data sample to generate the classification output.

According to Clause 35 a method includes: receiving, at a processor, one or more data samples associated with multimodal input; providing, at the processor, the one or more data samples to a dynamic classifier, the dynamic classifier configured to generate a classification output corresponding to the one or more data samples; and selectively authorizing access to a particular device responsive to the classification output.

According to Clause 36 a non-transitory computer-readable medium includes instructions that, when executed by one or more processors, cause the one or more processors to: receive one or more data samples associated with multimodal input; provide the one or more data samples to a dynamic classifier, the dynamic classifier configured to generate a classification output corresponding to the one or more data samples; and selectively authorize access to a particular device responsive to the classification output.

According to Clause 37 an apparatus includes: means for receiving one or more data samples associated with multimodal input; means for providing the one or more data samples to a dynamic classifier, the dynamic classifier configured to generate a classification output corresponding to the one or more data samples; and means for selectively authorizing access to a particular device responsive to the classification output.

According to Clause 38 a device includes: one or more processors configured to: receive one or more data samples associated with multimodal input; provide the one or more data samples to a dynamic classifier, the dynamic classifier including: a first dynamic classifier configured to: receive an audio data sample; and distinguish between classes associated with multiple users based on speech characteristics of the multiple users to generate a first classification output, the first classification output indicating a numeric identifier of a particular class associated with the audio data sample; and a second dynamic classifier configured to: receive a non-audio data sample; and generate a second classification output, the second classification output indicating a numeric identifier of a particular class associated with the non-audio data sample; and selectively authorize access to a particular device responsive to at least one of the first classification output and the second classification output.

Clause 39 includes the device of Clause 38, further including a camera coupled to the one or more processors, wherein the one or more data samples includes an image data sample from image data captured by the camera, and wherein the second dynamic classifier is configured to generate the second classification output based on a visual indication of the numeric identifier in the image data.

Clause 40 includes the device of Clause 39, wherein the visual indication of the numeric identifier in the image data includes a count of extended digits of one of the users.

Clause 41 includes the device of any of Clauses 38 to 40, further including a display device coupled to the one or more processors, wherein the one or more processors are configured to initiate display of the numeric identifier via the display device.

According to Clause 42 a method includes: receiving, at a processor, one or more data samples associated with multimodal input; providing the one or more data samples to a dynamic classifier, the dynamic classifier including: a first dynamic classifier configured to: receive an audio data sample; and distinguish between classes associated with multiple users based on speech characteristics of the multiple users to generate a first classification output, the first classification output indicating a numeric identifier of a particular class associated with the audio data sample; and a second dynamic classifier configured to: receive a non-audio data sample; and generate a second classification output, the second classification output indicating a numeric identifier of a particular class associated with the non-audio data sample; and selectively authorizing access to a particular device responsive to at least one of the first classification output and the second classification output.

According to Clause 43 a non-transitory computer-readable medium includes instructions that, when executed by one or more processors, cause the one or more processors to: receive one or more data samples associated with multimodal input; provide the one or more data samples to a dynamic classifier, the dynamic classifier including: a first dynamic classifier configured to: receive an audio data sample; and distinguish between classes associated with multiple users based on speech characteristics of the multiple users to generate a first classification output, the first classification output indicating a numeric identifier of a particular class associated with the audio data sample; and a second dynamic classifier configured to: receive a non-audio data sample; and generate a second classification output, the second classification output indicating a numeric identifier of a particular class associated with the non-audio data sample; and selectively authorize access to a particular device responsive to at least one of the first classification output and the second classification output.

According to Clause 44 an apparatus includes: means for receiving one or more data samples associated with multimodal input; means for providing the one or more data samples to a dynamic classifier, the dynamic classifier including: a first dynamic classifier configured to: receive an audio data sample; and distinguish between classes associated with multiple users based on speech characteristics of the multiple users to generate a first classification output, the first classification output indicating a numeric identifier of a particular class associated with the audio data sample; and a second dynamic classifier configured to: receive a non-audio data sample; and generate a second classification output, the second classification output indicating a numeric identifier of a particular class associated with the non-audio data sample; and means for selectively authorizing access to a particular device responsive to at least one of the first classification output and the second classification output.

According to Clause 45 a device includes: one or more processors configured to: receive an audio data sample corresponding to an acoustic environment; provide the audio data sample to a dynamic classifier, the dynamic classifier configured to distinguish between speech and noise to generate a classification output corresponding to the audio data sample; and selectively authorize access to a particular device responsive to the classification output.

Clause 46 includes the device of Clause 45, wherein the dynamic classifier is configured to classify the audio data sample from among multiple classes identified by the dynamic classifier, the multiple classes includes: one or more user classes corresponding one or more previously classified users; a non-user speech class corresponding to speech from someone other than the one or more previously classified users; and a noise class corresponding to non-speech audio.

Clause 47 includes the device of Clause 45 or Clause 46, further including a second dynamic classifier configured to distinguish between multiple classes, the multiple classes includes: one or more user classes corresponding one or more previously classified users; and a default class corresponding to audio other than speech from the one or more previously classified users.

Clause 48 includes the device of Clause 47, wherein the one or more processors are further configured to provide the audio data sample to the dynamic classifier in response to the second dynamic classifier classifying the audio data sample as the default class.

Clause 49 includes the device of any of Clauses 45 to 48, wherein the one or more processors are further configured to, in response to the classification output indicating that the audio data sample corresponds to noise, identify a context associated with the audio data sample.

Clause 50 includes the device of any of Clauses 45 to 49, wherein the one or more processors are further configured to, in response to the classification output indicating that the audio data sample corresponds to noise, process audio data corresponding to the audio data sample to at least partially remove a noise component of the audio data.

According to Clause 51 a method includes: receiving, at a processor, an audio data sample corresponding to an acoustic environment; providing, at the processor, the audio data sample to a dynamic classifier, the dynamic classifier configured to distinguish between speech and noise to generate a classification output corresponding to the audio data sample; and selectively authorizing access to a particular device responsive to the classification output.

According to Clause 52 a non-transitory computer-readable medium includes instructions that, when executed by one or more processors, cause the one or more processors to: receive an audio data sample corresponding to an acoustic environment; provide the audio data sample to a dynamic classifier, the dynamic classifier configured to distinguish between speech and noise to generate a classification output corresponding to the audio data sample; and selectively authorize access to a particular device responsive to the classification output.

According to Clause 53 an apparatus includes: means for receiving an audio data sample corresponding to an acoustic environment; means for providing the audio data sample to a dynamic classifier, the dynamic classifier configured to distinguish between speech and noise to generate a classification output corresponding to the audio data sample; and means for selectively authorizing access to a particular device responsive to the classification output.

According to Clause 54 a device includes: one or more processors configured to: receive an image data sample from image data; provide the image data sample to a dynamic classifier, the dynamic classifier configured to distinguish between multiple persons at least partially based on facial characteristics to generate a classification output corresponding to the image data sample; and selectively authorize access to a particular device responsive to the classification output.

Clause 55 includes the device of Clause 54, further including a camera coupled to the one or more processors and configured to capture the image data.

Clause 56 includes the device of Clause 54 or Clause 55, wherein the dynamic classifier is further configured to indicate detection of multiple persons based on the image data sample, and wherein the one or more processors are further configured to deny access to the particular device in response to dynamic classifier indicating detection of multiple persons.

According to Clause 57 a method includes: receiving, at a processor, an image data sample from image data; providing, at the processor, the image data sample to a dynamic classifier, the dynamic classifier configured to distinguish between multiple persons at least partially based on facial characteristics to generate a classification output corresponding to the image data sample; and selectively authorizing access to a particular device responsive to the classification output.

According to Clause 58 a non-transitory computer-readable medium includes instructions that, when executed by one or more processors, cause the one or more processors to: receive an image data sample from image data; provide the image data sample to a dynamic classifier, the dynamic classifier configured to distinguish between multiple persons at least partially based on facial characteristics to generate a classification output corresponding to the image data sample; and selectively authorize access to a particular device responsive to the classification output.

According to Clause 59 an apparatus includes: means for receiving an image data sample from image data; means for providing the image data sample to a dynamic classifier, the dynamic classifier configured to distinguish between multiple persons at least partially based on facial characteristics to generate a classification output corresponding to the image data sample; and means for selectively authorizing access to a particular device responsive to the classification output.

According to Clause 60 a device includes: one or more processors configured to: receive an audio data sample; generate feature data based on the audio data sample; process the feature data at a dynamic classifier configured to distinguish between multiple users based on speech characteristics to generate a classification output; and determine an authentication at least partially based on the classification output.

Clause 61 includes the device of Clause 60, further including a microphone coupled to the one or more processors and configured to capture audio data to generate the audio data sample.

Clause 62 includes the device of Clause 60 or Clause 61, wherein the feature data includes pitch data and formant data associated with speech.

Clause 63 includes the device of Clause 62, wherein the dynamic classifier is configured to perform phrase-dependent classification, and wherein the feature data further includes duration data and phrase-specific syllable cues.

Clause 64 includes the device of any of Clauses 60 to 63, wherein the one or more processors are further configured to transform the audio data sample to a transform domain prior to generating the feature data.

Clause 65 includes the device of any of Clauses 60 to 64, further including a memory coupled to the one or more processors, the memory including a table that associates classification outputs of the dynamic classifier to particular users of the multiple users.

Clause 66 includes the device of Clause 65, wherein the one or more processors are further configured to populate the table during an enrollment operation.

Clause 67 includes the device of Clause 65 or Clause 66, wherein the one or more processors are further configured to populate the table at least partially based on user identification data.

Clause 68 includes the device of Clause 67, further including a camera coupled to the one or more processors, the camera configured to capture an image of a speaking user and to send data corresponding to the image to the one or more processors as the user identification data.

Clause 69 includes the device of any of Clauses 60 to 68, further including a memory coupled to the one or more processors, the memory including a table that associates classification outputs of the dynamic classifier to one or more access permissions associated with a particular device.

Clause 70 includes the device of Clause 69, wherein the one or more processors are further configured to select the dynamic classifier from multiple dynamic classifiers, each of the multiple dynamic classifiers corresponding to an authentication network for a respective device of multiple devices, and wherein the dynamic classifier is selected based on a user indication to access the particular device.

Clause 71 includes the device of Clause 69 or Clause 70, wherein at least one of the one or more access permissions is time-dependent.

Clause 72 includes the device of any of Clauses 60 to 71, wherein the dynamic classifier is configured to adaptively cluster sets of feature data based on similarity of the feature data to node values in the dynamic classifier, and wherein individual clusters correspond to respective users of the multiple users.

Clause 73 includes the device of any of Clauses 60 to 72, wherein the one or more processors are further configured to update a clustering operation of the dynamic classifier based on the feature data to adapt the dynamic classifier to changes associated with a speech input of a particular user, to add a class for an unclassified user, or both.

Clause 74 includes the device of any of Clauses 60 to 73, wherein the one or more processors are further configured to update a classification decision criterion of the dynamic classifier.

Clause 75 includes the device of any of Clauses 60 to 74, wherein the dynamic classifier includes a self-organizing map.

Clause 76 includes the device of any of Clauses 60 to 74, wherein the dynamic classifier is configured to perform at least one of a principal component analysis, an independent component analysis, or an unsupervised partitioning of voice feature space according to a restricted Boltzmann machine.

Clause 77 includes the device of any of Clauses 60 to 76, wherein the one or more processors are further configured to enforce an upper limit on a number of users that are distinguishable by the dynamic classifier.

Clause 78 includes the device of any of Clauses 60 to 77, wherein the one or more processors are further configured to update the dynamic classifier to enroll a new user at least partially based on a similarity measure between a feature vector corresponding to speech of the new user and existing nodes of the dynamic classifier.

Clause 79 includes the device of any of Clauses 60 to 78, wherein the one or more processors are further configured to determine whether to update the dynamic classifier to enroll a new user at least partially based on a first performance metric, the first performance metric corresponding to the dynamic classifier without enrolling the new user, as compared to a second performance metric, the second performance metric corresponding to the dynamic classifier being updated to include the new user.

Clause 80 includes the device of Clause 79, wherein the first performance metric and the second performance metric correspond to entropy metrics.

Clause 81 includes the device of any of Clauses 60 to 80, wherein the one or more processors are further configured to determine whether to update the dynamic classifier to remove a particular user of the multiple users at least partially based on a first performance metric, the first performance metric corresponding to the dynamic classifier without removing the particular user, as compared to a second performance metric, the second performance metric corresponding to the dynamic classifier being updated to remove the particular user.

Clause 82 includes the device of any of Clauses 60 to 81, wherein the dynamic classifier is further configured to receive a sequence of sets of feature data and to adaptively cluster each set of feature data in the sequence at least partially based on a prior set of feature data in the sequence.

Clause 83 includes the device of any of Clauses 60 to 82, wherein the one or more processors are further configured to determine one or more permissions at least partially based on the classification output.

Clause 84 includes the device of Clause 83, wherein the one or more processors are configured to selectively initiate a voice command processing operation based on the one or more permissions indicating access to the voice command processing operation.

Clause 85 includes the device of Clause 84, wherein the one or more processors are configured to generate at least one of a wakeup signal or an interrupt to initiate the voice command processing operation.

Clause 86 includes the device of any of Clauses 83 to 85, further including a modem coupled to the one or more processors, the modem configured to transmit an output of a voice command processing operation to a second device in response to the one or more permissions indicating access to the second device.

Clause 87 includes the device of any of Clauses 60 to 86, wherein the one or more processors are integrated in at least one of a mobile phone, a tablet computer device, a wearable electronic device, a camera device, a virtual reality headset, or an augmented reality headset.

Clause 88 includes the device of any of Clauses 60 to 86, wherein the one or more processors are integrated into a vehicle, the vehicle further including a microphone coupled to the one or more processors, and wherein the microphone is positioned to capture utterances of an operator of the vehicle as a speech input for authentication based on the dynamic classifier.

According to Clause 89 a method includes: receiving, at one or more processors, an audio data sample; generating, at the one or more processors, feature data based on the audio data sample; processing, at the one or more processors, the feature data at a dynamic classifier configured to distinguish between multiple users to generate a classification output; and determining an authentication, at the one or more processors, at least partially based on the classification output.

Clause 90 includes the method of Clause 89, wherein the audio data sample is generated based on audio data captured at a microphone.

Clause 91 includes the method of Clause 89 or Clause 90, wherein the feature data includes pitch data and formant data associated with speech.

Clause 92 includes the method of an of Clauses 89 to 91, wherein the dynamic classifier performs phrase-dependent classification, and wherein the feature data further includes duration data and phrase-specific syllable cues.

Clause 93 includes the method of any of Clauses 89 to 92, further including transforming the audio data sample to a transform domain prior to generating the feature data.

Clause 94 includes the method of any of Clauses 89 to 93, wherein determining the authentication includes accessing a table that associates classification outputs of the dynamic classifier to particular users of the multiple users.

Clause 95 includes the method of Clause 94, further including populating the table during an enrollment operation.

Clause 96 includes the method of Clause 94 or Clause 95, further including populating the table at least partially based on user identification data.

Clause 97 includes the method of Clause 96, further including receiving, from a camera, data corresponding to a captured image of a speaking user as the user identification data.

Clause 98 includes the method of any of Clauses 89 to 97, further including accessing a table that associates classification outputs of the dynamic classifier to one or more access permissions associated with a particular device.

Clause 99 includes the method of any of Clauses 89 to 98, further including selecting the dynamic classifier from multiple dynamic classifiers, each of the multiple dynamic classifiers corresponding to an authentication network for a respective device of multiple devices, and wherein the dynamic classifier is selected based on a user indication to access the particular device.

Clause 100 includes the method of Clause 98, wherein at least one of the one or more access permissions is time-dependent.

Clause 101 includes the method of any of Clauses 89 to 100, wherein the dynamic classifier is configured to adaptively cluster sets of feature data based on similarity of the feature data to node values in the dynamic classifier, and wherein individual clusters correspond to respective users of the multiple users.

Clause 102 includes the method of any of Clauses 89 to 101, further including updating a clustering operation of the dynamic classifier based on the feature data to adapt the dynamic classifier to changes associated with a speech input of a particular user, to add a class for an unclassified user, or both.

Clause 103 includes the method of any of Clauses 89 to 102, further including updating a classification decision criterion of the dynamic classifier.

Clause 104 includes the method of any of Clauses 89 to 103, wherein the dynamic classifier includes a self-organizing map.

Clause 105 includes the method of any of Clauses 89 to 103, wherein the dynamic classifier is configured to perform at least one of a principal component analysis, an independent component analysis, or an unsupervised partitioning of voice feature space according to a restricted Boltzmann machine.

Clause 106 includes the method of any of Clauses 89 to 105, further including enforcing an upper limit on a number of users that are distinguishable by the dynamic classifier.

Clause 107 includes the method of any of Clauses 89 to 106, further including updating the dynamic classifier to enroll a new user at least partially based on a similarity measure between a feature vector corresponding to speech of the new user and existing nodes of the dynamic classifier.

Clause 108 includes the method of any of Clauses 89 to 107, further including determining whether to update the dynamic classifier to enroll a new user at least partially based on a first performance metric, the first performance metric corresponding to the dynamic classifier without enrolling the new user, as compared to a second performance metric, the second performance metric corresponding to the dynamic classifier being updated to include the new user.

Clause 109 includes the method of Clause 108, wherein the first performance metric and the second performance metric correspond to entropy metrics.

Clause 110 includes the method of any of Clauses 89 to 109, further including determining whether to update the dynamic classifier to remove a particular user of the multiple users at least partially based on a first performance metric, the first performance metric corresponding to the dynamic classifier without removing the particular user, as compared to a second performance metric, the second performance metric corresponding to the dynamic classifier being updated to remove the particular user.

Clause 111 includes the method of any of Clauses 89 to 110, wherein the dynamic classifier is further configured to receive a sequence of sets of feature data and to adaptively cluster each set of feature data in the sequence at least partially based on a prior set of feature data in the sequence.

Clause 112 includes the method of any of Clauses 89 to 111, further including determining one or more permissions at least partially based on the classification output.

Clause 113 includes the method of Clause 112, further including selectively initiating a voice command processing operation based on the one or more permissions indicating access to the voice command processing operation.

Clause 114 includes the method of Clause 113, further including generating at least one of a wakeup signal or an interrupt to initiate the voice command processing operation.

Clause 115 includes the method of any of Clause 112 to 114, further including transmitting an output of a voice command processing operation to a second device in response to the one or more permissions indicating access to the second device.

Clause 116 includes the method of any of Clauses 89 to 115, wherein the one or more processors are integrated in at least one of a mobile phone, a tablet computer device, a wearable electronic device, a camera device, a virtual reality headset, or an augmented reality headset.

Clause 117 includes the method of any of Clauses 89 to 115, wherein the one or more processors are integrated into a vehicle, and wherein utterances of an operator of the vehicle are captured by a microphone of the vehicle as a speech input for authentication based on the dynamic classifier.

According to Clause 118 a non-transitory computer-readable medium includes instructions that, when executed by one or more processors, cause the one or more processors to: receive an audio data sample; generate feature data based on the audio data sample; process the feature data at a dynamic classifier configured to distinguish between multiple users to generate a classification output; and determine an authentication least partially based on the classification output.

Clause 119 includes the non-transitory computer-readable medium of Clause 118, wherein the audio data sample is generated based on audio data captured at a microphone.

Clause 120 includes the non-transitory computer-readable medium of Clause 118 or Clause 119, wherein the feature data includes pitch data and formant data associated with speech.

Clause 121 includes the non-transitory computer-readable medium of any of Clauses 118 to 120, wherein the dynamic classifier performs phrase-dependent classification, and wherein the feature data further includes duration data and phrase-specific syllable cues.

Clause 122 includes the non-transitory computer-readable medium of any of Clauses 118 to 122, wherein the instructions are executable to further cause the one or more processors to transform the audio data sample to a transform domain prior to generating the feature data.

Clause 123 includes the non-transitory computer-readable medium of any of Clauses 118 to 122, wherein determining the authentication includes accessing a table that associates classification outputs of the dynamic classifier to particular users of the multiple users.

Clause 124 includes the non-transitory computer-readable medium of Clause 123, wherein the instructions are executable to further cause the one or more processors to populate the table during an enrollment operation.

Clause 125 includes the non-transitory computer-readable medium of Clause 123 or Clause 124, wherein the instructions are executable to further cause the one or more processors to populate the table at least partially based on user identification data.

Clause 126 includes the non-transitory computer-readable medium of Clause 125, wherein the instructions are executable to further cause the one or more processors to receive, from a camera, data corresponding to a captured image of a speaking user as the user identification data.

Clause 127 includes the non-transitory computer-readable medium of any of Clauses 118 to 126, wherein the instructions are executable to further cause the one or more processors to access a table that associates classification outputs of the dynamic classifier to one or more access permissions associated with a particular device.

Clause 128 includes the non-transitory computer-readable medium of Clause 127, wherein the instructions are executable to further cause the one or more processors to select the dynamic classifier from multiple dynamic classifiers, each of the multiple dynamic classifiers corresponding to an authentication network for a respective device of multiple devices, and wherein the dynamic classifier is selected based on a user indication to access the particular device.

Clause 129 includes the non-transitory computer-readable medium of Clause 127 or Clause 128, wherein at least one of the one or more access permissions is time-dependent.

Clause 130 includes the non-transitory computer-readable medium of any of Clauses 118 to 129, wherein the dynamic classifier is configured to adaptively cluster sets of feature data based on similarity of the feature data to node values in the dynamic classifier, and wherein individual clusters correspond to respective users of the multiple users.

Clause 131 includes the non-transitory computer-readable medium of any of Clauses 118 to 130, wherein the instructions are executable to further cause the one or more processors to update a clustering operation of the dynamic classifier based on the feature data to adapt the dynamic classifier to changes associated with a speech input of a particular user, to add a class for an unclassified user, or both.

Clause 132 includes the non-transitory computer-readable medium of any of Clauses 118 to 131, wherein the instructions are executable to further cause the one or more processors to update a classification decision criterion of the dynamic classifier.

Clause 133 includes the non-transitory computer-readable medium of any of Clauses 118 to 132, wherein the dynamic classifier includes a self-organizing map.

Clause 134 includes the non-transitory computer-readable medium of any of Clauses 118 to 132, wherein the dynamic classifier is configured to perform at least one of a principal component analysis, an independent component analysis, or an unsupervised partitioning of voice feature space according to a restricted Boltzmann machine.

Clause 135 includes the non-transitory computer-readable medium of any of Clauses 118 to 134, wherein the instructions are executable to further cause the one or more processors to enforce an upper limit on a number of users that are distinguishable by the dynamic classifier.

Clause 136 includes the non-transitory computer-readable medium of any of Clauses 118 to 135, wherein the instructions are executable to further cause the one or more processors to update the dynamic classifier to enroll a new user at least partially based on a similarity measure between a feature vector corresponding to speech of the new user and existing nodes of the dynamic classifier.

Clause 137 includes the non-transitory computer-readable medium of any of Clauses 118 to 136, wherein the instructions are executable to further cause the one or more processors to determine whether to update the dynamic classifier to enroll a new user at least partially based on a first performance metric, the first performance metric corresponding to the dynamic classifier without enrolling the new user, as compared to a second performance metric, the second performance metric corresponding to the dynamic classifier being updated to include the new user.

Clause 138 includes the non-transitory computer-readable medium of Clause 137, wherein the first performance metric and the second performance metric correspond to entropy metrics.

Clause 139 includes the non-transitory computer-readable medium of Clause 137 or Clause 138, wherein the instructions are executable to further cause the one or more processors to determine whether to update the dynamic classifier to remove a particular user of the multiple users at least partially based on a first performance metric, the first performance metric corresponding to the dynamic classifier without removing the particular user, as compared to a second performance metric, the second performance metric corresponding to the dynamic classifier being updated to remove the particular user.

Clause 140 includes the non-transitory computer-readable medium of any of Clauses 118 to 139, wherein the dynamic classifier is further configured to receive a sequence of sets of feature data and to adaptively cluster each set of feature data in the sequence at least partially based on a prior set of feature data in the sequence.

Clause 141 includes the non-transitory computer-readable medium of any of Clauses 118 to 140, wherein the instructions are executable to further cause the one or more processors to determine one or more permissions at least partially based on the classification output.

Clause 142 includes the non-transitory computer-readable medium of Clause 141, wherein the instructions are executable to further cause the one or more processors to selectively initiate a voice command processing operation based on the one or more permissions indicating access to the voice command processing operation.

Clause 143 includes the non-transitory computer-readable medium of Clause 142, wherein the instructions are executable to further cause the one or more processors to generate at least one of a wakeup signal or an interrupt to initiate the voice command processing operation.

Clause 144 includes the non-transitory computer-readable medium of any of Clauses 141 to 143, wherein the instructions are executable to further cause the one or more processors to transmit an output of a voice command processing operation to a second device in response to the one or more permissions indicating access to the second device.

Clause 145 includes the non-transitory computer-readable medium of any of Clauses 118 to 144, wherein the one or more processors are integrated in at least one of a mobile phone, a tablet computer device, a wearable electronic device, a camera device, a virtual reality headset, or an augmented reality headset.

Clause 146 includes the non-transitory computer-readable medium of any of Clauses 118 to 145, wherein the one or more processors are integrated into a vehicle, and wherein utterances of an operator of the vehicle are captured by a microphone of the vehicle as a speech input for authentication based on the dynamic classifier.

According to Clause 147 an apparatus includes: means for receiving an audio data sample; means for generating feature data based on the audio data sample; means for processing the feature data at a dynamic classifier configured to distinguish between multiple users to generate a classification output; and means for authenticating at least partially based on the classification output.

Clause 148 includes the apparatus of Clause 147, wherein the audio data sample is generated based on audio data captured at a microphone.

Clause 149 includes the apparatus of Clause 147 or Clause 148, wherein the feature data includes pitch data and formant data associated with speech.

Clause 150 includes the apparatus of any of Clauses 147 to 149, wherein the dynamic classifier performs phrase-dependent classification, and wherein the feature data further includes duration data and phrase-specific syllable cues.

Clause 151 includes the apparatus of any of Clauses 147 to 150, further including means for transforming the audio data sample to a transform domain prior to generating the feature data.

Clause 152 includes the apparatus of any of Clauses 147 to 151, wherein determining the authentication includes accessing a table that associates classification outputs of the dynamic classifier to particular users of the multiple users.

Clause 153 includes the apparatus of Clause 152, further including means for populating the table during an enrollment operation.

Clause 154 includes the apparatus of Clause 152 or Clause 153, further including means for populating the table at least partially based on user identification data.

Clause 155 includes the apparatus of Clause 154, further including means for receiving, from a camera, data corresponding to a captured image of a speaking user as the user identification data.

Clause 156 includes the apparatus of any of Clauses 147 to 155, further including means for accessing a table that associates classification outputs of the dynamic classifier to one or more access permissions associated with a particular device.

Clause 157 includes the apparatus of any of Clauses 147 to 156, further including means for selecting the dynamic classifier from multiple dynamic classifiers, each of the multiple dynamic classifiers corresponding to an authentication network for a respective device of multiple devices, and wherein the dynamic classifier is selected based on a user indication to access the particular device.

Clause 158 includes the apparatus of Clause 156 or Clause 157, wherein at least one of the one or more access permissions is time-dependent.

Clause 159 includes the apparatus of any of Clauses 147 to 158, wherein the dynamic classifier is configured to adaptively cluster sets of feature data based on similarity of the feature data to node values in the dynamic classifier, and wherein individual clusters correspond to respective users of the multiple users.

Clause 160 includes the apparatus of any of Clauses 147 to 159, further including means for updating a clustering operation of the dynamic classifier based on the feature data to adapt the dynamic classifier to changes associated with a speech input of a particular user, to add a class for an unclassified user, or both.

Clause 161 includes the apparatus of any of Clauses 147 to 160, further including means for updating a classification decision criterion of the dynamic classifier.

Clause 162 includes the apparatus of any of Clauses 147 to 161, wherein the dynamic classifier includes a self-organizing map.

Clause 163 includes the apparatus of any of Clauses 147 to 161, wherein the dynamic classifier is configured to perform at least one of a principal component analysis, an independent component analysis, or an unsupervised partitioning of voice feature space according to a restricted Boltzmann machine.

Clause 164 includes the apparatus of any of Clauses 147 to 163, further including means for enforcing an upper limit on a number of users that are distinguishable by the dynamic classifier.

Clause 165 includes the apparatus of any of Clauses 147 to 164, further including means for updating the dynamic classifier to enroll a new user at least partially based on a similarity measure between a feature vector corresponding to speech of the new user and existing nodes of the dynamic classifier.

Clause 166 includes the apparatus of any of Clauses 147 to 165, further including means for determining whether to update the dynamic classifier to enroll a new user at least partially based on a first performance metric, the first performance metric corresponding to the dynamic classifier without enrolling the new user, as compared to a second performance metric, the second performance metric corresponding to the dynamic classifier being updated to include the new user.

Clause 167 includes the apparatus of Clause 166, wherein the first performance metric and the second performance metric correspond to entropy metrics.

Clause 168 includes the apparatus of any of Clauses 147 to 167, further including means for determining whether to update the dynamic classifier to remove a particular user of the multiple users at least partially based on a first performance metric, the first performance metric corresponding to the dynamic classifier without removing the particular user, as compared to a second performance metric, the second performance metric corresponding to the dynamic classifier being updated to remove the particular user.

Clause 169 includes the apparatus of any of Clauses 147 to 168, wherein the dynamic classifier is further configured to receive a sequence of sets of feature data and to adaptively cluster each set of feature data in the sequence at least partially based on a prior set of feature data in the sequence.

Clause 170 includes the apparatus of any of Clauses 147 to 169, further including means for determining one or more permissions at least partially based on the classification output.

Clause 171 includes the apparatus of Clause 170, further including means for selectively initiating a voice command processing operation based on the one or more permissions indicating access to the voice command processing operation.

Clause 172 includes the apparatus of Clause 171, further including means for generating at least one of a wakeup signal or an interrupt to initiate the voice command processing operation.

Clause 173 includes the apparatus of any of Clauses 170 to 172, further including means for transmitting an output of a voice command processing operation to a second device in response to the one or more permissions indicating access to the second device.

Clause 174 includes the apparatus of any of Clauses 147 to 173, wherein the means for processing the feature data at the dynamic classifier is integrated in at least one of a mobile phone, a tablet computer device, a wearable electronic device, a camera device, a virtual reality headset, or an augmented reality headset.

Clause 175 includes the apparatus of any of Clauses 147 to 173, wherein the means for processing the feature data at the dynamic classifier is integrated into a vehicle, and wherein utterances of an operator of the vehicle are captured by a microphone of the vehicle as a speech input for authentication based on the dynamic classifier.

According to Clause 176, a device includes: one or more processors configured to: receive an audio data sample; provide the audio data sample to a dynamic classifier, the dynamic classifier configured to generate a classification output corresponding to the audio data sample; and selectively access a particular device based on the classification output.

Clause 177 includes the device of Clause 176, wherein selectively accessing the particular device includes sending a first signal to unlock access to the particular device in response to the classification output corresponding to a class that is authorized to access the particular device.

Clause 178 includes the device of Clause 176 or 177, wherein selectively accessing the particular device includes sending a second signal to lock access to the particular device in response to the classification output corresponding to a class that is not authorized to access the particular device.

Clause 179 includes the device of any of Clauses 176 to 178, wherein selectively accessing the particular device includes sending data indicative of a speech command associated with the audio data sample to the particular device in response to the classification output corresponding to a class authorized to access the particular device.

Clause 180 includes the device of any of Clauses 176 to 179, further including the particular device coupled to the processor.

Clause 181 includes the device of any of Clauses 176 to 179, further including a modem coupled to the processor, and wherein selectively accessing the particular device includes wireless transmission, via the modem, of a signal to the particular device.

Clause 182 includes the device of any of Clauses 176 to 181, wherein the dynamic classifier is configured to distinguish between multiple users at least partially based on speech characteristics to generate the classification output.

Clause 183 includes the device of any of Clauses 176 to 182, wherein the dynamic classifier is further configured to distinguish between speech originating from a source within a threshold distance from the device and speech originating from the source beyond the threshold distance from the device, and wherein the processor is further configured to deny access to the particular device based on the source being beyond the threshold distance.

Clause 184 includes the device of any of Clauses 176 to 183, wherein the processor is further configured to deny access to the particular device based on detection of speech from a second person within a threshold time duration of detection of speech from a first person that is authorized to access the particular device.

Clause 185 includes the device of any of Clauses 176 to 184, further including a memory coupled to the processor, the memory including a table that associates classification outputs of the dynamic classifier to one or more access permissions associated with the particular device.

Clause 186 includes the device of any of Clauses 176 to 185, wherein a determination of whether to access the particular device is independent of the presence of a keyword in received audio data associated with the audio data sample.

Clause 187 includes the device of any of Clauses 176 to 186, wherein the one or more processors are integrated in at least one of a mobile phone, a tablet computer device, a wearable electronic device, a camera device, a virtual reality headset, or an augmented reality headset.

Clause 188 includes the device of any of Clauses 176 to 187, wherein the one or more processors are integrated into a vehicle, the vehicle further including a microphone coupled to the one or more processors, and wherein the microphone is positioned to capture utterances of an operator of the vehicle as a speech input for authentication based on the dynamic classifier.

Clause 189 includes the device of any of Clauses 176 to 188, wherein the one or more processors include: a first processor configured to provide the audio data sample to the dynamic classifier; and a second processor configured to transition to an active state responsive to the classification output satisfying a wakeup criterion.

Clause 190 includes the device of any of Clauses 176 to 189, wherein the one or more processors are configured to process the audio data to perform keyword detection based on the classification output.

Clause 191 includes the device of any of Clauses 176 to 190, wherein the one or more processors are further configured to provide one or more non-audio data samples to the dynamic classifier, and wherein the dynamic classifier is configured to generate the classification output further based on the one or more non-audio data samples.

Clause 192 includes the device of Clause 191, further including a camera coupled to the one or more processors and configured to capture an image of a speaking user, and wherein the one or more non-audio data samples correspond to the image.

Clause 193 includes the device of Clause 191 or Clause 192, wherein the dynamic classifier includes: a first dynamic classifier configured to process the audio data sample; and a second dynamic classifier configured to process the non-audio data sample.

Clause 194 includes the device of any of Clauses 176 to 193, wherein the dynamic classifier is configured to distinguish between speech and noise to generate a classification output corresponding to the audio data sample.

Clause 195 includes the device of any of Clauses 176 to 194, further including a microphone coupled to the one or more processors and configured to capture audio data to generate the audio data sample.

Clause 196 includes the device of any of Clauses 176 to 195, wherein the one or more processors are further configured to select the dynamic classifier from multiple dynamic classifiers, each of the multiple dynamic classifiers corresponding to an authentication network for a respective device of multiple devices, and wherein the dynamic classifier is selected based on a user indication to access the particular device.

According to Clause 197, a method includes: receiving, at a processor, an audio data sample; providing, at the processor, the audio data sample to a dynamic classifier to generate a classification output corresponding to the audio data sample; and selectively accessing a particular device based on the classification output.

Clause 198 includes the method of Clause 197, wherein selectively accessing the particular device includes sending a first signal to unlock access to the particular device in response to the classification output corresponding to a class that is authorized to access the particular device.

Clause 199 includes the method of Clause 197, wherein selectively accessing the particular device includes sending a second signal to lock access to the particular device in response to the classification output corresponding to a class that is not authorized to access the particular device.

Clause 200 includes the method of Clause 197, wherein selectively accessing the particular device includes sending data indicative of a speech command associated with the audio data sample to the particular device in response to the classification output corresponding to a class authorized to access the particular device.

Clause 201 includes the method of any of Clauses 197 to 200, wherein the dynamic classifier distinguishes between multiple users at least partially based on speech characteristics to generate the classification output.

According to Clause 202, a non-transitory computer-readable medium includes instructions that, when executed by one or more processors, cause the one or more processors to: receive an audio data sample; provide the audio data sample to a dynamic classifier, the dynamic classifier configured to generate a classification output corresponding to the audio data sample; and selectively access a particular device based on the classification output.

Clause 203 includes the non-transitory computer-readable medium of Clause 202, wherein the dynamic classifier is configured to distinguish between multiple users at least partially based on speech characteristics to generate the classification output.

According to Clause 204. an apparatus includes: means for receiving an audio data sample; means for providing the audio data sample to a dynamic classifier, the dynamic classifier configured to generate a classification output corresponding to the audio data sample; and means for selectively accessing a particular device based on the classification output.

Clause 205 includes the apparatus of Clause 204, wherein the dynamic classifier is configured to distinguish between multiple users at least partially based on speech characteristics to generate the classification output.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
one or more processors configured to:
receive plurality of audio data samples corresponding to a plurality of different users;
provide the plurality of audio data samples to a dynamic classifier, the dynamic classifier configured to:
generate a classification outputs corresponding to the different users based on unsupervised real time adaptive clustering of feature data of the audio data samples to adjust a decision boundary, of the dynamic classifier, between discriminative categories of the feature data space to distinguish between feature sets corresponding to the different users;
perform an open-discourse authentication to on the fly enroll and authenticate each of the different users to the device such that one or more of the different users were initially non-authenticated, and after generation of the classification outputs the one or more of the different users are authenticated based on the classification outputs; and
selectively access a particular device based on the classification outputs.

2. The device of claim 1, wherein selectively accessing the particular device includes sending a first signal to unlock access to the particular device in response to the classification outputs corresponding to the classes that are authorized to access the particular device.

3. The device of claim 1, wherein selectively accessing the particular device includes sending a second signal to lock access to the particular device in response to the classification outputs corresponding to the classes that are not authorized to access the particular device.

4. The device of claim 1, wherein selectively accessing the particular device includes sending data indicative of a speech command associated with the audio data samples to the particular device in response to the classification outputs corresponding to the classes that are authorized to access the particular device.

5. The device of claim 1, further including the particular device coupled to the one or more processors.

6. The device of claim 1, further including a modem coupled to the one or more processors, and wherein selectively accessing the particular device includes wireless transmission, via the modem, of a signal to the particular device.

7. The device of claim 1, wherein the dynamic classifier is configured to: perform unsupervised real-time adaptive clustering of feature data of the audio data samples to adjust a decision boundary of the dynamic classifier; and distinguish between the different users at least partially based on speech characteristics to generate the classification output.

8. The device of claim 1, wherein the dynamic classifier is further configured to distinguish between speech originating from a user, among the different users, within a threshold distance from the device and speech originating from the source beyond the threshold distance from the device, and wherein the one or more processors are further configured to deny access to the particular device based on the source being beyond the threshold distance.

9. The device of claim 1, wherein the one or more processors are further configured to deny access to the particular device based on detection of speech from a first user, among the different users, within a threshold time duration of detection of speech from a second user among the different users that are authorized to access the particular device.

10. The device of claim 1, further including a memory coupled to the one or more processors, the memory including a table that associates the classification outputs of the dynamic classifier to one or more access permissions associated with the particular device.

11. The device of claim 1, wherein a determination of whether to access the particular device is independent of the presence of a keyword in received audio data associated with the audio data samples.

12. The device of claim 1, wherein the one or more processors are integrated in at least one of a mobile phone, a tablet computer device, a wearable electronic device, a camera device, a virtual reality headset, or an augmented reality headset.

13. The device of claim 1, wherein the one or more processors are integrated into a vehicle, the vehicle further including a microphone coupled to the one or more processors, and wherein the microphone is positioned to capture utterances of the different users, each of which are operators of the vehicle as a speech input for authentication based on the dynamic classifier.

14. The device of claim 1, wherein the one or more processors include:
a first processor configured to provide the audio data samples to the dynamic classifier; and
a second processor configured to transition to an active state responsive to the classification output satisfying a wakeup criterion.

15. The device of claim 1, wherein the one or more processors are configured to process the audio data samples to perform keyword detection based on the classification outputs.

16. The device of claim 1, wherein the one or more processors are further configured to provide one or more non-audio data samples to the dynamic classifier, and wherein the dynamic classifier is configured to generate the classification outputs are further based on the one or more non-audio data samples.

17. The device of claim 16, further comprising a camera coupled to the one or more processors and configured to capture an image of a speaking user among the different users, and wherein the one or more non-audio data samples correspond to the image.

18. The device of claim 16, wherein the dynamic classifier includes:
 a first dynamic classifier configured to process the audio data samples; and
 a second dynamic classifier configured to process the one or more non-audio data samples.

19. The device of claim 1, wherein the dynamic classifier is configured to distinguish between speech and noise to generate a classification outputs corresponding to the different users.

20. The device of claim 1, further comprising a microphone coupled to the one or more processors and configured to capture audio data to generate the audio data samples.

21. The device of claim 1, wherein the one or more processors are further configured to select the dynamic classifier from multiple dynamic classifiers, each of the multiple dynamic classifiers corresponding to an authentication network for a respective device of multiple devices, and wherein the dynamic classifier is selected based on a particular user, among the different users, indication to access the particular device.

22. A method comprising:
 receiving, at a processor, plurality of audio data samples corresponding to a plurality of different users;
 providing, at the processor, the plurality of audio data samples to a dynamic classifier,
 generating classification outputs, by the dynamic classifier integrated into the processor, corresponding to the different users based on unsupervised real time adaptive clustering of feature data of the audio data samples to adjust a decision boundary, of the dynamic classifier, between discriminative categories of the feature data space to distinguish between feature sets corresponding to the different users;
 performing an open-discourse authentication, by the dynamic classifier integrated into the processor, to on the fly enroll and authenticate each of the different users to the device such that one or more of the different users were initially non-authenticated, and after generation of the classification outputs the one or more of the different users are authenticated based on the classification outputs; and
 selectively accessing a particular device based on the classification outputs.

23. The method of claim 22, wherein selectively accessing the particular device includes sending a first signal to unlock access to the particular device in response to the classification outputs corresponding to the classes that are authorized to access the particular device.

24. The method of claim 22, wherein selectively accessing the particular device includes sending a second signal to lock access to the particular device in response to the classification outputs corresponding to the classes that are not authorized to access the particular device.

25. The method of claim 22, wherein selectively accessing the particular device includes sending data indicative of a speech command associated with the audio data samples to the particular device in response to the classification outputs corresponding to the classes that are authorized to access the particular device.

26. The method of claim 22, wherein the dynamic classifier distinguishes between the different users at least partially based on speech characteristics to generate the classification outputs.

27. A non-transitory computer-readable medium comprising instructions that, when executed by one or more processors, cause the one or more processors to:
 receive plurality of audio data samples corresponding to a plurality of different users;
 provide the plurality of audio data samples to a dynamic classifier, the dynamic classifier configured to:
  generate a classification outputs corresponding to the different users based on unsupervised real time adaptive clustering of feature data of the audio data samples to adjust a decision boundary, of the dynamic classifier, between discriminative categories of the feature data space to distinguish between feature sets corresponding to the different users; and
  perform an open-discourse authentication to on the fly enroll and authenticate each of the different users to the device such that one or more of the different users were initially non-authenticated, and after generation of the classification outputs the one or more of the different users are authenticated based on the classification outputs; and
 selectively access a particular device based on the classification outputs.

28. The non-transitory computer-readable medium of claim 27, wherein the dynamic classifier is configured to distinguish between the different users at least partially based on speech characteristics to generate the classification outputs.

29. An apparatus comprising:
 means for receiving plurality of audio data samples corresponding to a plurality of different users;
 means for providing the plurality of audio data samples to a dynamic classifier, the dynamic classifier comprising:
  means for generating a classification outputs corresponding to the different users based on unsupervised real time adaptive clustering of feature data of the audio data samples to adjust a decision boundary, of the dynamic classifier, between discriminative categories of the feature data space to distinguish between feature sets corresponding to the different users; and
  means for performing an open-discourse authentication to on the fly enroll and authenticate each of the different users to the device such that one or more of the different users were initially non-authenticated, and after generation of the classification outputs the one or more of the different users are authenticated based on the classification outputs; and
 means for selectively accessing a particular device based on the classification outputs.

30. The apparatus of claim 29, wherein the dynamic classifier is configured to distinguish between the different users at least partially based on speech characteristics to generate the classification outputs.

* * * * *